(12) United States Patent
McKenzie et al.

(10) Patent No.: US 11,613,940 B2
(45) Date of Patent: Mar. 28, 2023

(54) DEVICES, SYSTEMS, AND METHODS FOR ROBOTIC PIPE HANDLING

(71) Applicant: NATIONAL OILWELL VARCO, L.P., Houston, TX (US)

(72) Inventors: Andrew Ian McKenzie, Cypress, TX (US); Robert Benjamin Donnally, Plano, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 746 days.

(21) Appl. No.: 16/431,533

(22) Filed: Jun. 4, 2019

(65) Prior Publication Data

US 2020/0040674 A1 Feb. 6, 2020

Related U.S. Application Data

(60) Provisional application No. 62/797,042, filed on Jan. 25, 2019.

(30) Foreign Application Priority Data

Aug. 3, 2018 (CN) .......................... 201810880362.0
Nov. 28, 2018 (CN) .......................... 201811449262.2

(51) Int. Cl.
*E21B 19/14* (2006.01)
*B25J 9/16* (2006.01)
(Continued)

(52) U.S. Cl.
CPC ............ *E21B 19/14* (2013.01); *B25J 9/1628* (2013.01); *B25J 11/00* (2013.01); *E21B 3/02* (2013.01);
(Continued)

(58) Field of Classification Search
CPC ........ E21B 19/14; E21B 19/084; E21B 19/20; E21B 19/15; E21B 19/155; E21B 19/16;
(Continued)

(56) References Cited

U.S. PATENT DOCUMENTS 1,386,210 A   8/1921 Thomas
1,494,524 A   5/1924 Adamson
(Continued)

FOREIGN PATENT DOCUMENTS

CA   2911388 A1   11/2014
CA   2855105      12/2015
(Continued)

OTHER PUBLICATIONS

"U.S. Appl. No. 16/098,160, Response filed Jan. 6, 2021 to Non-Final Office Action dated Oct. 6, 2020", 7 pgs.
(Continued)

*Primary Examiner* — Lynn E Schwenning
(74) *Attorney, Agent, or Firm* — Schwegman Lundberg & Woessner, P.A.

(57) ABSTRACT

The present disclosure relates to systems and methods for automated drill pipe handling operations, such as trip in, trip out, and stand building operations. A pipe handling system of the present disclosure may include a lifting system for handling a load of a pipe stand, a pipe handling robot configured for engaging with the pipe stand and manipulating a position of the pipe stand, and a feedback device configured to provide information about a condition of the pipe stand, the lifting system, or the pipe handling robot. In some embodiments, the pipe handling robot may be a first robot configured for engaging with and manipulating a first end of the pipe stand, and the system may include a second pipe handling robot configured for engaging with and manipulating a second end of the pipe stand.

19 Claims, 33 Drawing Sheets

(51) Int. Cl.
  *B25J 11/00* (2006.01)
  *E21B 3/02* (2006.01)
  *E21B 15/00* (2006.01)
  *E21B 19/06* (2006.01)
  *E21B 19/084* (2006.01)
  *B25J 13/08* (2006.01)

(52) U.S. Cl.
  CPC .............. *E21B 15/00* (2013.01); *E21B 19/06* (2013.01); *E21B 19/084* (2013.01); *B25J 13/081* (2013.01); *B25J 13/086* (2013.01); *B25J 13/087* (2013.01)

(58) Field of Classification Search
  CPC ........ B25J 9/1628; B25J 11/00; B25J 13/081; B25J 13/086; B25J 13/087
  USPC .............................................. 414/22.51–22.71
  See application file for complete search history.

(56) References Cited

U.S. PATENT DOCUMENTS

| | | |
|---|---|---|
| 1,818,278 A | 8/1931 | Siler |
| 2,109,344 A | 2/1938 | Selger |
| 2,314,867 A | 3/1943 | Alexander |
| 2,531,930 A | 11/1950 | Woolslayer et al. |
| 2,615,681 A | 10/1952 | True |
| 2,735,556 A | 2/1956 | Stone |
| 2,885,096 A | 5/1959 | De |
| 2,946,464 A | 7/1960 | Guier |
| 3,225,949 A | 12/1965 | Erickson |
| 3,272,365 A | 9/1966 | Stevens |
| 3,361,453 A | 1/1968 | Brown et al. |
| 3,533,516 A | 10/1970 | Guier |
| 3,615,027 A | 10/1971 | Ham |
| 3,623,753 A | 11/1971 | Henry |
| 3,747,789 A | 7/1973 | Shipley et al. |
| 3,768,663 A | 10/1973 | Turner et al. |
| 3,840,128 A | 10/1974 | Swoboda et al. |
| 3,877,583 A | 4/1975 | Bokenkamp |
| 3,921,823 A | 11/1975 | Bourree |
| 3,976,207 A | 8/1976 | Schultz |
| 3,994,350 A | 11/1976 | Smith et al. |
| 4,042,123 A | 8/1977 | Sheldon et al. |
| 4,117,941 A | 10/1978 | Mccleskey, Jr. et al. |
| 4,126,348 A | 11/1978 | Palmer |
| 4,269,554 A | 5/1981 | Jackson |
| 4,274,778 A * | 6/1981 | Putnam .................. E21B 19/14 414/733 |
| 4,289,442 A | 9/1981 | Stevens |
| 4,348,920 A | 9/1982 | Boyadjieff |
| 4,397,605 A | 8/1983 | Cowgill et al. |
| 4,531,875 A | 7/1985 | Krueger |
| 4,591,006 A | 5/1986 | Hutchison et al. |
| 4,621,974 A | 11/1986 | Krueger |
| 4,680,519 A | 7/1987 | Chand et al. |
| 4,715,761 A | 12/1987 | Berry et al. |
| 4,738,321 A | 4/1988 | Olivier |
| 4,846,357 A | 7/1989 | Sholl et al. |
| 4,899,095 A | 2/1990 | Kishi et al. |
| 5,038,871 A | 8/1991 | Dinsdale |
| 5,211,251 A | 5/1993 | Woolslayer |
| 5,494,320 A | 2/1996 | Cerruti |
| 5,813,286 A | 9/1998 | Hansen |
| 5,921,329 A | 7/1999 | Armstrong |
| 6,047,771 A | 4/2000 | Roeynestad |
| 6,260,646 B1 | 7/2001 | Fernandez et al. |
| 6,412,576 B1 | 7/2002 | Meiners |
| 6,460,900 B1 | 10/2002 | Bakke |
| 7,137,616 B2 | 11/2006 | Kysely |
| 7,249,639 B2 | 7/2007 | Belik |
| 7,341,281 B2 | 3/2008 | Guesnon et al. |
| 7,370,707 B2 | 5/2008 | Mcdaniel et al. |
| 7,390,032 B2 | 6/2008 | Hughes |
| 7,493,960 B2 | 2/2009 | Leising et al. |
| 7,726,929 B1 | 6/2010 | Orgeron |
| 7,905,311 B2 | 3/2011 | Brown |
| 7,946,795 B2 | 5/2011 | Orgeron |
| 7,984,757 B1 | 7/2011 | Keast et al. |
| 8,074,484 B2 | 12/2011 | Denkmeier et al. |
| 8,191,637 B2 | 6/2012 | Havinga |
| 8,210,269 B2 | 7/2012 | Hudson et al. |
| 8,317,448 B2 | 11/2012 | Hankins et al. |
| 8,504,206 B2 | 8/2013 | Fudaba et al. |
| 8,550,761 B2 | 10/2013 | Belik et al. |
| 8,690,508 B1 | 4/2014 | Orgeron |
| 9,133,968 B2 | 9/2015 | Elrick et al. |
| 9,291,010 B1 | 3/2016 | Barnes |
| 9,388,923 B2 | 7/2016 | Romano |
| 9,706,185 B2 * | 7/2017 | Ellis .................. F16P 3/142 |
| 9,845,645 B2 | 12/2017 | Hughes et al. |
| 10,047,908 B1 | 8/2018 | Bohle, II et al. |
| 10,053,934 B2 | 8/2018 | Keogh et al. |
| 10,190,374 B2 * | 1/2019 | Bowley .................. E21B 19/20 |
| 10,246,952 B2 * | 4/2019 | Trydal .................. G06V 10/10 |
| 10,384,907 B2 | 8/2019 | Upmeier et al. |
| 10,612,322 B2 * | 4/2020 | Doyon .................. E21B 19/155 |
| 10,794,126 B2 | 10/2020 | Magnuson |
| 10,988,994 B2 * | 4/2021 | Clarke .................. E21B 19/155 |
| 10,995,564 B2 | 5/2021 | Miller et al. |
| 11,035,183 B2 | 6/2021 | Donnally et al. |
| 11,220,888 B2 * | 1/2022 | Ocegueda-Hernandez ................. E21B 44/00 |
| 11,274,508 B2 | 3/2022 | Mckenzie et al. |
| 11,365,592 B1 | 6/2022 | Moon et al. |
| 2002/0175519 A1 | 11/2002 | Mack et al. |
| 2004/0057815 A1 | 3/2004 | Woolslayer et al. |
| 2005/0055132 A1 | 3/2005 | Matsumoto et al. |
| 2005/0113971 A1 | 5/2005 | Zhang et al. |
| 2005/0126792 A1 | 6/2005 | Berry |
| 2006/0081379 A1 | 4/2006 | Fehres et al. |
| 2006/0104747 A1 | 5/2006 | Zahn et al. |
| 2006/0124316 A1 | 6/2006 | Pietras |
| 2006/0231344 A1 | 10/2006 | Drzewiecki |
| 2006/0249292 A1 | 11/2006 | Guidry |
| 2007/0062705 A1 | 3/2007 | Schats et al. |
| 2007/0114069 A1 | 5/2007 | Hooper et al. |
| 2007/0228671 A1 | 10/2007 | Norton |
| 2008/0136203 A1 | 6/2008 | Krijnen et al. |
| 2008/0202812 A1 | 8/2008 | Childers et al. |
| 2008/0238095 A1 | 10/2008 | Yater et al. |
| 2008/0296065 A1 | 12/2008 | Standal |
| 2009/0283324 A1 | 11/2009 | Konduc et al. |
| 2010/0193198 A1 | 8/2010 | Murray et al. |
| 2010/0303586 A1 | 12/2010 | Hankins et al. |
| 2011/0079434 A1 | 4/2011 | Belik et al. |
| 2011/0120730 A1 | 5/2011 | Clasen et al. |
| 2011/0147009 A1 | 6/2011 | Dupal et al. |
| 2011/0226485 A1 | 9/2011 | Seneviratne et al. |
| 2012/0018222 A1 | 1/2012 | Hankins et al. |
| 2012/0259337 A1 | 10/2012 | Del Rio et al. |
| 2013/0075114 A1 | 3/2013 | Dekker et al. |
| 2013/0142607 A1 | 6/2013 | Ditzler |
| 2013/0146305 A1 | 6/2013 | Dupal et al. |
| 2014/0050522 A1 | 2/2014 | Slaughter, Jr. et al. |
| 2014/0054089 A1 | 2/2014 | Sondervik |
| 2014/0097027 A1 | 4/2014 | Marica et al. |
| 2014/0145408 A1 | 5/2014 | Midas et al. |
| 2014/0202769 A1 | 7/2014 | Magnuson |
| 2015/0053424 A1 | 2/2015 | Wiens et al. |
| 2015/0127152 A1 | 5/2015 | Nammoto et al. |
| 2015/0148952 A1 | 5/2015 | Shiratsuchi |
| 2015/0232272 A1 | 8/2015 | Magnuson |
| 2015/0272579 A1 | 10/2015 | Leimbach et al. |
| 2015/0273688 A1 | 10/2015 | Harada et al. |
| 2015/0275596 A1 | 10/2015 | Hickie |
| 2015/0283704 A1 | 10/2015 | Watanabe |
| 2015/0330162 A1 | 11/2015 | Magnuson et al. |
| 2016/0060979 A1 | 3/2016 | Magnuson |
| 2016/0115745 A1 | 4/2016 | Bisel |
| 2016/0145954 A1 | 5/2016 | Helms et al. |
| 2016/0160586 A1 | 6/2016 | Keogh et al. |
| 2016/0168929 A1 | 6/2016 | Magnuson et al. |

(56) References Cited

U.S. PATENT DOCUMENTS

| | | | |
|---|---|---|---|
| 2016/0201408 A1* | 7/2016 | Little | E21B 19/14 |
| | | | 414/730 |
| 2017/0172295 A1 | 6/2017 | Tropper | |
| 2017/0232620 A1 | 8/2017 | Kalb et al. | |
| 2017/0234088 A1 | 8/2017 | Orr et al. | |
| 2018/0171724 A1 | 6/2018 | Daigle et al. | |
| 2018/0238120 A1 | 8/2018 | Patterson et al. | |
| 2018/0245408 A1 | 8/2018 | Keogh et al. | |
| 2018/0328112 A1 | 11/2018 | Berry et al. | |
| 2018/0334865 A1 | 11/2018 | Miller et al. | |
| 2019/0063649 A1 | 2/2019 | Snyder, II | |
| 2019/0143532 A1 | 5/2019 | Cutkosky et al. | |
| 2019/0145197 A1 | 5/2019 | Callaghan | |
| 2019/0309585 A1 | 10/2019 | Miller et al. | |
| 2020/0032597 A1 | 1/2020 | Jorgic et al. | |
| 2020/0040673 A1 | 2/2020 | Donnally et al. | |
| 2021/0246738 A1 | 8/2021 | Mckenzie et al. | |
| 2021/0293099 A1 | 9/2021 | Carnegie et al. | |
| 2021/0301602 A1 | 9/2021 | Mckenzie et al. | |
| 2022/0145704 A1 | 5/2022 | Mckenzie | |
| 2022/0178215 A1 | 6/2022 | Donnally et al. | |

FOREIGN PATENT DOCUMENTS

| | | |
|---|---|---|
| CN | 108266139 A | 7/2018 |
| CN | 110792399 A | 2/2020 |
| EP | 1510302 | 3/2005 |
| EP | 1953334 A2 | 8/2008 |
| GB | 2091788 A | 8/1982 |
| GB | 2532267 A | 5/2016 |
| JP | H09-137689 A | 5/1997 |
| NO | 20151648 A1 | 12/2015 |
| WO | WO-8800274 A2 | 1/1988 |
| WO | WO-9958811 A1 | 11/1999 |
| WO | WO-0123701 A1 | 4/2001 |
| WO | WO-2004018829 A1 | 3/2004 |
| WO | 2007143842 | 12/2007 |
| WO | WO-2013082172 A1 | 6/2013 |
| WO | WO-2014179730 A1 | 11/2014 |
| WO | WO-2015/043740 A1 | 4/2015 |
| WO | WO-2016024859 A1 | 2/2016 |
| WO | WO-2016197255 A1 | 12/2016 |
| WO | WO-2017039996 A1 | 3/2017 |
| WO | WO-2017087595 A1 | 5/2017 |
| WO | WO-2017190120 A1 | 11/2017 |
| WO | WO-2017193204 A1 | 11/2017 |
| WO | WO-2019195651 A1 | 10/2019 |
| WO | WO-2020/028853 A9 | 2/2020 |
| WO | WO-2020028852 A1 | 2/2020 |
| WO | WO-2020028853 A1 | 2/2020 |
| WO | WO-2020028856 A1 | 2/2020 |
| WO | WO-2020028858 A1 | 2/2020 |
| WO | WO-2020151386 A1 | 7/2020 |
| WO | 2020160440 | 8/2020 |
| WO | WO-2020172407 A1 | 8/2020 |
| WO | WO-2021/203122 A1 | 10/2021 |
| WO | 2022170302 | 8/2022 |

OTHER PUBLICATIONS

"U.S. Appl. No. 16/375,927, Corrected Notice of Allowability dated Jan. 26, 2021", 2 pgs.
"U.S. Appl. No. 16/375,927, Examiner Interview Summary dated Dec. 7, 2020", 7 pgs.
"U.S. Appl. No. 16/375,927, Notice of Allowance dated Jan. 1, 2021", 8 pgs.
"U.S. Appl. No. 16/375,927, Response filed Dec. 16, 2020 to Non Final Office Action dated Sep. 24, 2020", 8 pgs.
"U.S. Appl. No. 16/431,540, Examiner Interview Summary dated Jan. 19, 2021", 3 pgs.
"U.S. Appl. No. 16/431,540, Final Office Action dated Nov. 19, 2020", 10 pgs.
"U.S. Appl. No. 16/431,540, Notice of Allowance dated Feb. 11, 2021", 5 pgs.
"U.S. Appl. No. 16/431,540, Response filed Jan. 19, 2021 to Final Office Action dated Nov. 19, 2020", 11 pgs.
"U.S. Appl. No. 16/836,365, Non Final Office Action dated Jan. 25, 2021", 8 pgs.
"International Application Serial No. PCT/US2019/025942, International Preliminary Report on Patentability dated Oct. 30, 2020", 7 pgs.
"International Application Serial No. PCT/US2019/044974, International Preliminary Report on Patentability dated Nov. 11, 2020", 7 pgs.
"International Application Serial No. PCT/US2019/044976, Written Opinion dated Nov. 6, 2020", 6 pgs.
"International Application Serial No. PCT/US2019/044979, International Preliminary Report on Patentability dated Nov. 18, 2020", 7 pgs.
"International Application Serial No. PCT/US2019/124443, Response filed Nov. 24, 2020 to Written Opinion dated Mar. 5, 2020", 10 pgs.
"U.S. Appl. No. 16/098,160, Examiner Interview Summary dated Jun. 23, 2020", 3 pgs.
"U.S. Appl. No. 16/098,160, Final Office Action dated Apr. 30, 2020", 7 pgs.
"U.S. Appl. No. 16/098,160, Non Final Office Action dated Sep. 30, 2019", 8 pgs.
"U.S. Appl. No. 16/098,160, Preliminary Amendment filed Nov. 1, 2018", 5 pgs.
"U.S. Appl. No. 16/098,160, Response filed Jan. 30, 2020 to Non Final Office Action dated Sep. 30, 2019", 8 pgs.
"U.S. Appl. No. 16/098,160, Response filed Jun. 30, 2020 to Final Office Action dated Apr. 30, 2020", 8 pgs.
"U.S. Appl. No. 16/375,927, Examiner Interview Summary dated Apr. 24, 2020", 3 pgs.
"U.S. Appl. No. 16/375,927, Final Office Action dated Jun. 5, 2020", 10 pgs.
"U.S. Appl. No. 16/375,927, Non Final Office Action dated Feb. 28, 2020", 9 pgs.
"U.S. Appl. No. 16/375,927, Response filed May 27, 2020 to Non Final Office Action dated Feb. 28, 2020", 10 pgs.
"U.S. Appl. No. 16/431,540, Non Final Office Action dated Jun. 10, 2020", 13 pgs.
"Canadian Application Serial No. 3,022,888, Voluntary Amendment filed Jul. 12, 2019", 10 pgs.
"International Application Serial No. PCT/CA2017/000125, International Preliminary Report on Patentability dated Nov. 22, 2018", 6 pgs.
"International Application Serial No. PCT/CA2017/000125, International Search Report dated Aug. 14, 2017", 3 pgs.
"International Application Serial No. PCT/CA2017/000125, Written Opinion dated Aug. 14, 2017", 4 pgs.
"International Application Serial No. PCT/CN2019/124443, International Search Report dated Mar. 5, 2020", 4 pgs.
"International Application Serial No. PCT/CN2019/124443, Written Opinion dated Mar. 5, 2020", 4 pgs.
"International Application Serial No. PCT/US2019/025942, International Search Report dated Jun. 27, 2019", 4 pgs.
"International Application Serial No. PCT/UJS2019/025942, Response filed Feb. 5, 2020 to Written Opinion dated Feb. 27, 2019", 14 pgs.
"International Application Serial No. PCT/US2019/025942, Response filed Apr. 23, 2020 to Written Opinion dated Apr. 23, 2020", 14 pgs.
"International Application Serial No. PCT/US2019/025942, Written Opinion dated Feb. 24, 2020", 8 pgs.
"International Application Serial No. PCT/US2019/025942, Written Opinion dated Jun. 27, 2019", 9 pgs.
"International Application Serial No. PCT/US2019/044974, Response filed Jun. 2, 2020 to Written Opinion dated Oct. 24, 2019", 13 pgs.
"International Application Serial No. PCT/US2019/044974, Written Opinion dated Jun. 19, 2020", 7 pgs.
"International Application Serial No. PCT/US2019/044976, Response filed Jun. 3, 2020 to Written Opinion dated Oct. 18, 2019", 11 pgs.
"International Application Serial No. PCT/US2019/044979, Response filed Jun. 3, 2020 to Written Opinion dated Oct. 22, 2019", 12 pgs.

(56) References Cited

OTHER PUBLICATIONS

"International Application Serial No. PCT/US2020/019039, International Search Report dated May 15, 2020", 2 pgs.
"International Application Serial No. PCT/US2020/019039, Written Opinion dated May 15, 2020", 4 pgs.
"International Application Serial No. PCT/US2019/044974, International Search Report dated Oct. 24, 2019", 6 pgs.
"International Application Serial No. PCT/US2019/044974, Written Opinion dated Oct. 24, 2019", 6 pgs.
"International Application Serial No. PCT/US2019/044976, International Search Report dated Oct. 18, 2019", 5 pgs.
"International Application Serial No. PCT/US2019/044976, Written Opinion dated Oct. 18, 2019", 8 pgs.
"International Application Serial No. PCT/US2019/044979, International Search Report dated Oct. 22, 2019", 6 pgs.
"International Application Serial No. PCT/US2019/044979, Written Opinion dated Oct. 22, 2019", 7 pgs.
"International Application Serial No. PCT/US2019/044983, International Search Report dated Oct. 22, 2019", 5 pgs.
"International Application Serial No. PCT/US2019/044983, Written Opinion dated Oct. 22, 2019", 6 pgs.
"U.S. Appl. No. 16/098,160, Final Office Action dated May 27, 2021", 8 pgs.
"U.S. Appl. No. 16/098,160, Response filed Jul. 27, 2021 to Final Office Action dated May 27, 2021", 9 pgs.
"U.S. Appl. No. 16/836,365, Final Office Action dated May 4, 2021", 7 pgs.
"U.S. Appl. No. 16/836,365, Notice of Allowance dated Jul. 27, 2021", 7 pgs.
"U.S. Appl. No. 16/836,365, Response filed Apr. 22, 2021 to Non-Final Office Action dated Jan. 25, 2021", 8 pgs.
"U.S. Appl. No. 16/836,365, Response filed Jul. 2, 2021 to Final Office Action dated May 4, 2021", 7 pgs.
"International Application Serial No. PCT/CN2019/124443, International Preliminary Report on Patentability dated May 26, 2021", 4 pgs.
"International Application Serial No. PCT/US2021/070319, International Search Report dated May 31, 2021", 5 pgs.
"International Application Serial No. PCT/US2021/070319, Written Opinion dated May 31, 2021", 6 pgs.
"International Application Serial No. PCT/US2021/070488, Invitation to Pay Additional Fees dated Jun. 28, 2021", 2 pgs.
"Moveit—Kinematic constraints: Visibility Constraint Class Reference", [online], [retrieved Apr. 21, 2021], Retrieved from the Internet: <URL: http://docs.ros.org/en/hydro/api/moveit_core/html/classkinematic_constraints_1_1VisibilityConstraint.html>, (2021), 8 pgs.
"Moveit—Moving robots into the future", [online], [archived Dec. 4, 2020], Retrieved from the Internet: <URL: https://web.archive.org/web/20201204224545/https://moveit.ros.org/>, (2020), 7 pgs.
"U.S. Appl. No. 16/098,160, Advisory Action dated Jul. 22, 2020", 5 pgs.
"U.S. Appl. No. 16/098,160, Non Final Office Action dated Oct. 6, 2020", 8 pgs.
"U.S. Appl. No. 16/098,160, Response filed Aug. 24, 2020 to Advisory Action dated Jul. 22, 2020", 9 pgs.
"U.S. Appl. No. 16/375,927, Advisory Action dated Aug. 11, 2020", 6 pgs.
"U.S. Appl. No. 16/375,927, Non Final Office Action dated Sep. 24, 2020", 10 pgs.
"U.S. Appl. No. 16/375,927, Response filed Aug. 3, 2020 to Final Office Action dated Jun. 5, 2020", 11 pgs.
"U.S. Appl. No. 16/375,927, Response filed Sep. 8, 2020 to Advisory Action dated Aug. 11, 2020", 10 pgs.
"U.S. Appl. No. 16/431,540, Response Filed Sep. 10, 2020 to Non Final Office Action dated Jun. 10, 2020", 24 pgs.
"International Application Serial No. PCT/US2019/025942, Response filed Sep. 22, 2020 to Written Opinion dated Jul. 23, 2020", 4 pgs.
"International Application Serial No. PCT/US2019/025942, Written Opinion dated Jul. 23, 2020", 5 pgs.
"International Application Serial No. PCT/US2019/044974, Response filed Aug. 18, 2020 to Written Opinion dated Jun. 19, 2020", 4 pgs.
"International Application Serial No. PCT/US2019/044976, Response filed Aug. 25, 2020 to Written Opinion dated Jun. 26, 2020", 3 pgs.
"International Application Serial No. PCT/US2019/044976, Written Opinion dated Jun. 26, 2020", 4 pgs.
"International Application Serial No. PCT/US2019/044979, Response filed Aug. 25, 2020 to Written Opinion dated Jun. 26, 2020", 3 pgs.
"International Application Serial No. PCT/US2019/044979, Written Opinion dated Jun. 26, 2020", 4 pgs.
"U.S. Appl. No. 16/098,160, Advisory Action dated Aug. 10, 2021", 4 pgs.
"U.S. Appl. No. 16/098,160, Non-Final Office Action dated Sep. 15, 2021", 8 pgs.
"U.S. Appl. No. 16/098,160, Response filed Aug. 27, 2021 to Advisory Action dated Aug. 10, 2021", 8 pgs.
"U.S. Appl. No. 16/836,365, Notice of Allowance dated Nov. 3, 2021", 7 pgs.
"U.S. Appl. No. 17/248,669, Non-Final Office Action dated Oct. 5, 2021", 8 pgs.
"International Application Serial No. PCT/US2019/044976, International Preliminary Report on Patentability dated Mar. 9, 2021", 7 pgs.
"International Application Serial No. PCT/US2020/019039, International Preliminary Report on Patentability dated Sep. 2, 2021", 6 pgs.
"International Application Serial No. PCT/US2021/070488, International Search Report dated Sep. 8, 2021", 4 pgs.
"International Application Serial No. PCT/US2021/070488, Written Opinion dated Sep. 8, 2021", 6 pgs.
"International Application Serial No. PCT/US2021/070786, Invitation to Pay Additional Fees dated Sep. 1, 2021", 2 pgs.
"U.S. Appl. No. 17/248,669, Examiner Interview Summary dated Dec. 17, 2021", 2 pgs.
"U.S. Appl. No. 17/248,669, Response filed Jan. 5, 2022 to Non Final Office Action dated Oct. 5, 2021", 8 pgs.
"U.S. Appl. No. 17/248,669, Notice of Allowance dated Jan. 25, 2022", 8 pgs.
"U.S. Appl. No. 17/248,669, Notice of Allowability dated Feb. 3, 2022", 5 pgs.
"U.S. Appl. No. 17/248,669, 312 Amendment filed Mar. 2, 2022", 3 pgs.
"U.S. Appl. No. 17/248,669, PTO Response to Rule 312 Communication dated Mar. 9, 2022", 2 pgs.
"U.S. Appl. No. 16/786,345, Non Final Office Action dated Mar. 28, 2022", 13 pgs.
"International Application Serial No. PCT US2022 070377, International Search Report dated Mar. 25, 2022", 5 pgs.
"International Application Serial No. PCT US2022 070377, Written Opinion dated Mar. 25, 2022", 7 pgs.
"Saudia Arabian Application No. 521421161, Office Action dated Apr. 4, 2022", (w English Summary), 6 pgs.
"U.S. Appl. No. 17/248,669, Corrected Notice of Allowability dated May 18, 2022", 3 pgs.
"European Application Serial No. 19758551.6, Communication Pursuant to Article 94(3) EPC dated Apr. 28, 2022", 4 pgs.
"European Application Serial No. 19752902.7, Communication Pursuant to Article 94(3) EPC dated May 3, 2022", 5 pgs.
"International Application Serial No. PCT US2021 070319, International Preliminary Report on Patentability dated May, 10 2022", 7 pgs.
"U.S. Appl. No. 16/786,345, Response filed Jun. 15, 2022 to Non Final Office Action dated Mar. 28, 2022", 12 pgs.
"U.S. Appl. No. 16/786,345, Final Office Action dated Jul. 28, 2022", 9 pgs.
"European Application Serial No. 19758551.6, Response filed Aug. 25, 2022 to Communication Pursuant to Article 94(3) EPC dated Apr. 28, 2022", 73 pgs.
"European Application Serial No. 19752902.7, Response filed Aug. 26, 2022 to Communication Pursuant to Article 94(3) EPC dated May 3, 2022", 70 pgs.
"Saudi Arabia Application No. 521421154, Office Action dated Aug. 31, 2022", w o English translation, 10 pgs.

(56) References Cited

OTHER PUBLICATIONS

"U.S. Appl. No. 16/786,345, Response filed Sep. 27, 2022 to Final Office Action dated Jul. 28, 2022", 6 pgs.
"U.S. Appl. No. 16/786,345, Final Office Action dated Oct. 24, 2022", 8 pgs.

* cited by examiner

DEVICES, SYSTEMS, AND METHODS FOR ROBOTIC PIPE HANDLING

CROSS-REFERENCE TO RELATED APPLICATIONS

This application claims priority to U.S. Provisional Application No. 62/797,042, entitled Hoist System Capable of Parking a Top Drive and Including an Elevator and a Claw independently Operated and Automated Robotic Arms for Handling Tubulars on a Drilling Rig, and filed Jan. 25, 2019; Chinese Application No. 201811449262.0, entitled Hoist System Capable of Parking a Top Drive and Including an Elevator and a Claw Independently Operated for Handling Tubulars on a Drilling Rig, and filed Nov. 28, 2018; and Chinese Application No. 201810880362.2, entitled Hoist System Capable of Parking a Top Drive and Including an Elevator and a Claw independently Operated and Automated Robotic Arms for Handling Tubulars on a Drilling Rig, and filed Aug. 3, 2018, the content of each of which is hereby incorporated by reference herein in its entirety.

FIELD OF THE INVENTION

The present disclosure relates to drill pipe handling operations. In particular, the present disclosure relates to devices, systems, and methods for tripping drill pipe into and/or out of a well. More particularly, the present disclosure relates to devices, systems, and methods for tripping drill pipe using one or more robots.

BACKGROUND OF THE INVENTION

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Drilling of wells involves tripping of the drill string, during which drill pipes are lowered into (tripping in) or pulled out of (tripping out) a well. Tripping may typically occur in order to change all or a portion of the bottom hole assembly, such as to change a drill bit. Where drill pipe is tripped into a well, stands or lengths of drill pipe may be supplied from a storage position in a setback area of the drill rig and connected end-to-end to lengthen the drill string in the well. Where drill pipe is tripped out of a well, stands or lengths of drill pipe may be disconnected from the drill string and may be positioned in the setback area.

Tripping has conventionally been performed with human operators. In particular, while an elevator or top drive may be used to carry the load of a stand of drill pipe during trip in and trip out operations, human operators may typically maneuver the drill pipe stands around the drill floor, such as between the well center and the setback area. For example, a first human operator may be positioned on the drill floor, at or near the well, to maneuver a lower end of drill pipe stands as they are tripped into or out of the well, while a second human operator may be positioned on or above the racking board to maneuver an upper end of drill pipe stands as the stands are moved between the well and the setback area. Operators often use ropes and/or other tools to maneuver the drill pipe stands on or above the drill floor. Such work is labor-intensive and can be dangerous. Moreover, trip in and trip out operations may be limited by the speed at which the human operators can maneuver the stands between well center and the setback area.

BRIEF SUMMARY OF THE INVENTION

The following presents a simplified summary of one or more embodiments of the present disclosure in order to provide a basic understanding of such embodiments. This summary is not an extensive overview of all contemplated embodiments and is intended to neither identify key or critical elements of all embodiments, nor delineate the scope of any or all embodiments.

The present disclosure, in one or more embodiments, relates to a pipe handling system for handling drill pipe. The system may include a lifting system for handling a load of a pipe stand, a pipe handling robot configured for engaging with the pipe stand and manipulating a position of the pipe stand, and a feedback device configured to provide information about a condition of the pipe stand, the lifting system, or the pipe handling robot. The pipe handling system may additionally include a controller in communication with the feedback device. The controller may receive the information provided by the feedback device and may control operations of at least one of the lifting system and the pipe handling robot. In some embodiments, the pipe handling robot may have an end effector for engaging with the pipe stand, the end effector extending from an articulated arm. A joint having a roll joint, pitch joint, and yaw joint, may be provided between the end effector and the articulated arm. The system may additionally include an iron roughneck in some embodiments. Moreover, the lifting system may include a pipe elevator a draw works, and/or a hydraulic lifting arm. In some embodiments, the pipe handling robot may be a first robot configured for engaging with and manipulating a first end of the pipe stand, and the system may include a second pipe handling robot configured for engaging with and manipulating a second end of the pipe stand. The controller may be configured to coordinate operations of the second robot with operation of the first robot, such that the first and second robots may operate as a team to manipulate the pipe stand. The feedback device of the system may include a weight sensor, a contact switch, and/or a proximity sensor.

The present disclosure, in one or more embodiments, additionally relates to a method of handling drill pipe. The method may include transferring a load of a pipe stand to a lifting system, using a robot to manipulate a position of the pipe stand, and receiving data from a feedback device indicating a condition of the pipe stand, the lifting system, or the robot. The robot may include an end effector for engaging with the pipe stand, the end effector extending from an articulated arm. A joint between the end effector and the articulated arm may include a roll joint, a pitch joint, and a yaw joint. The method may additionally include using an iron roughneck to couple the pipe stand to a drill string or to decouple the pipe from the drill string. The feedback device may include a weight sensor, a contact switch, and/or a proximity sensor in some embodiments. Moreover, the robot may be a first robot used to manipulate a position of a first end of the pipe stand, and the method may additionally include using a second robot to manipulate a position of a second end of the pipe stand. The robots may be configured to perform operations in response to the received feedback data. In some embodiments, using a robot to manipulate a position of the pipe stand may include controlling the robot with a finite state machine. Moreover, using a robot to manipulate a position of the pipe stand may include directing at least an end of the pipe stand toward a setback area of a drill floor or toward a well.

The present disclosure, in one or more embodiments, additionally relates to a drilling rig. The drilling rig may include a drill floor arranged above a well, the drill floor having an opening for accessing the well. The drilling rig may have a mast extending from the drill floor, the mast having a crown block of sheaves arranged thereon. The drilling rig may have a lifting system including a cable reeved between the crown block and a traveling block. The drilling rig may further include a pipe handling system having a pipe handling robot, a feedback device, and a controller. The pipe handling robot may be configured for engaging with a pipe stand and manipulating a position of the pipe stand. The feedback device may be configured to provide information about a condition of the pipe stand, the lifting system, or the pipe handling robot. Additionally, the controller may be in communication with the feedback device and may receive information provided by the feedback device. The controller may control operations of the lifting system and/or the pipe handling robot. In some embodiments, the lifting system may be configured for handling a load of the pipe stand while the pipe handling robot manipulates a position of the pipe stand. The pipe handling robot may be a first robot configured for engaging and manipulating a first end of the pipe stand. The handling system may further have a second robot configured for engaging with and manipulating a second end of the pipe stand. The controller may be configured to coordinate operations of the second robot with operations of the first robot, such that the first and second robots may operate as a team to manipulate the pipe stand. The first robot may be arranged on the drill floor and the second robot may be arranged on a racking board of the drilling rig.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure, in one or more embodiments, relates to systems and methods for automated drill pipe handling operations. In particular, a pipe handling system of the present disclosure may include a lifting system and one or more drill handling robots and may be configured for performing trip in, trip out, stand building, and/or other drill pipe or drill collar handling operations. The lifting system may include a primary drill line of a drilling rig, which may be reeved between a crown block and a traveling block and a top drive or other pipe string handling device may be hung from the travelling block. The traveling block may be raised and lowered using a draw works to raise and lower the top drive and the pipe stand. Each pipe handling robot may be configured to engage with and manipulate an end of the pipe stand. In some embodiments, a first pipe handling robot may be a drill floor robot arranged on or near a drill floor of the drilling rig. A second robot may be a racking board robot arranged on or near a racking board of the drilling rig. The robots and the lifting system may operate together to move stands of drill pipe between a setback area of the drill floor and well center for trip in and trip out operations. In some embodiments, the drill floor robot may be configured to engage with and manipulate a lower end of the pipe stand while the racking board robot may be configured to engage with and manipulate an upper end of the pipe stand. In some embodiments, each robot may operate to manipulate an end of the pipe stand without the need for a derrickhand or other human operator to physically handle the pipes. In this way, systems and methods of the present disclosure may provide for safer, more precise, and more efficient pipe handling operations as compared with conventional systems and methods.

Figure 1:
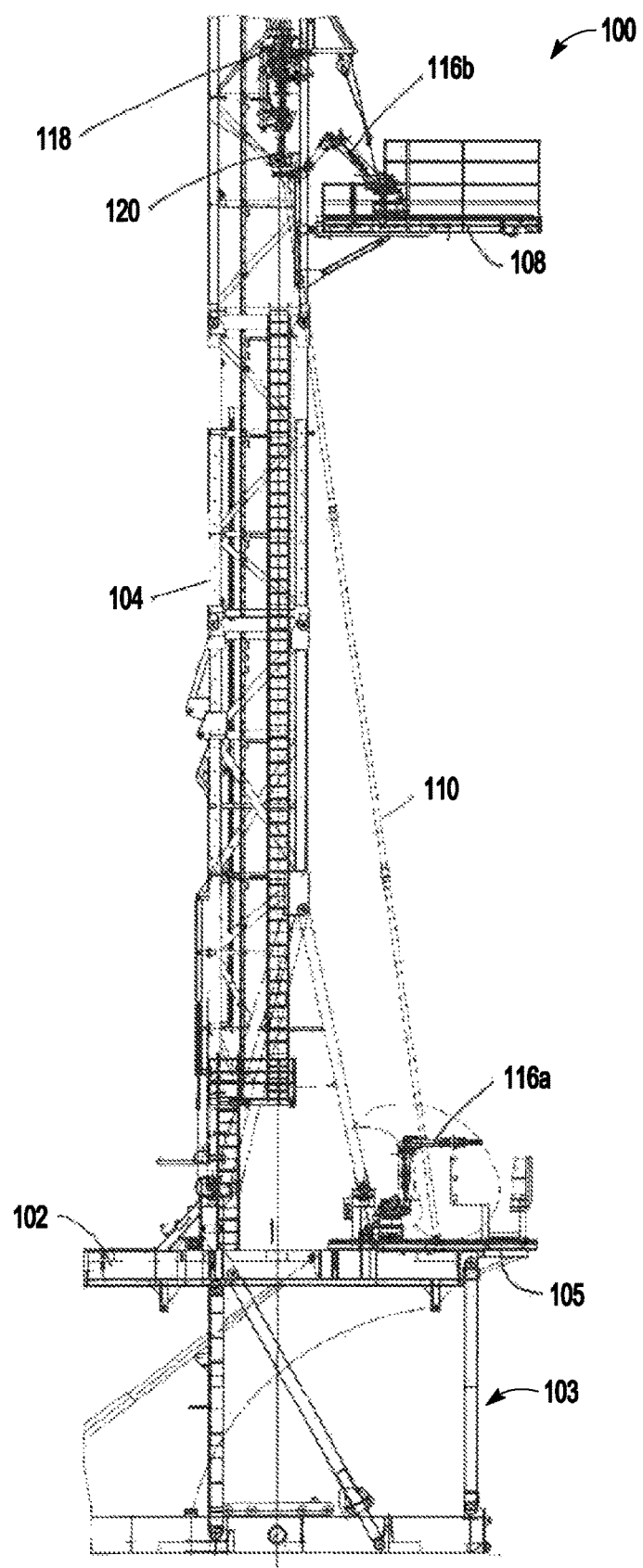
FIG. 1 is a side view of a drill rig having a drill pipe handling system of the present disclosure, according to one or more embodiments.

Turning now to FIG. 1, a drilling rig 100 of the present disclosure is shown. The drilling rig 100 may be configured for onshore oil drilling in some embodiments. However, in other embodiments, other drilling rigs of the present disclosure may be configured for other drilling operations, including offshore drilling. The drilling rig 100 may be configured to be a mobile or stationary rig. The drilling rig 100 may generally have a drill floor 102, a mast 104, and a pipe handling system.

The drill floor 102 may include a platform positioned above or over a well and supported by a substructure 103. The drill floor 102 may be configured to provide a working space for drilling operations and/or a storage space for equipment and drill pipe. The drill floor 102 may have an opening arranged at or near well center for accessing the well during drilling operations. The drill floor 102 may additionally include a setback area 105 configured for receiving and/or storing lengths of drill pipe. For example, lengths of drill pipe may be stored as single stands, or may be combined into double stands, triple stands, quadruple stands, or other sized stands 110, and positioned on end in the setback area 105.

The mast 104 may extend from the drill floor with a height suitable for accommodating and/or building single, double, triple, quadruple, or other sized drill pipe stands. For example, the mast 104 may have a height of up to 50 feet, 100 feet 150 feet, 200 feet, or more. In other embodiments, the mast 104 may have any other suitable height or height range. In some embodiments, a racking board 108 may extend from the mast 104. The racking board 108 may be configured for managing the top portion of pipe stands to maintain or store stands of pipe in a generally organized manner. In some embodiments, pipe stands 110 may be stored with a first or lower end arranged on the drill floor 102 in the setback area 105, and a second end or upper end extending in or through a racking board 108. The racking board 108 may extend laterally from the mast 104 at height of between approximately 30 feet and approximately 200 feet from a ground or pad surface, or between approximately 40 feet and approximately 150 feet, or between approximately 50 feet and approximately 100 feet. In other embodiments, the racking 108 board may extend from the mast 104 at any other suitable height.

Figure 2:
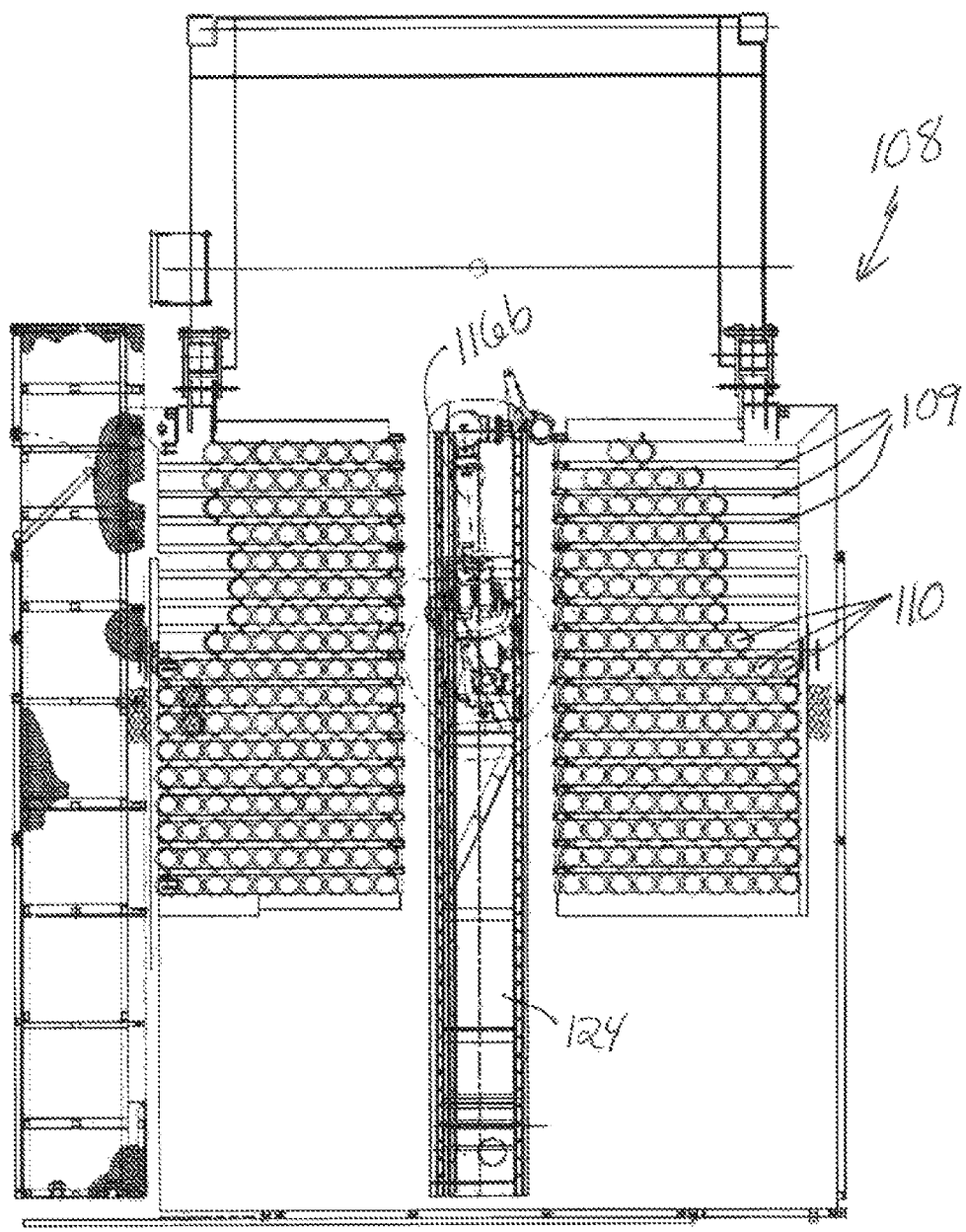
FIG. 2 is an overhead view of a racking board of the present disclosure, according to one or more embodiments.

FIG. 2 shows an overhead view of a racking board 108, according to some embodiments. The racking board 108 may include a plurality of fingers 109, which may be arranged in a parallel configuration, configured to receive stands 110 of pipe therebetween so as to maintain the pipe stands in an upright, on-end configuration. The fingers 109 of the racking board 108 may operate to maintain stands of pipe in organized rows or columns. In particular, the racking board 108 may be configured such that a plurality of pipe stands 110 may be arranged in a row or column between each pair of racking board fingers 109. In some embodiments, pipe stands 110 may be added to the racking board 108 as they are built. The racking board 108 may store the pipe stands 110 until they are added to a drill string during a trip in operation. Moreover, during a trip out operation, pipe stands 110 may be removed from the drill string and added to the racking board 108 until they are either tripped back into the well or disassembled. The racking board 108 may additionally or alternatively be configured to store pipe stands 110 during other operations as well.

With reference back to FIG. 1, the drilling rig may additionally include a pipe handling system. The pipe handling system may be configured for manipulating and moving lengths or stands of pipe, such as for trip in and trip out operations, stand building, and/or other operations. The pipe handling system may include a lifting system, a pipe coupling mechanism 114, and one or more robots or robotic handlers 116.

Figure 3:
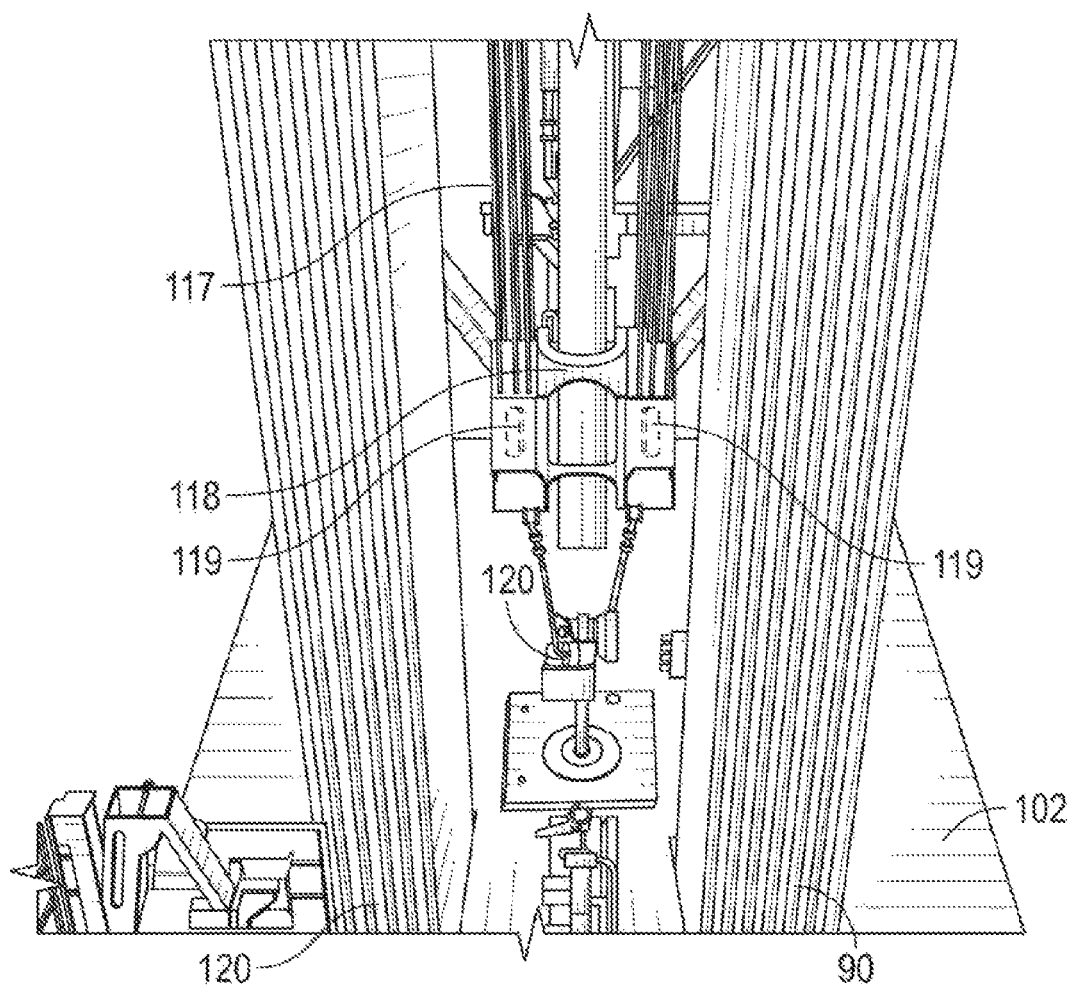
FIG. 3 is a close-up side view of a traveling block and a pipe elevator of the present disclosure, according to one or more embodiments.

The lifting system may be configured for supporting the load of a pipe stand 110 and/or drill string during a trip in, trip out, and/or other pipe handling operation. For example, the lifting system may be configured to support a pipe stand load as robots 116 or operators maneuver the pipe stand 110 between a racking board 108 and a well center. The lifting system may include a drill line or cable extending from a draw works. The drill line may be reeved between a crown block, arranged at or ear a top of the mast 104, and a traveling block 118, arranged beneath the crown block and within the mast. In some embodiments, the drill line may be a main or primary line that may be otherwise configured for use during drilling operations using a top drive, for example. A pipe elevator 120 configured for coupling to a drill pipe may extend from the traveling block 118. In some embodiments, the pipe elevator 120 may be incorporated into a top drive, which may be coupled to the traveling block 118 via a hook dolly or the pipe elevator 120 may be more directly coupled to the traveling block 118 via a hook dolly. In either case, the traveling block 118 may be configured to raise and lower the pipe elevator 120, so as to raise and lower a length or stand of pipe 110, between the drill floor 102 and the crown block. FIG. 3 shows a close-up view of the traveling block 118 arranged on the main drill line 117, and the pipe elevator 120 extending from the traveling block. As shown, the traveling block 118 may include one or more sheaves 119 through which the main drill line 117 may be reeved.

The pipe handling system may include one or more mechanisms for coupling and/or decoupling lengths of drill pipe. In particular and with reference to FIG. 4, one or more iron roughnecks 114 may be arranged on the drill floor 102. For example, an iron roughneck 114 may be arranged on the drill floor 102 near well center, and may be configured to reach drill pipe stands 110 above or on the drill floor. The iron roughneck may be configured to couple stands 110 of drill pipe together to form the drill string, such as during a trip in operation, and/or may be configured to decouple stands of drill pipe from the drill string, such as during a trip out operation. The iron roughneck 114 may additionally operate to couple lengths of drill pipe together to form a pipe stand 110, and/or to decouple lengths of pipe to deconstruct a stand. The iron roughneck 114 may generally have static and torque wrenches configured to screw together pipe lengths with threaded ends. In other embodiments, the pipe handling system may include additional or alternative pipe coupling devices or mechanisms.

Each robot 116 (e.g., racking board robot and drill floor robot) may be configured to manipulate drill pipe lengths or stands 110, drill collar, and/or other piping. The robots 116 may each be programmable for carrying out particular sequences of operations. A handling system 106 may have one, two, three, four, or any other suitable number of robots 116. For example, a pipe handling system of the present disclosure may include a first robot 116a arranged on or near the drill floor 102, and a second robot 116b arranged on or near the racking board 108. In some embodiments, two robots 116 may be generally aligned with one another. For example, the racking board robot 116b may be centrally arranged on a racking board 108, and the drill floor robot 116a may be positioned in a setback area 105 of the drill floor 102 beneath and generally aligned with the racking board robot. In other embodiments, robots 116 may be positioned differently, but may generally be arranged in corresponding configurations. In some embodiments, robots 116 may be arranged in corresponding pairs, with an upper or racking board robot 116b configured to handle an upper end of piping and a corresponding lower or drill floor robot 116a configured to handle a lower end of piping.

Figure 4A:
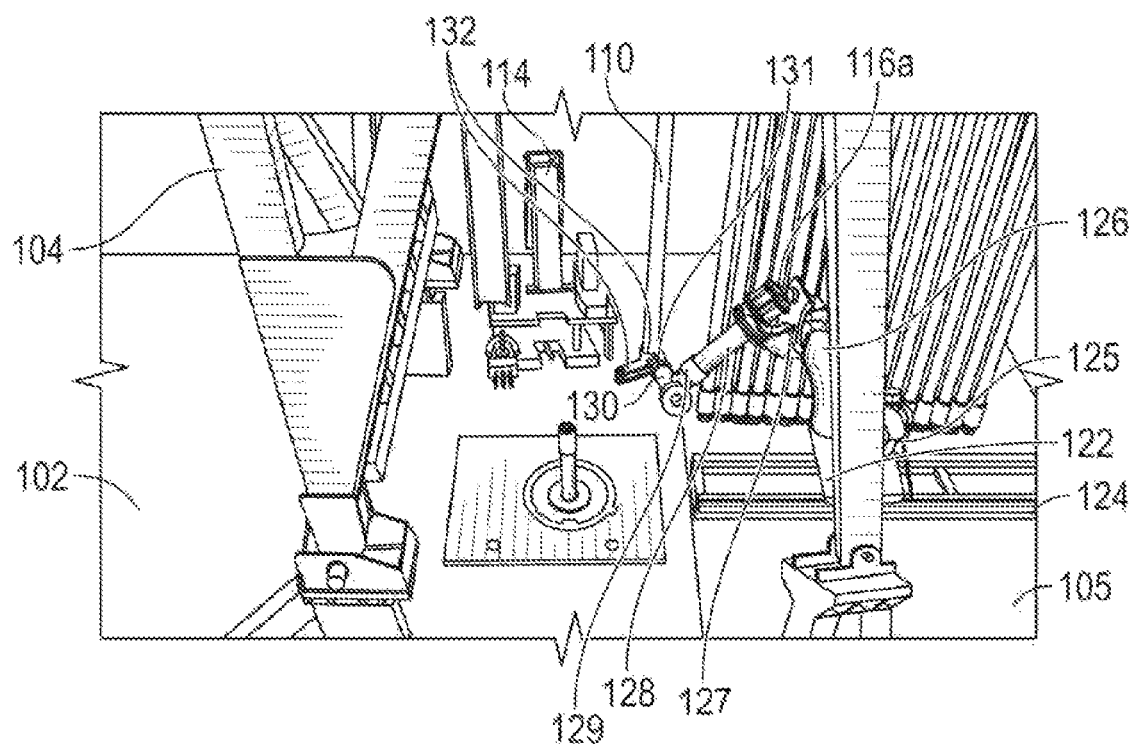
FIG. 4A is a side view of a pipe handling robot of the present disclosure arranged on a drill floor, according to one or more embodiments.
Figure 4B:
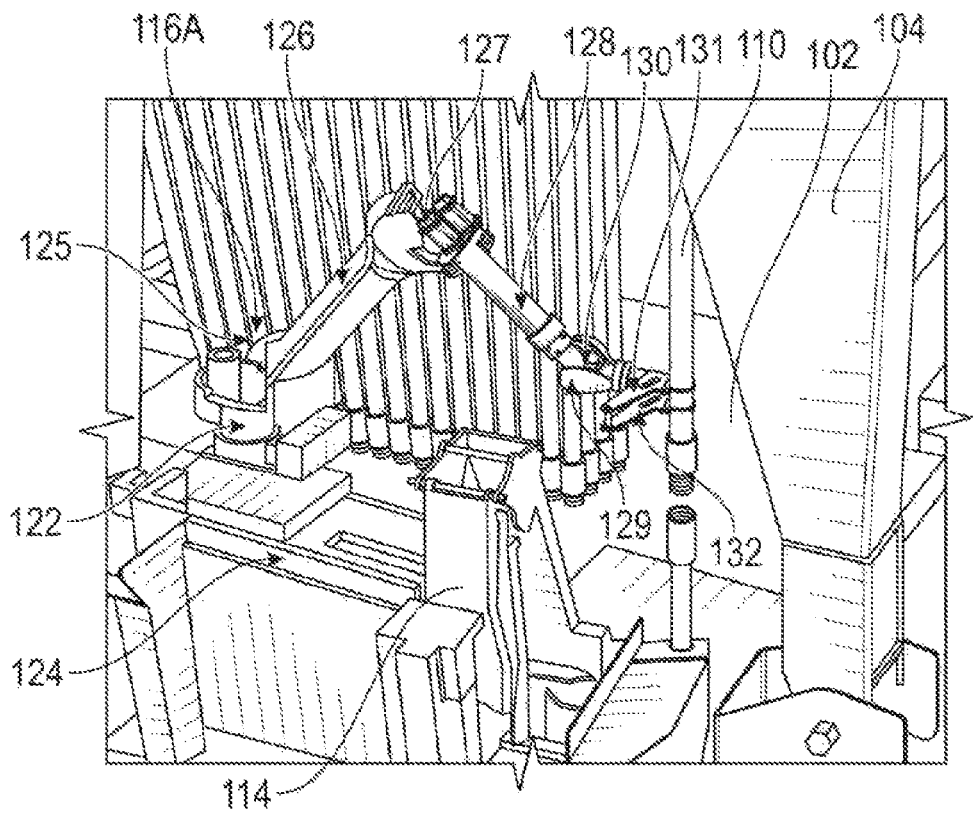
FIG. 4B is another side view of the pipe handling robot of FIG. 4A, according to one or more embodiments.
Figure 5A:
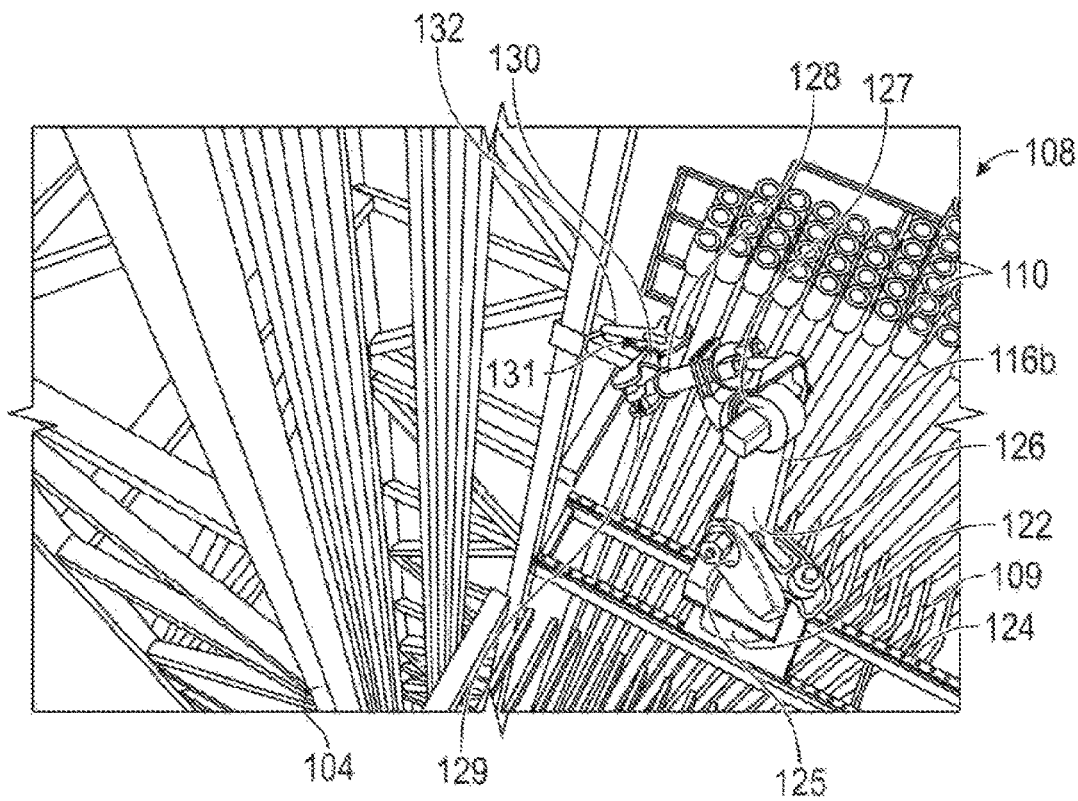
FIG. 5A is a perspective view of a pipe handling robot of the present disclosure arranged on a racking board, according to one or more embodiments.
Figure 5B:
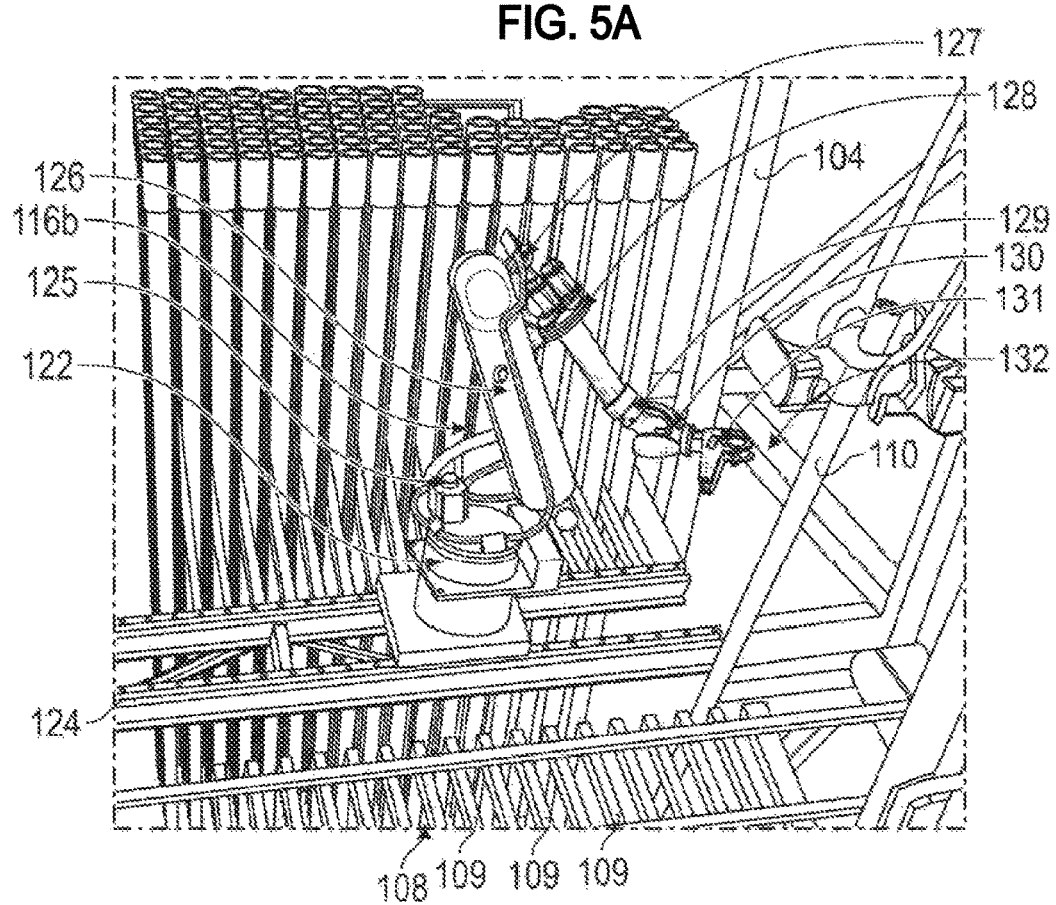
FIG. 5B is another side view of the pipe handling robot of FIG. 5A, according to one or more embodiments.

FIG. 4 shows an embodiment of a robot 116a arranged on the drill floor 102, according to one or more embodiments. The drill floor robot 116a may be configured for handling a first end of pipe stands 110, the first end being an end positioned closest the drill floor 102 when the pipe stands are arranged within the racking board 108. In some embodiments, the first end of the pipe stand 110 may be referred to as a lower end. FIG. 5 shows an embodiment of a robot 116b arranged on the racking board 108, according to one or more embodiments. The racking board robot 116b may be configured for handling a second end of pipe stands 110, the second end being an end positioned closest the racking board 108 when the pipe stands are arranged within the racking board. In some embodiments, the second end of the pipe stand 110 may be referred to as an upper end. As shown in FIGS. 4 and 5, each of the robots 116 may include a base portion 122, which may be arranged on a track 124. The robots 116 may additionally each include a shoulder portion 126, an articulated arm 128, a wrist portion 130, and an end effector 132. Each robot 116 may have a reach capacity of between approximately 4 feet and approximately 20 feet, or between approximately 6 feet and approximately 15 feet, or between approximately 8 feet and approximately 10 feet. In other embodiments, each robot 116 may have any other suitable reach capacity. Moreover, each robot 116 of the present disclosure may have a load capacity at full reach of between approximately 200 pounds and approximately 900 pounds, or between approximately 300 pounds and approximately 700 pounds, or between approximately 400 pounds and approximately 500 pounds. In other embodiments, each robot 116 may have any other suitable load capacity at full reach.

The base portion 122 of each robot 116 may be configured to couple the robot to the drill floor 102, racking board 108, or another suitable location on the drilling rig 100. In some embodiments, the base portion 122 may additionally be configured to facilitate movement of the robot 116 on the drill floor 102, racking board 108, or other surface of the drill rig 100. For example, the base portion 122 may be configured to engage with a track 124 or rail, as shown in FIGS. 4 and 5. The base portion 122 may have skids or rollers configured for sliding engagement with the track 124. The track 124 may provide a first axis of movement. In some embodiments, the track 124 may provide a second axis of movement, such that the base portion 122 may move in both an X-direction and a Y-direction. In some embodiments, the track 124 may be positioned so as to be centrally arranged with respect to stored pipe stands 110. For example, where pipe stands 110 are stored on two sides of a racking board 108 and/or setback area 105, the track 124 may be centrally aligned between the two sides, such that the robot may readily access pipe stands stored on both sides of the racking board and/or setback area. In particular, the track 124 may be arranged between a driller's side and an off-drillers side of the setback area 105, and may provide an axis of movement extending between the well center and an edge of the drill floor. The track 124 may have a length of between approximately 1 foot and approximately 20 feet, or between approximately 2 feet and approximately 15 feet, or between approximately 3 feet and approximately 10 feet. In at least one embodiment, the track 124 may have a length of approximately 13 feet. In some embodiments, the track 124 of either or both robots 116 may have a length equal to or slightly larger or slightly smaller than a length of the racking board 108. In some embodiments, the robots 116 may have tracks 124 of equal length and configuration, while in other embodiments an upper robot 116b may have a track with a different length and/or different configuration than that of a lower robot.

It is to be appreciated that in other embodiments, the base portion 122 may have other movement means for moving the robot 116 along a drill floor 102, racking board 108, or other surface. For example, the base portion 122 may have wheels or treads or may be configured with a walking mechanism. In still other embodiments, other movement means are contemplated as well.

Each robot 116 may have a shoulder portion 126 extending from the base portion 122. The shoulder portion may couple to the base portion via a joint 125, which may be a swivel joint in some embodiments. The swivel joint 125 may allow the shoulder portion 126 to twist or rotate about a central axis with respect to the base portion 122. In some embodiments, the shoulder portion 126 may be configured to twist up to 360 degrees, up to 270 degrees, up to 180 degrees, up to 90 degrees, up to 45 degrees, or up to a different suitable degree of rotation. In other embodiments, the shoulder portion 126 may couple to the base portion 122 with a different joint, or the shoulder may couple to the base portion without a joint. The shoulder portion 126 may extend generally upward from the base portion 122, and in some embodiments, may extend upward at an angle, such that a longitudinal axis of the shoulder portion may be offset from a longitudinal axis of the base portion by approximately 10, 15, 20, 25, 30, 35, 40, 45 degrees, or any other suitable degree of offset. The shoulder portion 126 may have a length of between approximately 12 inches and approximately 100 inches, or between approximately 18 inches and approximately 75 inches, or between approximately 24 inches and approximately 60 inches.

The articulated arm 128 may extend from the shoulder portion 126. In particular, where the shoulder portion 126 couples at a first, or proximal, end to the base portion 122, the articulated arm 128 may extend from a second, or distal, end of the shoulder portion. A joint or elbow 127, which may be a pitch joint, may be arranged between the articulated arm 128 and the shoulder portion 126. The pitch joint 127 may allow the articulated arm 128 to pivot with respect to the shoulder portion 126 about an axis extending lateral to the shoulder portion and articulated arm. In some embodiments, the pitch joint 127 may allow the articulated arm 128 to pivot within a range of up to 360 degrees, up to 270 degrees, up to 180 degrees, up to 90 degrees, up to 45 degrees, or up to any other suitable degree of rotation. In other embodiments, the articulated arm 128 may couple to the shoulder portion 126 via a different joint or without a jointed connection. The articulated arm may have a length of between approximately 20 inches and approximately 100 inches, or between approximately 28 inches and approximately 75 inches, or between approximately 35 inches and approximately 50 inches.

The wrist portion 130 may extend from the articulated arm 128. For example, where the articulated arm 128 couples at a first, or proximal, end to the shoulder portion 126, the wrist 130 may extend from a second, or distal, end of the articulated arm. A joint 129 may be arranged between the wrist portion 130 and the articulated arm 128 and may provide for pivotable or rotational movement of the wrist with respect to the articulated arm about one or more axes. The joint 129 may be or include a pitch joint allowing for pivotable movement about a first lateral axis extending lateral to the articulated arm 128 and wrist 130, a yaw joint allowing for pivotable movement about a second lateral axis perpendicular to the first lateral axis, and/or a roll joint allowing for pivotable or rotational movement about an axis extending longitudinally through the wrist portion. The wrist portion 130 may have pivotable or rotational movement about each axis within a range of up to 360 degrees, up to 270 degrees, up to 180 degrees, up to 90 degrees, up to 45 degrees, or up to any other suitable degree of rotation. In other embodiments, the wrist portion 130 may couple to the articulated arm 128 via a different joint or without a jointed connection. The wrist 130 may be configured to provide a mechanical interface or mounting point for coupling an end effector 132 to the robot 116. In some embodiments, a joint 131, such as a pitch, yaw, and/or roll joint, may allow for pivotable movement of the end effector with respect to the wrist portion.

Figure 6:
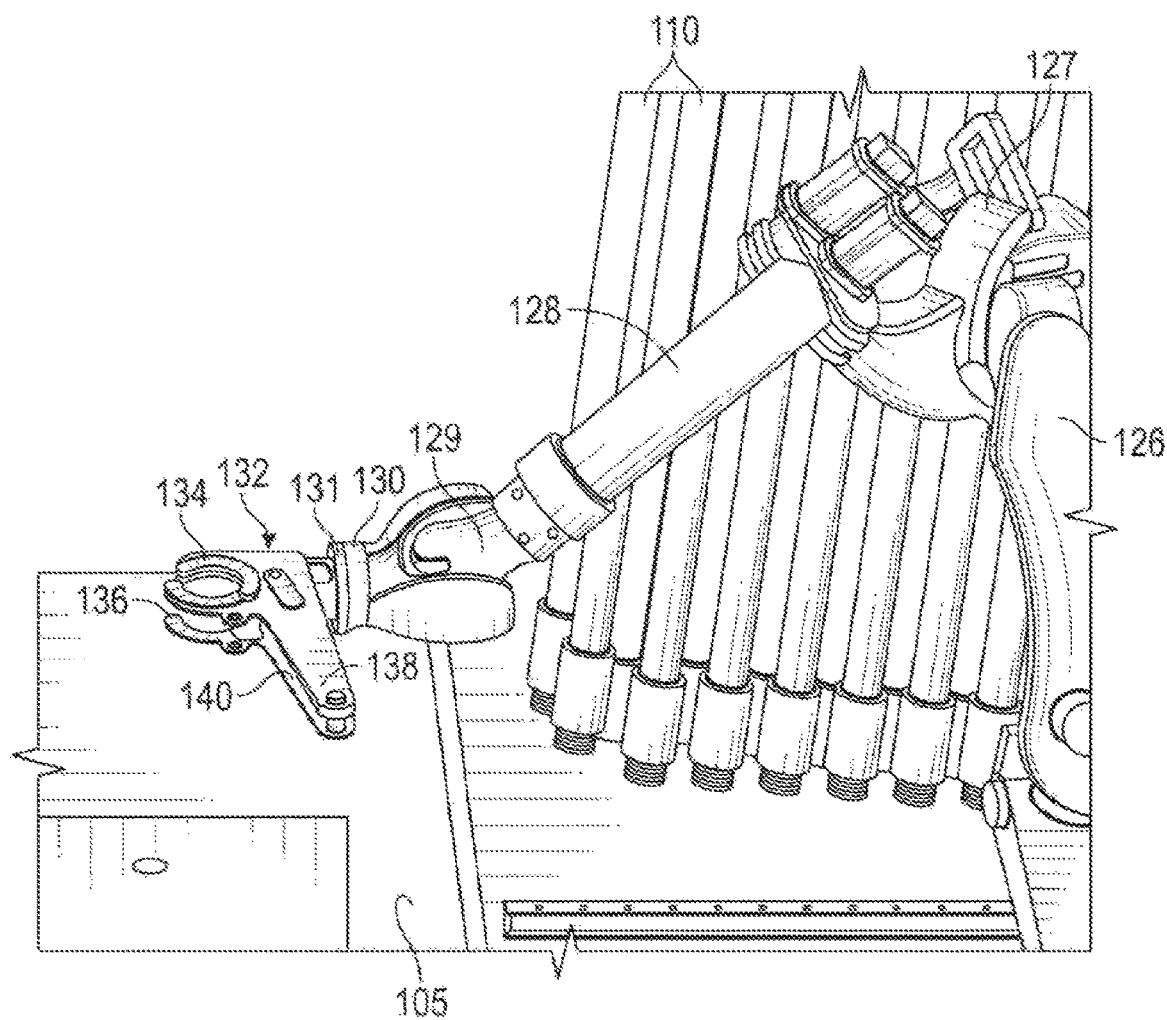
FIG. 6 is a close-up view of an end effector of a pipe handling robot of the present disclosure, according to one or more embodiments.
Figure 7A:
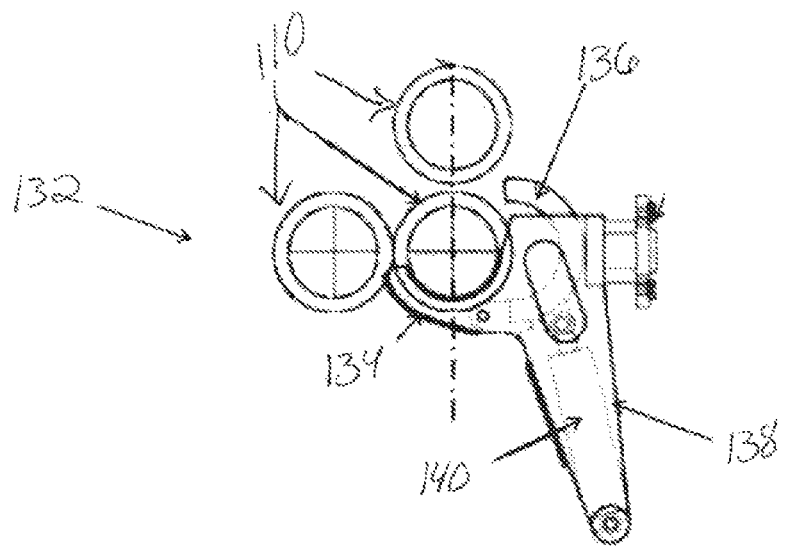
FIG. 7A is a side view of an end effector of the present disclosure approaching a pipe stand in an open position, according to one or more embodiments.
Figure 7B:
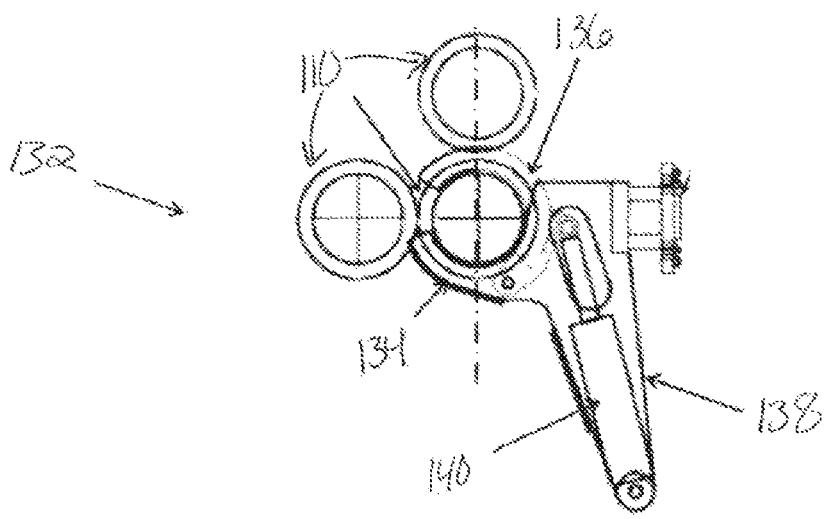
FIG. 7B is a side view of the end effector of FIG. 7A in a closed position around the pipe stand, according to one or more embodiments.

The end effector 132 may extend from the wrist portion 130 and may be configured to provide an operational or tooling hand for various operations performed by the robot 116. For example, in some embodiments, the end effector 132 may include a movable claw or gripper configured for grasping objects. FIG. 6 shows a close-up view of an end effector 132. FIGS. 7A and 7B show additional view of the end effector 132. The end effector 132 may be configured for handling lengths or stands of drill pipe, drill collar, and/or other piping. As shown in FIG. 6, the end effector 132 may have a first finger 134, which may be a fixed or stationary finger, and a second finger 136, which may be a movable finger. The movable finger 136 may have a hinged connection to the stationary finger 134. In some embodiments, the movable finger 136 may have a hinged connection to a bracket 138 of the end effector. An actuator 140, such as a hydraulic cylinder, lead screw mechanism, ball screw mechanism, or other actuator may be configured to pivot the movable finger 136 about its hinged connection.

The fingers 134, 136 may each have a curved shape with an inner contour sized and configured to receive a pipe stand. Inner contours of the two fingers 134, 136 may have a same radius of curvature for receiving a same pipe size or range of pipe sizes. The two fingers 134, 136 may be arranged such that their inner contours curve toward one another to form a closed or substantially closed loop. The movable finger 136 may be configured to pivot between an open configuration and a closed configuration. In an open configuration, as shown in FIG. 7A, the movable finger 136 may pivot away from the fixed finger 134 such that a pipe stand 110 may be received between the two fingers. In a closed configuration, the fingers 134, 136 may be configured to form a closed loop or partially closed loop, so as to close around an outer wall of a pipe stand 110.

In some embodiments, the fingers 134, 136 may be sized and shaped to receive a particular pipe diameter or a particular range of pipe diameters. In some embodiments, the end effector 132 may have a coating on one or more surfaces to facilitate handling operations. For example, the end effector 132 may have a low-friction coating arranged on an inner contour surface of the movable finger and/or fixed finger. A low-friction coating may include wearable fluoro-plastic or another relatively low-friction metallic alloy having a static coefficient of friction against pipe steel of less than 0.2, for example. Other relatively low-friction coatings or materials may be used as well. Such a low-friction coating may facilitate sliding engagement of the end effector with a pipe, for example. In this way, a pipe section may be free to rotate or pivot while engaged by the end effector. In other embodiments, the end effector 132 may have a high-friction coating or surface to facilitate gripping operations. Other coatings may be used as well.

In some embodiments, the end effector 132 may be configured to engage with one pipe stand 110 at a time without disturbing, or substantially without disturbing, adjacent or nearby pipe stands. For example, the movable finger 136 may have a thickness or width configured to slide between a pair of pipe stands 110 stored in the racking board 108 so as to close around a single pipe stand without disturbing an adjacent pipe stand. FIGS. 7A-7B illustrate the end effector 132 sleeving around a pipe stand 110. As shown in FIG. 7A, the end effector 132 may approach the pipe stand 110 with its movable finger 136 in an open configuration. With the movable finger 136 in an open configuration, the robot 116 may position the fixed finger 134 around the pipe stand 110, and may then close the movable finger around the pipe stand, as shown in FIG. 7B. The movable finger 136 may slide between the pipe stand 110 and an adjacent pipe stand. In this way, it is to be appreciated that the end effector 132 may also be configured to position a pipe stand 110 on the setback area 105 and/or within the racking board 108 without disturbing, or substantially without disturbing, other pipe stands stored nearby.

In other embodiments, one or more robots of the present disclosure may have a different end effector or tooling end. In some embodiments, the mechanical interface between the end effector and the wrist portion may allow the end effector to be readily removed by an operator. For example, the mechanical interface may include a threaded connection, clamped connection, a ball and plunger mechanism, and/or any other suitable connection or mechanism allowing for the end effector to be disconnected from the wrist portion on demand. In this way, an operator may remove and replace the end effector as needed.

In some embodiments, the end effector 132 may have one or more sensors or feedback devices. For example, a proximity sensor or other electromagnetic sensor may be arranged on or about the claw for detecting a presence of a pipe or other object positioned within the claw. Additionally or alternatively, a contact switch or other position sensor may be arranged on or about the claw for detecting an open or closed position of the movable finger 136. Each robot 116 may have other sensors and/or feedback devices, such torque feedback devices, proximity sensors, position sensors, and/or other devices or sensors configured to indicate other movements or conditions.

It is to be appreciated that each robot 116 may have a plurality of movable components and/or a plurality of movement axes with respect to each movable component. In some embodiments, each movable component and/or each axis of movement may be independently controllable and may be configured for coordinate movement with another robot or system. In some embodiments, one or more components or axes of movement may be actively controlled during a pipe handling operation. That is, a controller may be configured to actively control a position of the end effector 132, wrist portion 130, articulated arm 128, and/or other components of the robot(s). In some embodiments, one or both end robot end effectors 132 may be actively controlled during a pipe handling operation. In particular, a position and angle of the end effector 132 at joint 131 may be controlled to maintain a vector extending perpendicularly between the end effector fingers in parallel or near-parallel alignment with the pipe stand. This may help ensure that the end effector 132 can smoothly grab onto and release the pipe stand. Additionally, this may help to reduce excess torsion on the robots themselves.

In some embodiments, one or more components or axes of movement of the robot(s) may be permitted to experience free movement. For example, in some embodiments, the end effector 132 of a robot 116 may be permitted to pivot or rotate freely at joint 131 with respect to the wrist 130. In this way, movement at the end effector/wrist joint 131 may freely respond to a position of the articulated arm 128 and wrist 130, a position and angle of a pipe stand 110 engaged by the end effector 132, and/or other factors. In particular, to accommodate tilting of the pipe stand 110, the robot 116 may be configured or programmed to minimize torque applied by the stand while it is engaged by the end effector 132. This may be accomplished, for example, by relaxing (i.e., not powering) an actuator controlling position of the joint 131.

In some embodiments, the pipe handling system may have one or more controllers, each configured for controlling one or more components of the pipe handling system. For example, each of the lifting system, iron roughneck, drill floor robot, and racking board robot may have a controller controlling operations thereof. Each controller may be in wired or wireless communication with one or more associated components of the handling system. For example, a controller may be associated with at least one robot 116 and may be encoded with instructions for controlling a position of the robot on the track 124, a position of the shoulder portion 126, a position of the articulated arm 128, a position of the wrist 130, a position of the end effector 132, and/or a position of the movable finger 136 or other movable component(s) of the end effector. The controller may additionally be configured to receive feedback from one or more feedback devices or sensors. In some embodiments, the controller may be configured to respond to received feedback or sensor information by, for example, making one or more position adjustments of the robot 116.

As described in more detail below with respect to particular methods of operation, a pipe handling system of the present disclosure, or components thereof, may be configured to operate as a coordinated system. For example, two robots, such as an upper robot and a lower robot, may operate together to manipulate a single pipe stand, with the upper robot manipulating an upper end of the pipe stand and the lower robot manipulating a lower end of the pipe stand. Movements of the two robots may be coordinated such that the two robots may operate as a team. The two robots may additionally operate in conjunction with operation of a lifting system to handle the load of the pipe stand and to raise/lower the pipe stand as needed to facilitate operations. An iron roughneck may additionally be operated in conjunction with the robots and/or lifting system to perform coordinated operations. This coordination of the various components of a pipe handling system of the present disclosure may be appreciated with particular reference to FIGS. 8-16 and the following discussion.

In use, a pipe handling system of the present disclosure may facilitate drill pipe and/or drill collar handling operations, such as trip in and trip out operations, stand building operations, and/or other pipe handling operations on a drilling rig.

Figure 8:
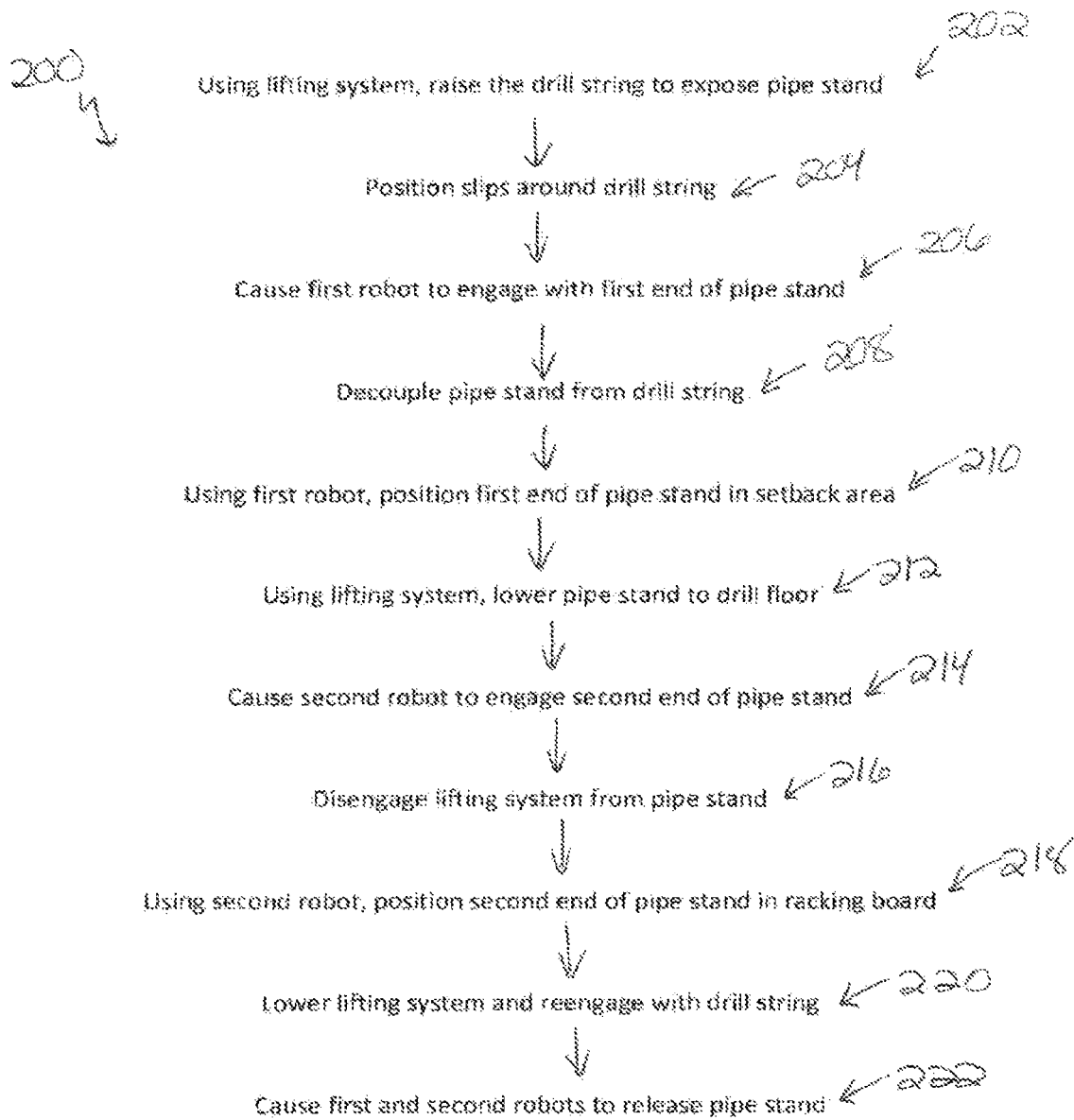
FIG. 8 is a flow diagram of a trip-out operation of the present disclosure, according to one or more embodiments.

For example, FIG. 8 illustrates a flow diagram of a trip out operation performable using a pipe handling system of the present disclosure, according to one or more embodiments. As described above, a trip out operation may include disconnecting pipe stands from a drill string. A trip out operation may be performed to replace or change out a drill bit or other downhole components, for example. A trip out operation may also be performed after drilling is completed in a well. There may be other reasons to perform a trip out operation as well. The method 200, or portions thereof, may be encoded on one or more controllers as computer executable instructions. In some embodiments, the method 200, or portions thereof, may be performable by an operator such as a human operator controlling components of the pipe handling system. The method 200 may include the steps of using a lifting system, raising the drill string to expose a pipe stand 202; positioning slips around the drill string 204; causing a first robot to engage with a first end of the pipe stand 206; decoupling the pipe stand from the drill string 208; using the first robot, position the first end of the pipe stand in a setback area 210; using the lifting system, lowering the pipe stand to the drill floor 212; causing a second robot to engage a second end of the pipe stand 214; disengaging the lifting system from the pipe stand 216; using the second robot, positioning the second end of the pipe stand in a racking board 218;

lower the lifting system and reengage with the drill string 220; and causing the first and second robots to release the pipe stand 222. FIGS. 9A-9I illustrate many steps of the method 200 with respect to the drilling rig 100.

Figure 9A:
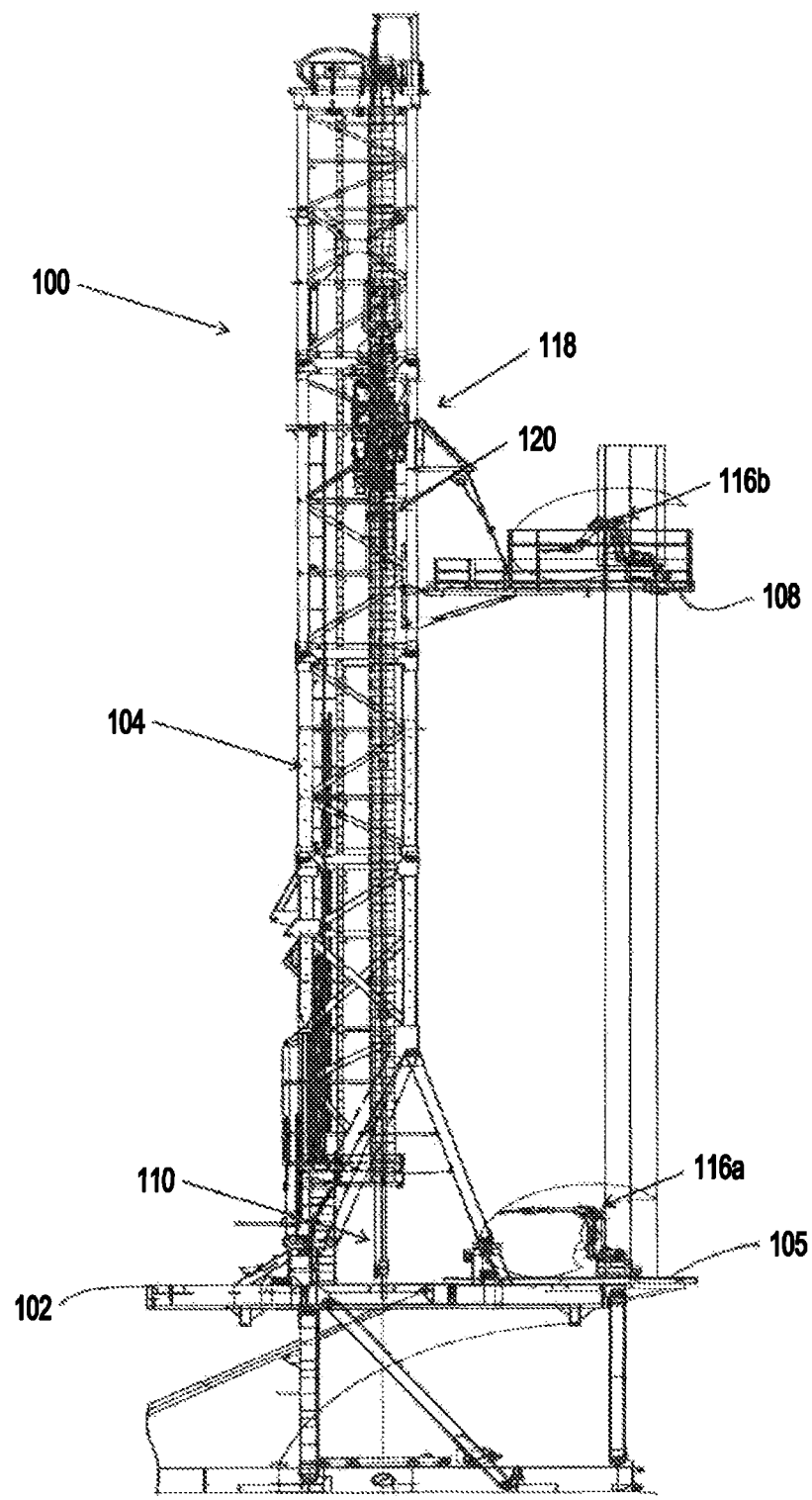
FIG. 9A is a side view of a drilling rig having a pipe handling system of the present disclosure with a pipe stand engaged by a pipe elevator, according to one or more embodiments.

As described above, the lifting system may be or include an elevator coupled to a traveling block, a lifting hook, a main line, an auxiliary line, an auxiliary lifting arm or claw, and/or any other suitable lifting or hoisting mechanism. In some embodiments, different components of the lifting system, or different lifting systems, may be used for different lifting operations throughout the method or other methods described herein. Raising the drill string (202) may include raising a pipe elevator, or another suitable lifting apparatus, coupled to the drill string. The lifting system may raise the drill string far enough out of the well to expose above the drill floor a first pipe stand, or length of pipe, to be disconnected from the chill string. FIG. 9A illustrates a pipe elevator 120 raised high enough to expose a pipe stand 110 above the drill floor 102. With the pipe stand exposed, slips may be placed around the drill string (204) below the pipe stand to maintain a position of the drill string with respect to the drill floor and thus prevent the drill string from falling back into the well. The slips may generally be wedged between an outer diameter of the drill string and an inner diameter of an opening in the drill floor. In some embodiments, the slips may be placed manually by an operator. In other embodiments, a robot may be used to position the slips. In other embodiments, another suitable mechanism for holding a position of the drill string may be used.

Figure 9B:
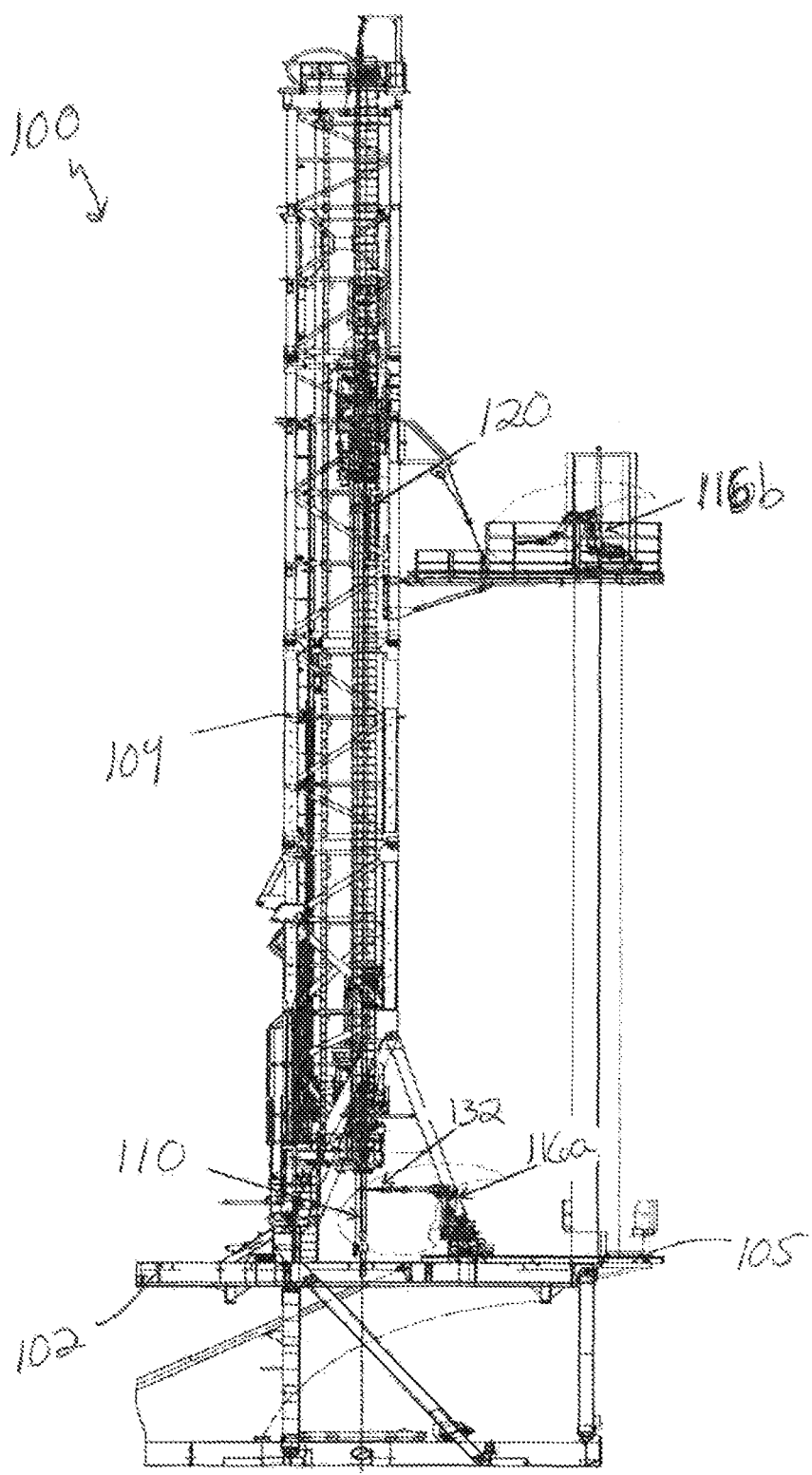
FIG. 9B is a side view of the drilling rig of FIG. 9A with a first pipe handling robot engaging with a lower end of the pipe stand, according to one or more embodiments.
Figure 9C:
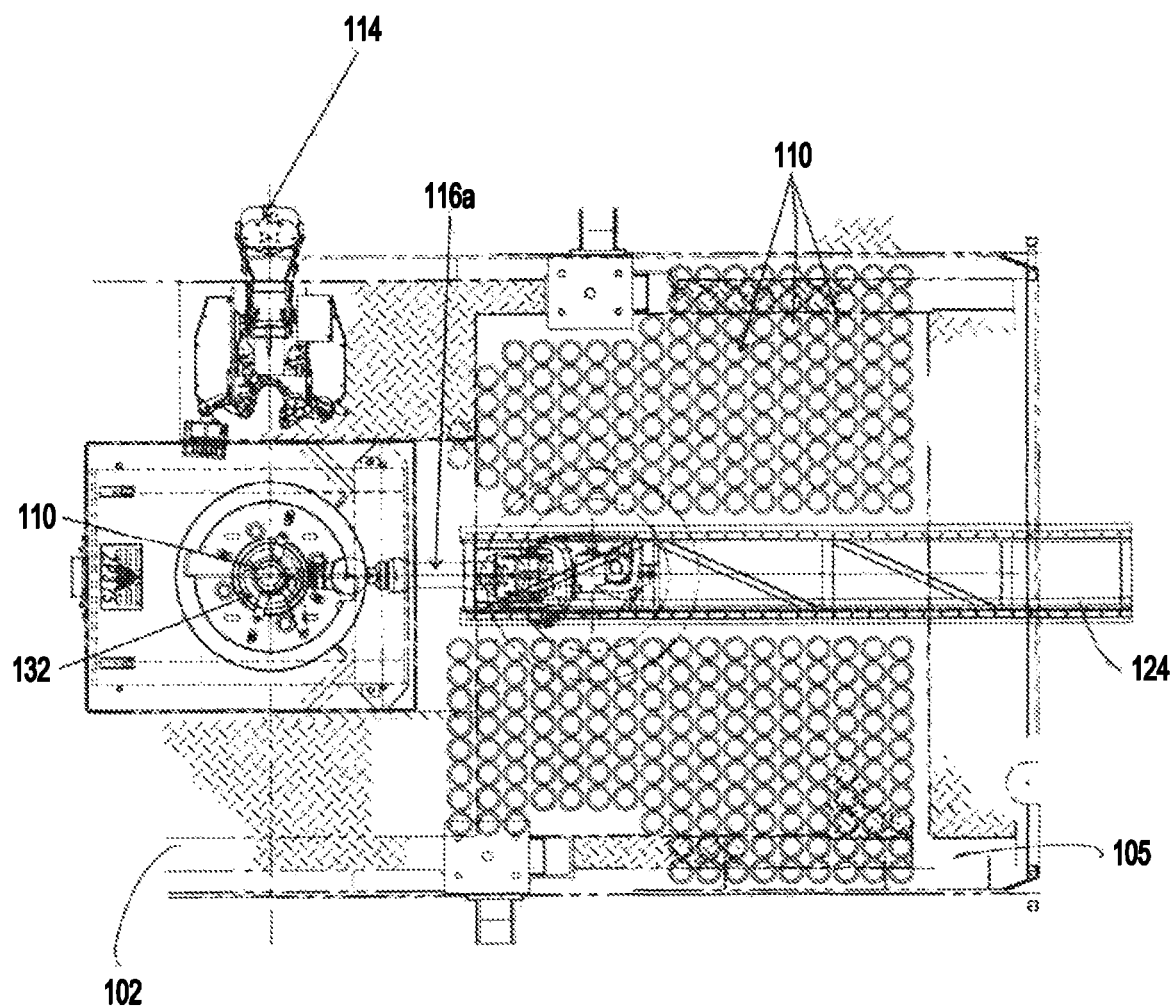
FIG. 9C is an overhead view of the drill floor of the drilling rig of FIG. 9A with the first robot engaging with a lower end of the pipe stand, according to one or more embodiments.

With the pipe stand exposed, a first robot, which may be a lower robot positioned on or near the drill floor, may be directed to engage with a first end of the pipe stand (206). The first end of the pipe stand may be an end of the stand located nearest the drill floor and coupled to the remainder of the drill string. The first end of the pipe stand may be referred to herein as a lower end. To engage with the pipe stand, the drill floor robot may be directed to move, on its track or other moving mechanism, toward well center. The articulated arm may be used to reach toward the pipe stand. FIG. 9B illustrates the lower robot 116a arranged on the drill floor 102 and positioned to engage the pipe stand. As additionally shown in FIG. 9B, the end effector 132 of the lower robot 116a may be controlled to grasp the lower end of the pipe stand 110. In particular, the end effector may be controlled to open or extend the movable finger, position the pipe stand between the movable finger and the fixed finger, and close or retract the movable finger. FIG. 9C shows an overhead view of the lower robot 116a with its end effector 132 engaged around the pipe stand 110. Decoupling the exposed pipe stand from the remainder of the drill string (208) may include directing an iron roughneck to disconnect the pipe stand. FIG. 9C shows an iron roughneck 114 arranged on the drill floor 102 that may be used to decouple the drill exposed pipe stand 110 from the drill string. In other embodiments, a robot or one or more operators may disconnect the pipe stand from the drill string. It is to be appreciated that with the pipe stand disconnected from the drill string, the pipe elevator or other lifting system may still be supporting the weight of the pipe stand.

Figure 9D:
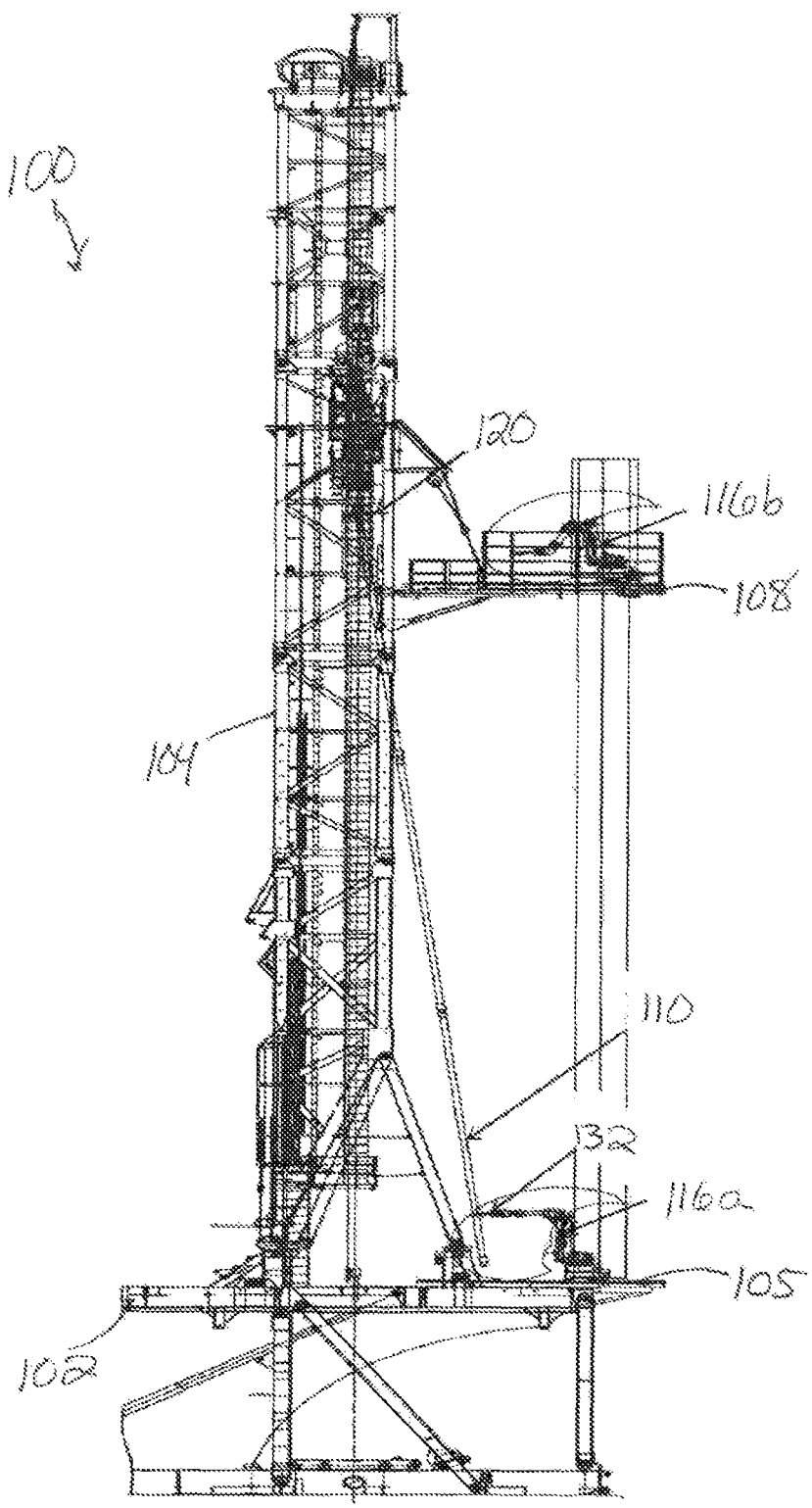
FIG. 9D is a side view of the drilling rig of FIG. 9A with the first robot maneuvering the lower end of the pipe stand toward a setback area of the drill floor, according to one or more embodiments.

With the pipe stand disconnected from the drill string, the first robot may move to position the first end of the pipe stand in the setback area of the drill floor, beneath the racking board (210). In particular, the first robot may move along its track or other moving apparatus away from the well center to a setback area of the drill floor. The articulated arm may move to position the lower end of the pipe stand beneath the racking hoard. In some embodiments, the first robot may position the lower end of the pipe stand aligned with or near a particular racking location where the pipe stand is to be stored in the racking board. FIG. 9D illustrates the lower robot 116a positioning the lower end of the pipe stand 110 beneath the racking board 108. The lifting system may be used to lower the pipe stand to the drill floor (212), so as to transfer the load of the pipe to the drill floor. The lower end of the pipe stand may be lowered to a particular location in the setback area, as positioned by the lower robot, where the pipe stand will be stored with respect to the racking hoard. In one or more embodiments, the elevator 120 may swing laterally away from well center to move the top of the pipe stand closer to the racking board and helping to facilitate placement of the bottom of the pipe stand in the set back area.

Figure 9E:
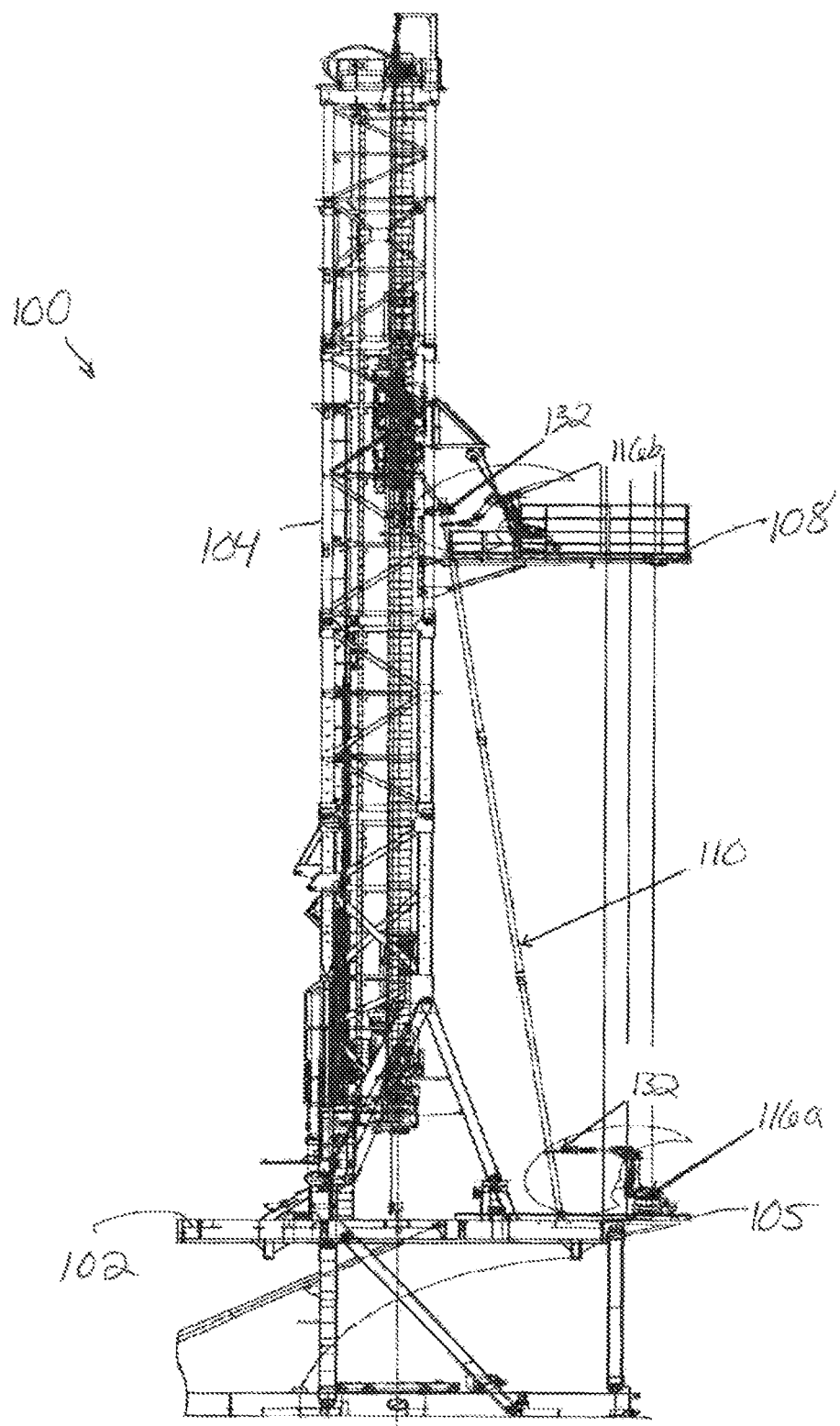
FIG. 9E is a side view of the drilling rig of FIG. 9A with a second pipe handling robot engaging with an upper end of the pipe stand, according to one or more embodiments.
Figure 9F:
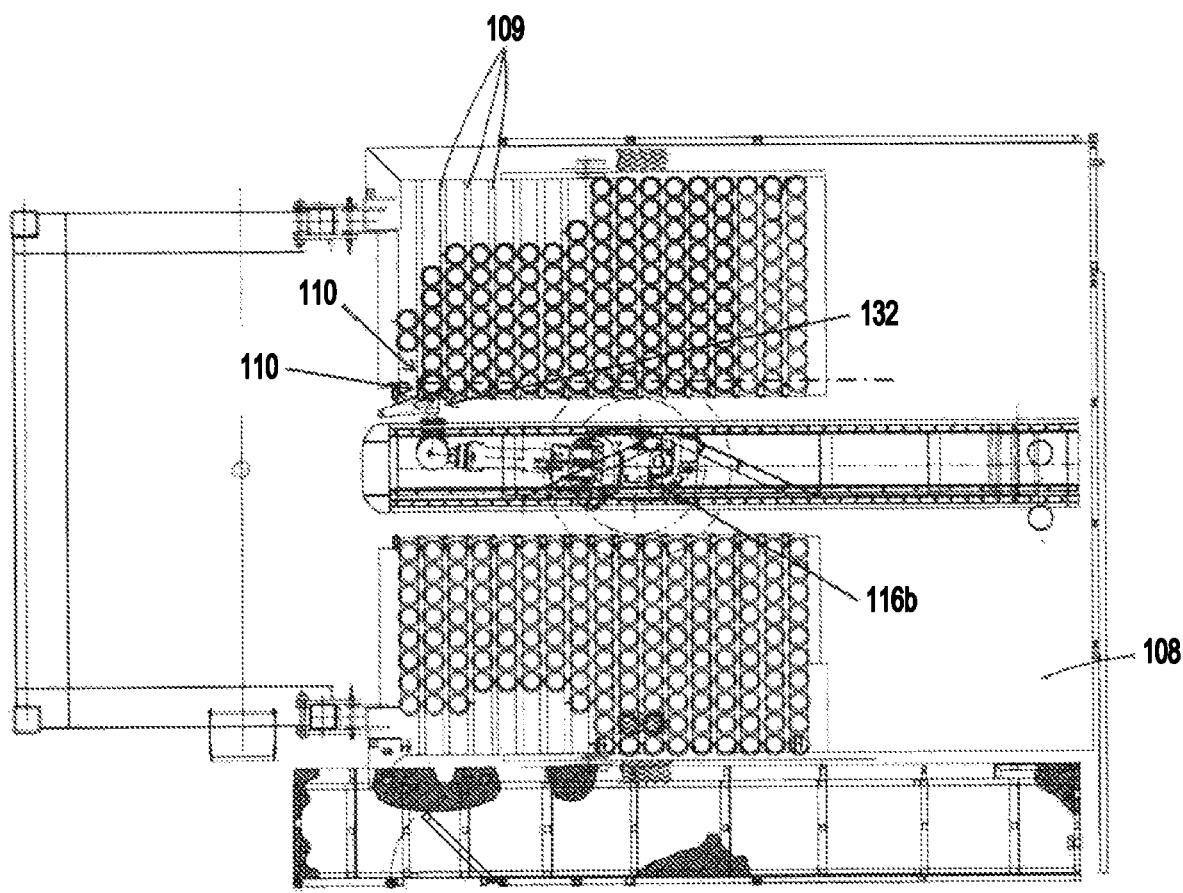
FIG. 9F is an overhead view of the racking board of the drilling rig of FIG. 9A, with the second robot maneuvering the upper end of the pipe stand toward a racking location, according to one or more embodiments.

Additionally, the second robot, which may be an upper robot arranged on or near the racking board, may be directed to engage a second end of the pipe stand (214). The second end of the pipe stand may be an end opposing the first end, arranged furthest from the drill floor and/or nearest the racking board. The second end of the pipe stand may be referred to herein as the upper end. To engage with the pipe stand, the upper robot may be directed to move, on its track or other moving mechanism, toward well center. The articulated arm may be used to reach toward the pipe stand. FIG. 9E illustrates the upper robot 116b arranged on the racking board 108 and positioned to engage an upper end of the pipe stand 110. As shown in FIG. 9E, the end effector 132 of the upper robot 116b may be controlled to grasp the upper end of the pipe stand. In particular, the end effector may be controlled to open or extend the movable finger, position the pipe stand between the movable finger and the fixed finger, and close or retract the movable finger. Moreover, the wrist and/or other aspects of the second robot may be manipulated to position the end effector in a manner that accommodates the angle of the pipe stand based on the position of the top and bottom of the pipe, which may be known based on the first robot position and the elevator position. With both ends of the pipe stand engaged by the first and second robots, and with the weight of the pipe stand supported by the drill floor, the pipe elevator or other lifting system may be disengaged from the pipe stand (216). Additionally, the upper robot may move to position the upper end of the pipe stand within the racking board, such as between two fingers of the racking board (218). The upper robot may position the upper end of the pipe stand in line with the lower end of the pipe stand as positioned by the lower robot. FIG. 9F illustrates an overhead view of the upper robot 116b positioning the pipe stand 110 within the fingers 109 of the racking board 108. In one or more embodiments, the end effectors of the first and second robots may be manipulated to track and/or follow the changing angle of the pipe stand as the second robot moves the top of the stand into the fingers of the racking board.

Figure 9G:
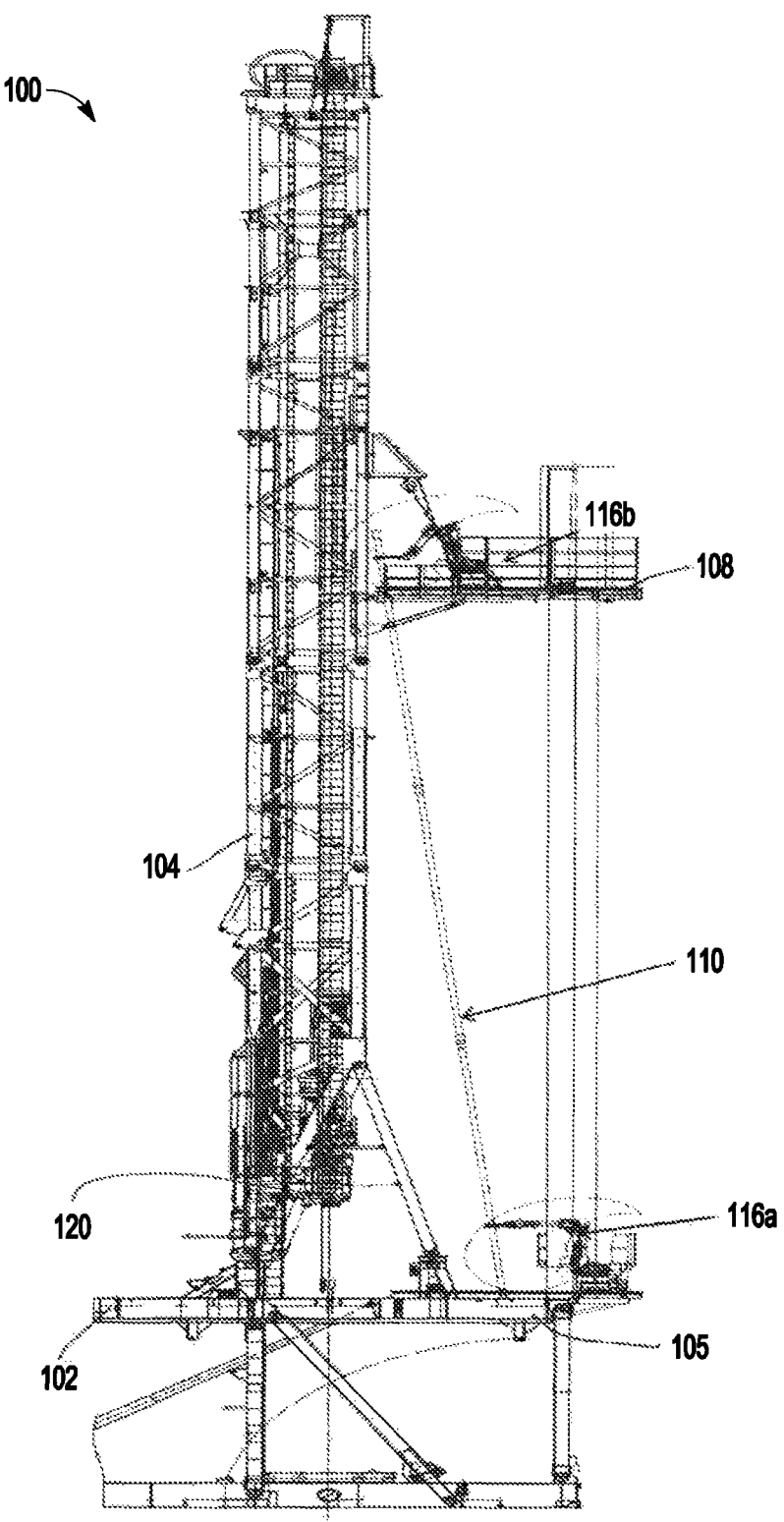
FIG. 9G is a side view of the drilling rig of FIG. 9A with the second robot maneuvering the upper end of the pipe stand toward a racking location, according to one or more embodiments.

After it disengages from the pipe stand, the lifting system may be lowered to begin a next tip out sequence. In particular, the lifting system may be lowered and may reengage the drill string (220). If slips were placed, they may be removed from around the drill string, and the lifting system may repeat the method 200 by raising the drill string to expose another pipe stand. FIG. 9G illustrates the lifting system lowering the pipe elevator 120 to reengage the drill string while the lower 116a and upper 116b robots manipulate the pipe stand 110 to a stored position between the setback area 105 and the racking board 108. It is to be appreciated that the weight of the pipe stand 110 may be directed to the drill floor 102 while the upper robot 116b manipulates the upper end of the pie stand, as shown in FIG.

Figure 9H:
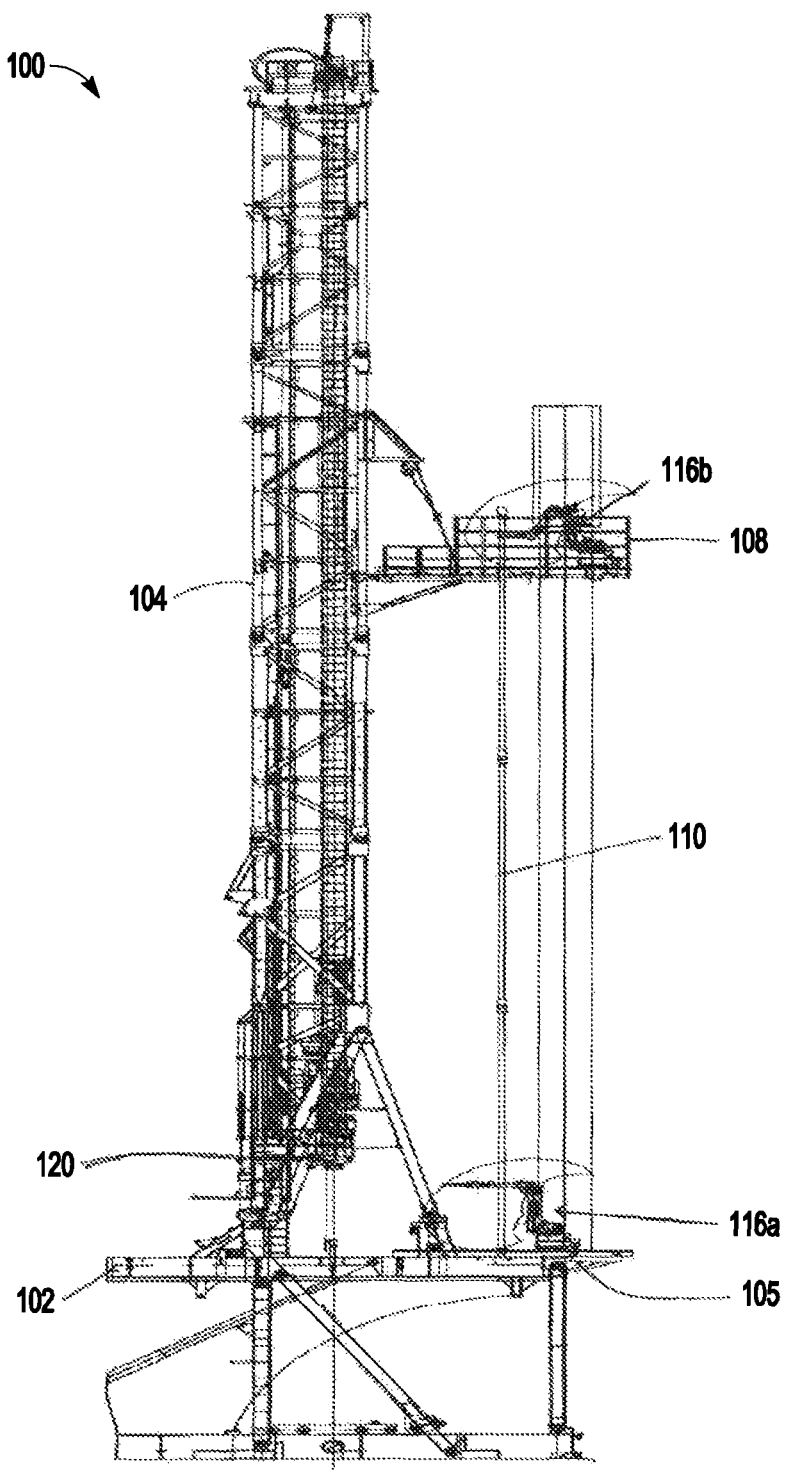
FIG. 9H is a side view of the drilling rig of FIG. 9A with the pipe elevator lowered toward the drill floor and the first robot disengaged from the pipe stand, according to one or more embodiments.

9G. Additionally, the first and second robots may release the pipe stand once it is positioned in the racking board and may move toward well center to engage with a next pipe stand (222). FIG. 9H illustrates the pipe stand 110 stored in the setback area 105 and racking board 108, as the lower robot 116a disengages from the pipe stand 110 and moves toward well center to approach a next pipe stand.

In some embodiments some steps of the method 200 may be performed simultaneously or substantially simultaneously. For example, the lifting system may lower the pipe stand toward the drill floor while the lower robot moves to position the lower end of the pipe stand in the setback area, and while the upper robot moves toward well center in preparation for engagement with the upper end of the pipe stand. Additionally, operations of the various components of the pipe handling system may be coordinated together to carry out the method steps. In some embodiments, actions of the various components may be coordinated by timing individual steps or operations with respect to one another. Additionally or alternatively, operations of the various components may be coordinated based upon feedback data received from one or more components. For example, a weight sensor on or arranged in connection with the lifting system may provide an indication as to whether the pipe stand is held within the pipe elevator. As another example, a contact switch arranged on or in connection with each robot end effector may provide an indication a to whether the pipe stand is engaged by the end effector. A proximity sensor arranged on or in communication with each end effector may provide an indication as to whether the end effector is in an open or closed position. Still further, rotational motion of the several joints of the robots may be measured or monitored as the robot moves so as to continually track the position and orientation of the end effectors and, thus, the portion of the pipe stand surrounded by the end effector. Some steps or operations of methods of the present disclosure may be performed based upon such feedback data, as is described in more detail below.

Figure 10:
FIG. 10 is a flow diagram of a trip-in operation of the present disclosure, according to one or more embodiments.

FIG. 10 illustrates a flow diagram of a trip in operation performable using a pipe handling system of the present disclosure, according to one or more embodiments. The method 300 may be performed automatically, partially automatically, manually, or partially manually. The method 300, or portions thereof, may be encoded on one or more controllers as computer executable instructions. In some embodiments, the method 300, or portions thereof, may be performable by an operator such as a human operator controlling components of the pipe handling system. The method 300 may include the steps of causing the second (upper) robot to engage with the second (upper) end of a pipe stand (302); moving the second end of the pipe stand toward well center (304); using a lifting system, engaging the pipe stand with the lifting system (306); causing the second robot to release the pipe stand (308); causing the first (lower) robot to engage with the first (lower) end of the pipe stand (310); using the lifting system, raising the pipe stand (312); moving the first end of the pipe stand toward well center (314); lowering the pipe stand onto the drill string (316); coupling the pipe stand to the drill string (318); causing the first robot to release the pipe stand (320); lowering the elevator with the drill string (322); placing slips around the drill string (324); and disengaging the lifting system from the drill string and raising the lifting system toward a next pipe stand (326). It is to be appreciated that a trip in operation may effectively be a reverse of a trip out operation, and thus many steps of the method 300 may be understood with reference to FIGS. 9A-9H in reverse order.

It is to be appreciated that the nomenclature of the first and second robots, as indicated with respect to the method 200, is maintained with respect to the method 300.

The second robot, which may be an upper robot arranged on or near the racking board, may engage with the second or upper end of a pipe stand (302). This may be a pipe stand stored in the setback area of the drill floor and arranged within the racking board. The robot may engage with the pipe stand by grasping it with the end effector. In some embodiments, the robot may be directed to the pipe stand based on a known location of the pipe stand. That is, the robot may be directed to open and close the end effector at a particular location above the racking board, where it is known that a pipe stand is stored. Alternatively or additionally, the robot may include sensors for determining the position of the pipe stand. As described above, the robot may be configured to engage with a single pipe stand without disturbing surrounding pipe stands stored nearby.

With the pipe stand engaged by the end effector, the upper robot may move the engaged upper end of the pipe stand toward well center (304). The upper robot may move along its track or other movement means on the racking board, and/or may use the articulating arm to position the upper end of the pipe stand at or near well center. It is to be appreciated that while the upper robot maneuvers the upper end of the pipe stand, the weight of the pipe stand may be held by the drill floor. The second robot may thus position the upper end of the pipe stand so that it may be lifted by a lifting system. A pipe elevator or other lifting system may engage the pipe stand to transfer the load from the drill floor (306). The upper robot may release its grip on the pipe stand (308), thus completing a hand-off from the upper robot to the pipe elevator.

Additionally, the first robot, which may be a lower robot arranged on or near the drill floor, may engage with a lower end of the pipe stand, which may be arranged within the setback area of the drill floor (310). As described above, the first robot may engage the pipe stand without disturbing nearby pipe stands. Moreover, the first robot may adjust its end effector to accommodate the changed positioned of a portion of the pipe which may be slightly above the bottom due to the tilted nature of the pipe created by moving the top of the pipe to the pipe elevator or lifting system. The lifting system may operate to lift the pipe stand, so as to transfer the weight of the stand from the drill floor to the lifting system (312). With the weight of the pipe stand held by the lifting system, the lower robot may move the lower end of the pipe stand toward the well center, and in some embodiments may position the lower end of the pipe stand over the drill string extending from the well (314). As the lower robot moves the lower end of the pipe, the end effector on the lower robot may continually track the position and orientation of the pipe based on knowledge of the top and bottom positions of the pipe and may adjust the end effector to accommodate the continually changing pipe orientation. The lifting system may lower the pipe stand onto the drill string (316), and the pipe stand may be coupled to the drill string using, for example, an iron roughneck (318). The lower robot may release the lower end of the pipe stand (320).

In some embodiments, slips or another mechanism holding the drill string in place with respect to the drill floor may be removed or disengaged, and the lifting system may operate to lower the drill string so as to lower the newly attached pipe stand at least partially into the well (322). Slips or another suitable mechanism may be positioned around the drill string to maintain a position with respect to the drill floor (324). With a position of the drill string held by the slips, the lifting system may disengage from the drill string, and may raise upward toward the racking board to prepare for engagement with a next pipe stand (326). The method 300 may thus repeat in order to attach a next pipe stand to the drill string.

As described above with respect to the method 200, some steps of the method 300 may be performed simultaneously or substantially simultaneously. Additionally, operations of the various components of the pipe handling system may be coordinated together to carry out the method steps. In some embodiments, actions of the various components may be coordinated by timing individual steps or operations with respect to one another. Additionally or alternatively, operations of the various components may be coordinated based upon feedback data received from one or more feedback devices, such as a weight sensor, a contact switch, a proximity sensor, and/or other suitable feedback devices.

Figure 11:
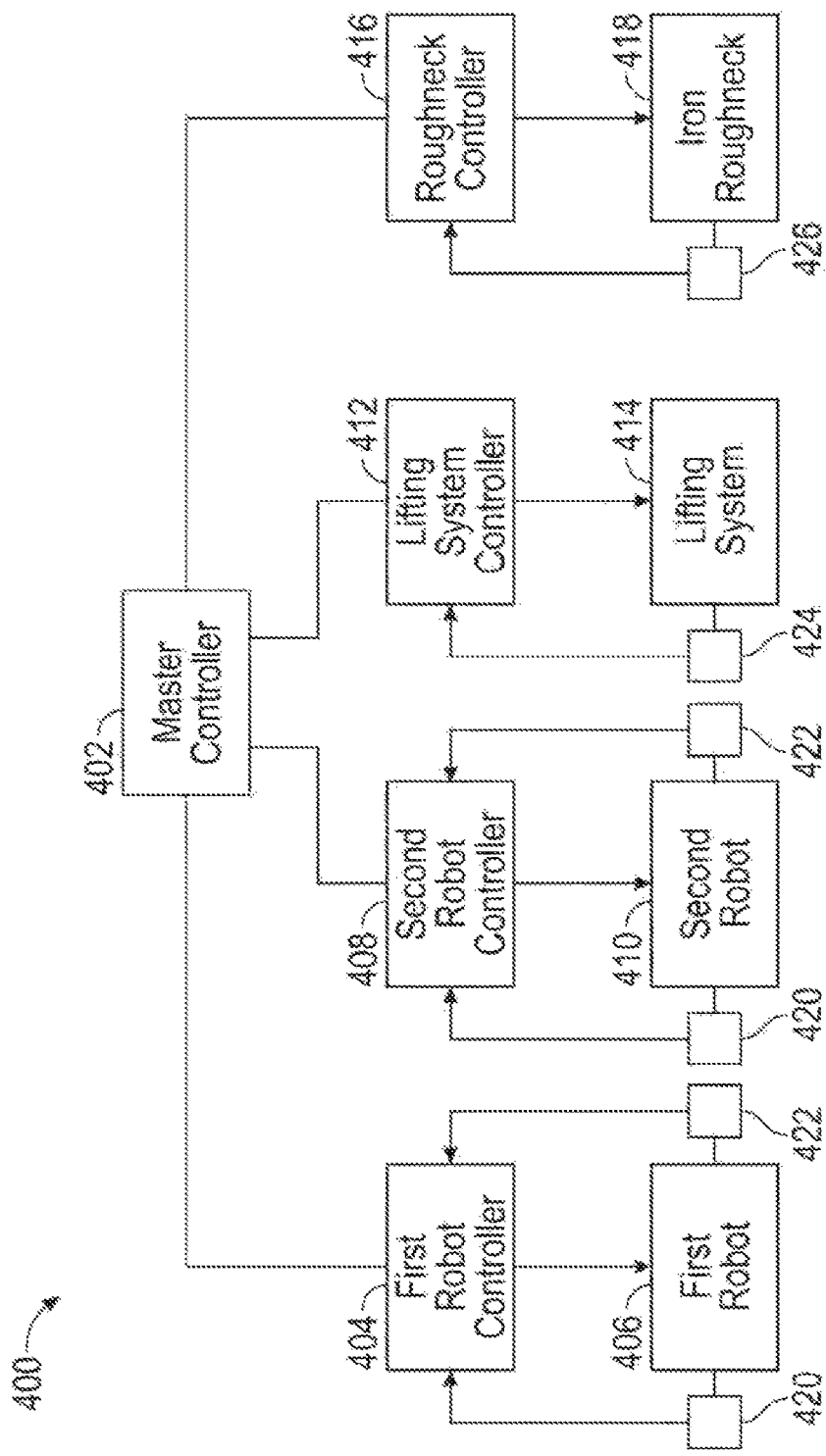
FIG. 11 is a diagram of a pipe handling system of the present disclosure, according to one or more embodiments.

FIG. 11 shows one embodiment of a system 400 of the present disclosure, according to one or more embodiments. The system 400 may be configured to perform one or methods of the present disclosure. As shown in FIG. 11, the system 400 may include a master controller 402 in communication with one or more device controllers. For example, in some embodiments, a system 400 of the present disclosure may include a first robot controller 404 for controlling operations of a first robot 406, such as a lower or drill floor robot. The system 400 may additionally have a second robot controller 408 for controlling operations of a second robot 410, such as an upper or racking board robot. For each robot, the corresponding robot controller may be programmed or otherwise configured for controlling movement of the robot on its track or other movement system, movement of the shoulder portion with respect to the base portion, movement of the articulated arm with respect to the shoulder portion, movement of the wrist portion with respect to the articulated arm, movement of the end effector with respect to the wrist portion, and actuation of the movable finger or other end effector component(s). The system 400 may have a lifting system controller 412 for controlling operations of a lifting system 414. For example, the lifting system controller 412 may be programmed or otherwise configured for controlling a draw works in order to raise and lower a traveling block and pipe elevator on a main or auxiliary line. The system may have a roughneck controller 416 for controlling operations of an iron roughneck 418. The roughneck controller 416 may be programmed or otherwise configured to control movement of the roughneck 418 along a drill floor as well as spinning and torque movements, or other mechanisms, used to couple sections of a drill string. It is to be appreciated that in other embodiments, a system of the present disclosure may have more or fewer controllers or sub-controllers. For example, in some embodiments, a single controller may be programmed or otherwise configured to control operations of all the components without individual component controllers.

The system 400 may additionally include one or more feedback devices or sensors configured to gather or measure information and send feedback data to one or more controllers. For example, one or more robots 406, 410 may have a contact switch 420 configured to identify whether a movable finger of an end effector is in an open position or a closed position. For each robot 406, 410, the contact switch 420 may send data to the controller 404, 408 controlling that robot. In this way, the controller 404, 408 may control some operations of the robot 406, 410 based on a determination of whether the movable finger is open or closed. One or more robots 406, 410 of the system may additionally or alternatively have a proximity sensor 422 configured to identify whether an object is grasped by the end effector or otherwise in close proximity to an inner curved surface or other surface of the end effector. Each proximity sensor 422 may send data to the controller 404, 408 for the corresponding robot. Robots 406, 410 may additionally have position sensors or other sensors configured to help coordinate movement between the two robots, such that each robot can respond to and coordinate with movements and operations of the other robot while handling a pipe stand. A weight sensor 424 may be arranged on or in communication with the lifting system 414. For example, the weight sensor 424 may be positioned on a main line, traveling block, or pipe elevator. The weight sensor 424 may be configured to determine whether there is a load acting on the lifting system 414, such as the weight of a pipe stand. The weight sensor 424 may communicate sensed data to the lifting system controller 412. The system 400 may additionally have one or more sensors 426 associated with the iron roughneck 418, such as a proximity sensor, torque sensor, or other suitable sensor or feedback device in communication with the roughneck controller 416. The system may have additional or alternative feedback devices or sensors. For example, the system may include a feedback device associated with slips provided at the well center to indicate whether the slips are closed around the drill string. Feedback devices and sensors may send sensed data to controllers continuously, at intervals, intermittently, or on demand. In some embodiments, a controller may query a feedback device or sensor for data as needed.

In some embodiments, steps of the methods and/or other operations described herein may be programmed as, or may include or be part of, one or more finite state machines. A finite state machine sequence of operations may be performable by one or more controllers. FIGS. 12-15 illustrate steps performable by each of a lifting system controller, upper robot controller, lower robot controller, and iron roughneck controller, respectively, for a trip in operation according to some embodiments.

Figure 12A:
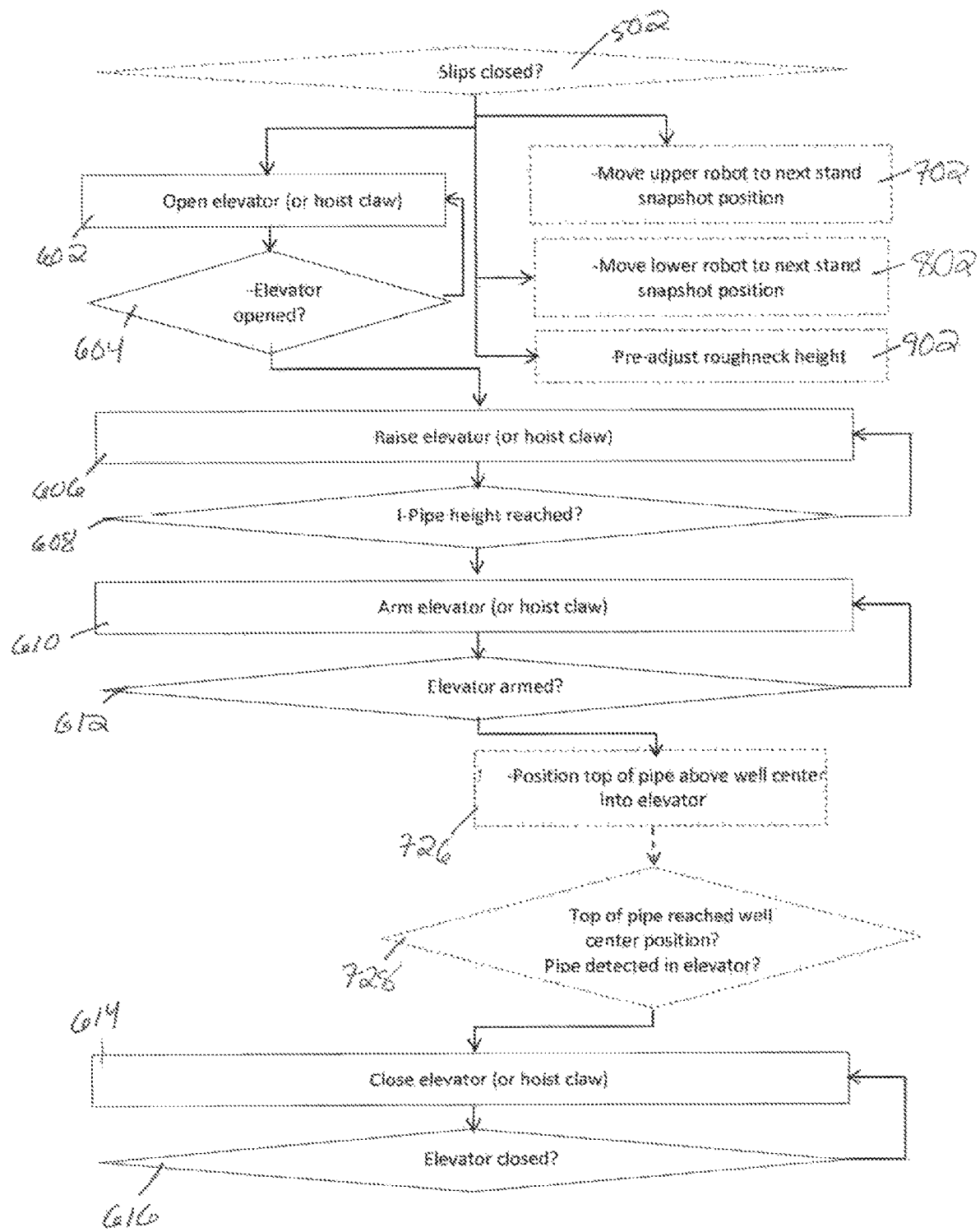
FIGS. 12A-12C are a flow diagram of a lifting system state machine for a trip in operation of the present disclosure, according to one or more embodiments.

For example and as shown in FIG. 12A, a first state for each component may depend on an indication of whether slips are closed around a drill string 502. Such indication may be determined based on a feedback device in communication with the slips. In other embodiments, the indication may be supplied by an operator or by any other suitable means. If it is determined that the slips are closed 502, the lifting system controller may direct the lifting system to open the elevator at state 602. Additionally, if the slips are closed 502, the upper robot controller may direct the upper robot to move to a next pipe stand snapshot position at state 702. If the slips are closed 502, the lower robot controller may direct the lower robot to move to a next pipe stand snapshot position at state 802. If the slips are closed 502, the roughneck controller may direct the iron roughneck to pre-adjust the roughneck height to a stump height of the drill string to prepare for a coupling operation at state 902. Each of the controllers may then proceed through a plurality of states based, at least in part, on feedback data received.

Figure 12B:
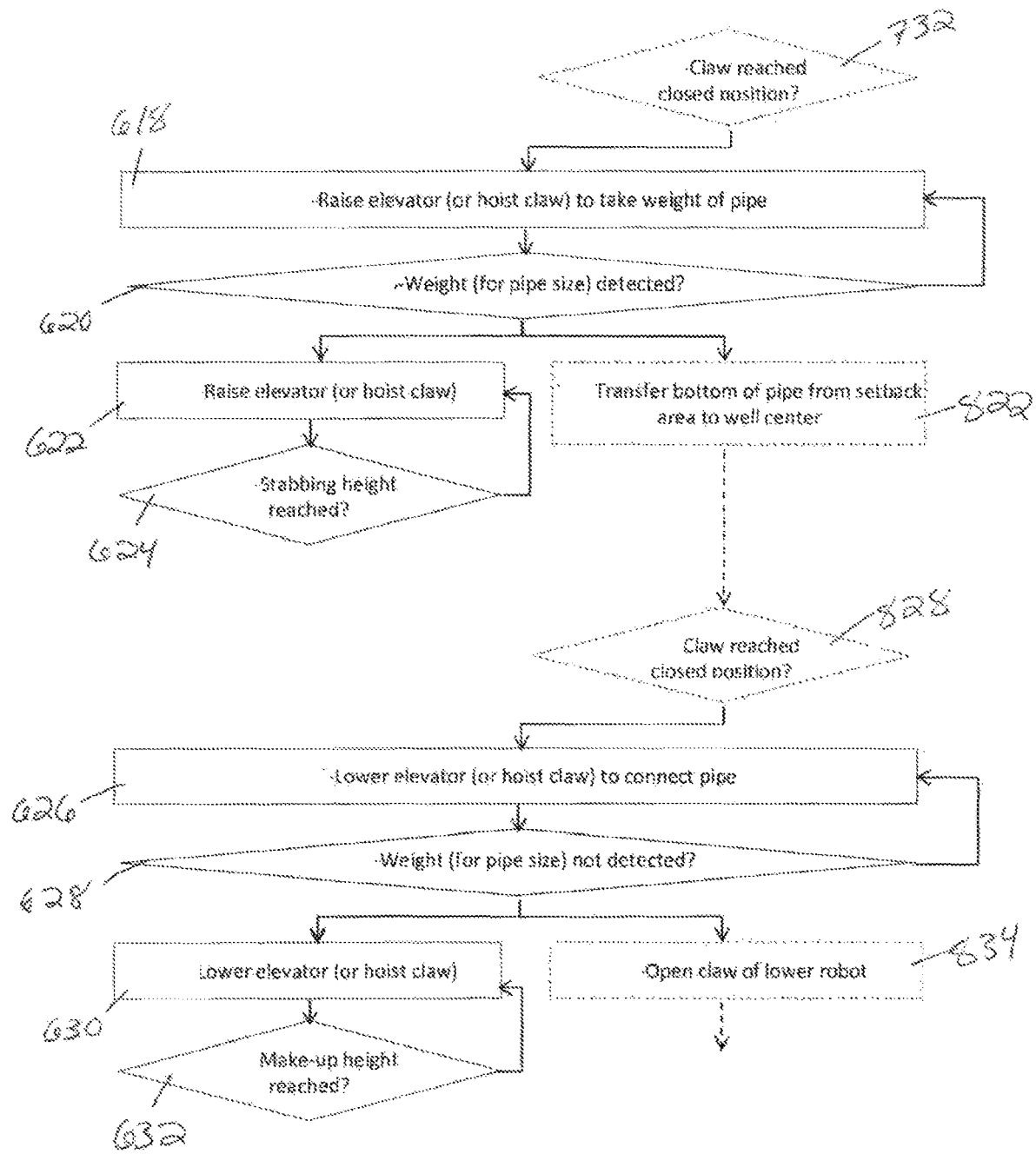
Figure 12C:
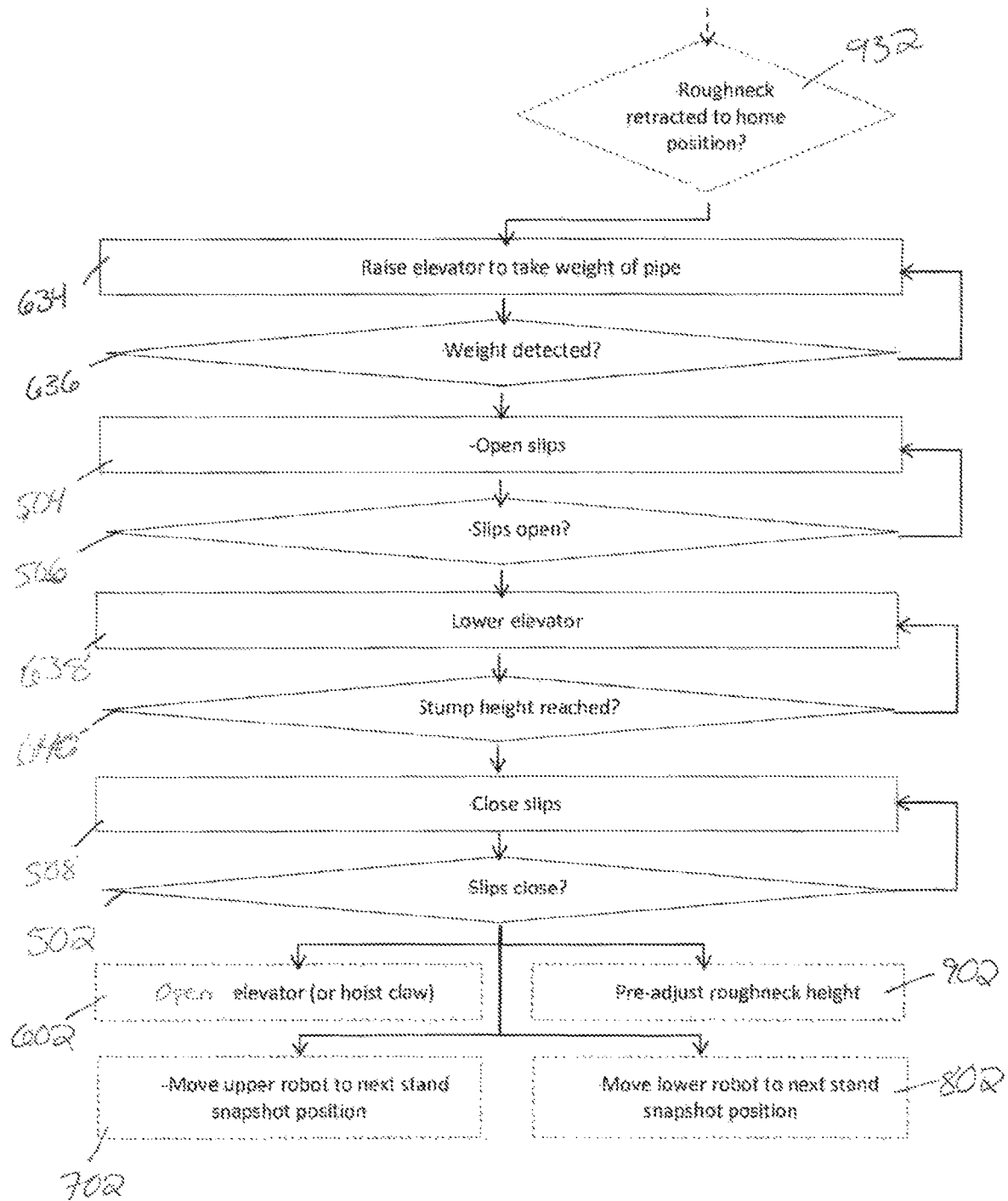

With reference to FIGS. 12A-12C, if a feedback device or other indication means indicates that the pipe elevator is open 604, the lifting system controller may direct the lifting system to raise the elevator 606. If, however, it is determined that the elevator is not open, the controller may return to, or maintain, state 602 until it is determined that the elevator is open. If a feedback device or other indication means indicates that the elevator has reached a pipe stand height 608, the controller may direct the lifting system to arm the elevator 610. If it is determined that the elevator is armed 612 based on a feedback device or other feedback means, a step of positioning an upper end of the pipe stand into the elevator 726 may be performed by an upper robot controller, as discussed in more detail below with respect to FIGS. 13A-13B. If it is determined based on a feedback device or other feedback means that the elevator is aimed 612 and the pipe stand is detected in the elevator 728, the controller may direct the elevator to close on the pipe stand 614. If it is determined that the elevator is closed 616 and a claw of the upper robot is in a closed position 732, the controller may raise the elevator to take the weight of the pipe stand 618. Once the weight of the pipe stand is detected 620 within the lifting system, the controller may raise the elevator 622 until a stabbing height is reached 624 for stabbing the pipe stand into the drill string. Once the elevator reaches a stabbing height 624 and a claw of the lower robot is closed 828, the controller may lower the elevator to connect the pipe stand to the drill string 626. If it is detected that the elevator no longer holds the weight of the pipe 628, the controller may lower the elevator 630 until a make-up height is reached 632. Once the make-up height is reached 632 and the roughneck is retracted to a home position 932, the controller may raise the elevator 634. Once the weight of the pipe (or drill string) is detected within the elevator 636, the slips may be opened 504. Slips may be controllable by a same controller as the lifting system and/or other components of the system, or may be controlled by another controller or mechanism. In some embodiments, the slips may be controlled manually or partially manually. Once the slips are open 506, the elevator may be lowered 638 until a stump height is reached 640. Once the stump height is reached 640, the slips may be closed 508. The trip in operations of each of the systems may then repeat to connect another pipe stand. In particular, as shown in FIG. 12C, if it is determined at step 502 that the slips are closed, the elevator may be opened 602, the upper and lower robots may be directed to a next pipe stand snapshot position 702, 8-2, and a roughneck height may be pre-adjusted 902.

Figure 13A:
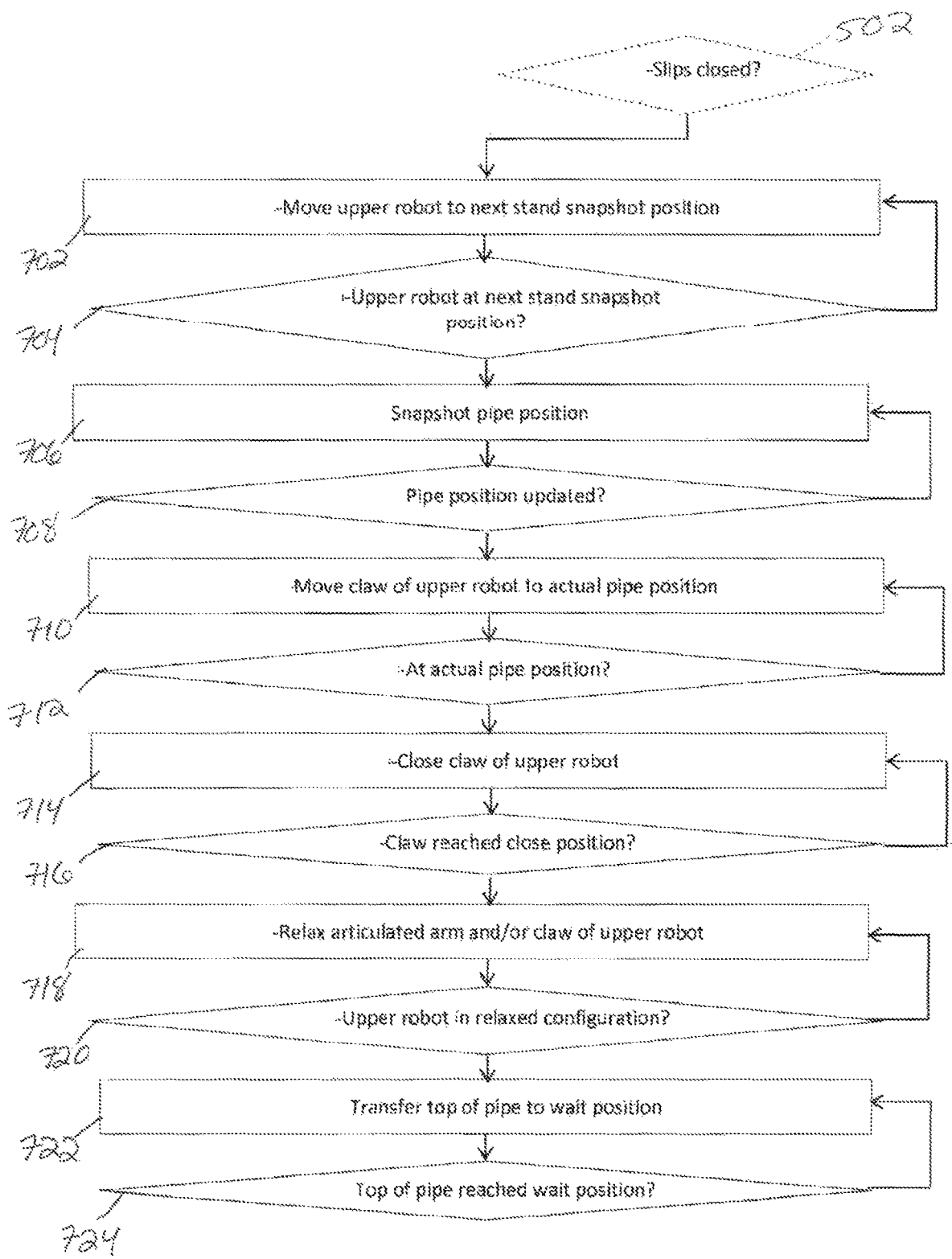
FIGS. 13A-13B are a flow diagram of an upper robot state machine for a trip in operation of the present disclosure, according to one or more embodiments.
Figure 13B:
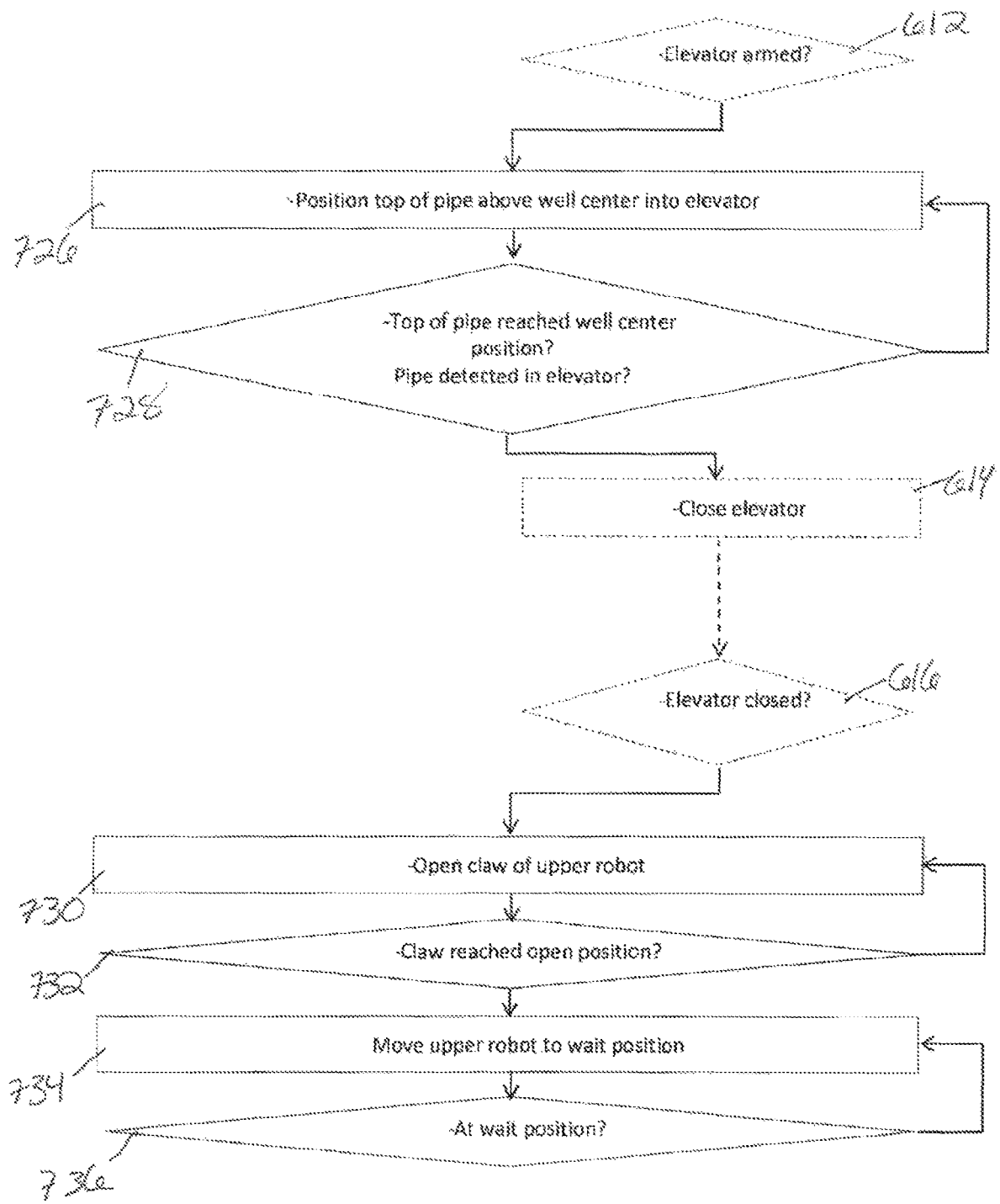

With reference to FIGS. 13A-13B, if a feedback device or other indication means indicates that the upper robot has moved to a snapshot position 704, the controller may direct the upper robot to snapshot the pipe stand position within the racking board 706 using a camera, proximity sensors, and/or other sensors to indicate an actual pipe stand position within the racking board. Based on feedback from such devices indicating an updated position of the pipe stand 708, the controller may direct the claw of the robot to the actual pipe stand position 710. If it is determined that the claw of the upper robot has reached the actual pipe stand position 712, the controller may close the claw of the upper robot around the pipe stand 714. Based on an indication that the claw is in a closed position 716, the controller may relax the articulated arm and/or claw of the upper robot 718. When it is determined that the upper robot or portions thereof are in a relaxed configuration 720, the controller may direct the upper robot to move the pipe stand to a wait position near the well center 722. Once the upper end of the pipe stand is in the wait position 724 and the elevator is armed to receive the pipe stand 612, the controller may direct the upper robot to position an upper end of the pipe stand in the elevator 726. When the pipe stand is detected in the elevator and the elevator 728 and the elevator is closed 616, the controller may direct the upper robot to release the pipe stand 730. Based on a determination that the claw of the upper robot is open 732, the controller may direct the upper robot to a wait position 734 and may then verify whether the robot has reached the wait position 736.

Figure 14A:
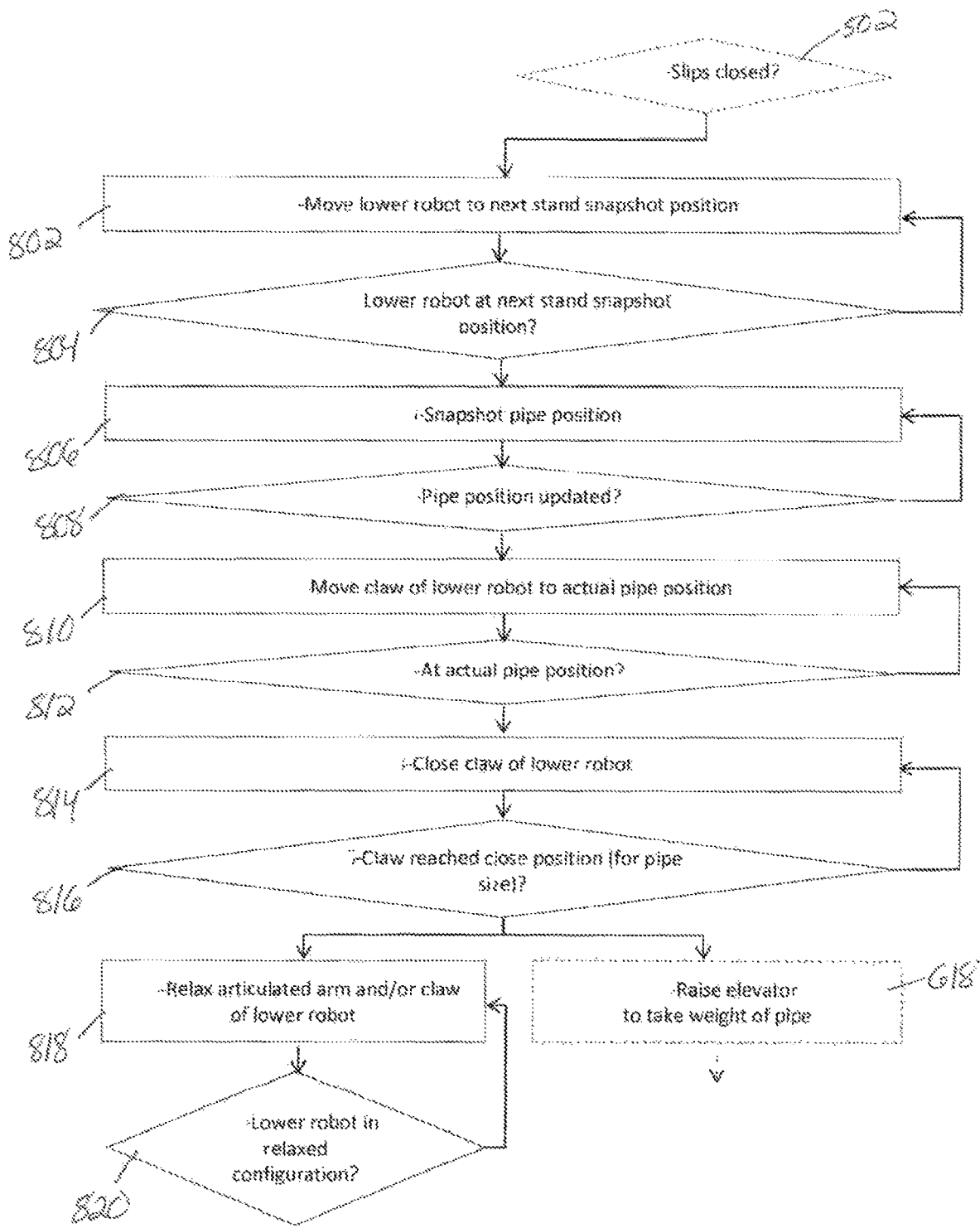
FIGS. 14A-14B are a flow diagram of a lower robot state machine for a trip in operation of the present disclosure, according to one or more embodiments.
Figure 14B:
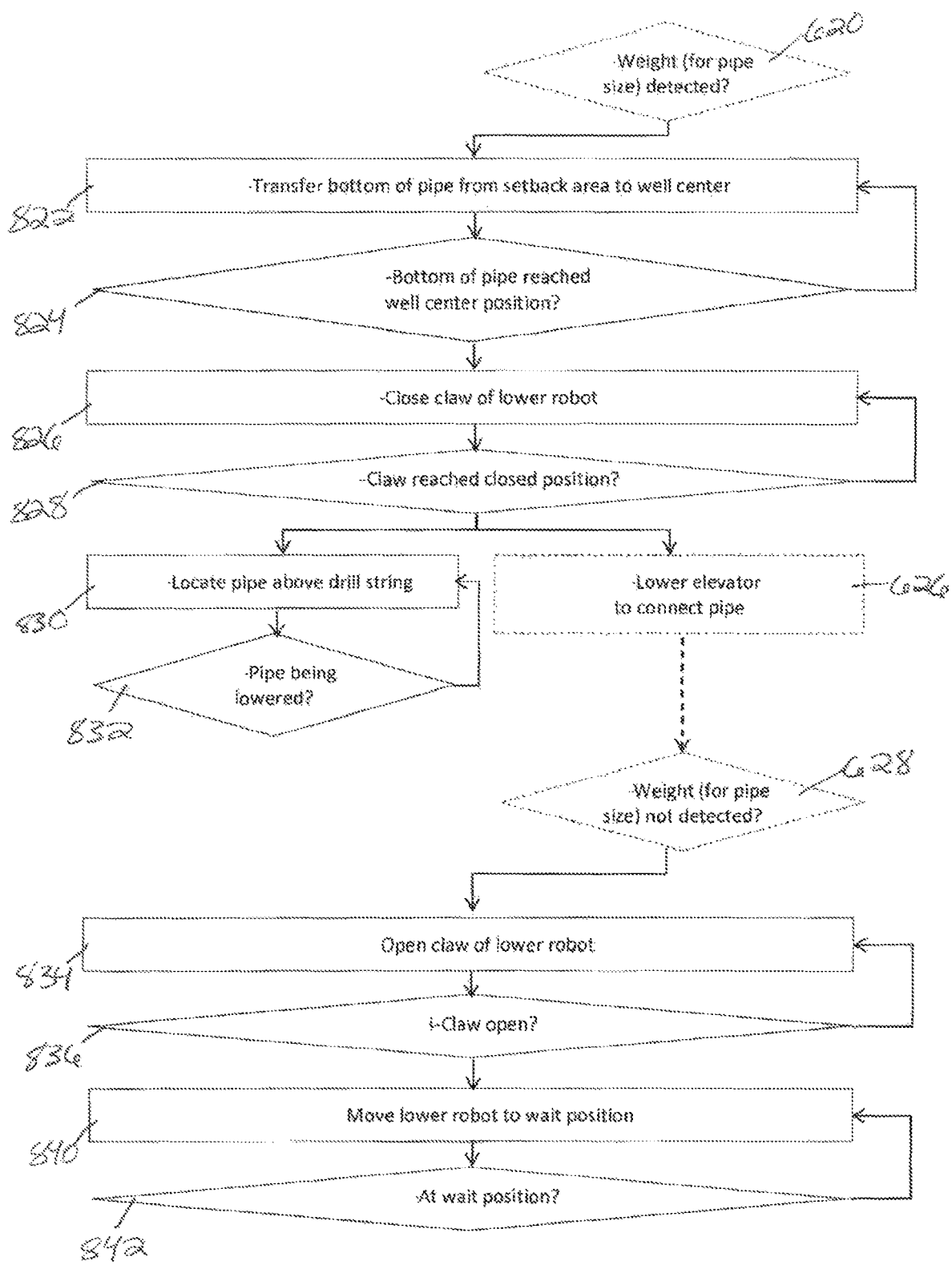

With reference to FIGS. 14A-14B, if a feedback device or other indication means indicates that the lower robot is at a next pipe stand snapshot position 804, the controller may direct the lower robot to take a snapshot of the actual pipe stand position 806. Based on snapshot data indicating an actual pipe stand position 808, the controller may direct the claw of the lower robot to the actual pipe stand position 810. When the claw reaches the actual pipe stand position 812, the controller may close the claw of the lower robot 814. When it is determined that the claw of the lower robot is in a closed position 816, the controller may direct the lower robot to relax its articulated arm and/or claw 818 and, as indicated above, the lifting system may be directed to raise the elevator so as to take the weight of the pipe stand 618. Once the lower robot is in a relaxed configuration 820 and the weight of the pipe is detected within the pipe elevator 620, the controller may direct the lower robot to transfer a lower end of the pipe stand from the setback area to well center 822. Once the lower end of the pipe reaches the well center position 824, the controller may close the claw of the lower robot 826. With an indication that the claw is closed 828, the controller may direct the lower robot to position the pipe stand above the drill string 830. At or near the same time, the lifting system may be directed to lower the pipe elevator to lower the pipe stand onto the drill string 626. The lower robot may continue to position the lower end of the pipe stand above the drill string as the elevator lowers the stand toward the drill string 832. Once it is determined that the elevator no longer holds the weight of the pipe stand 628, the controller may open the claw of the lower robot 834. Once the claw of the lower robot is detected in an open position 836, the lower robot may be directed to a wait position 840 and may then verify whether the robot has reached the wait position 842.

Figure 15A:
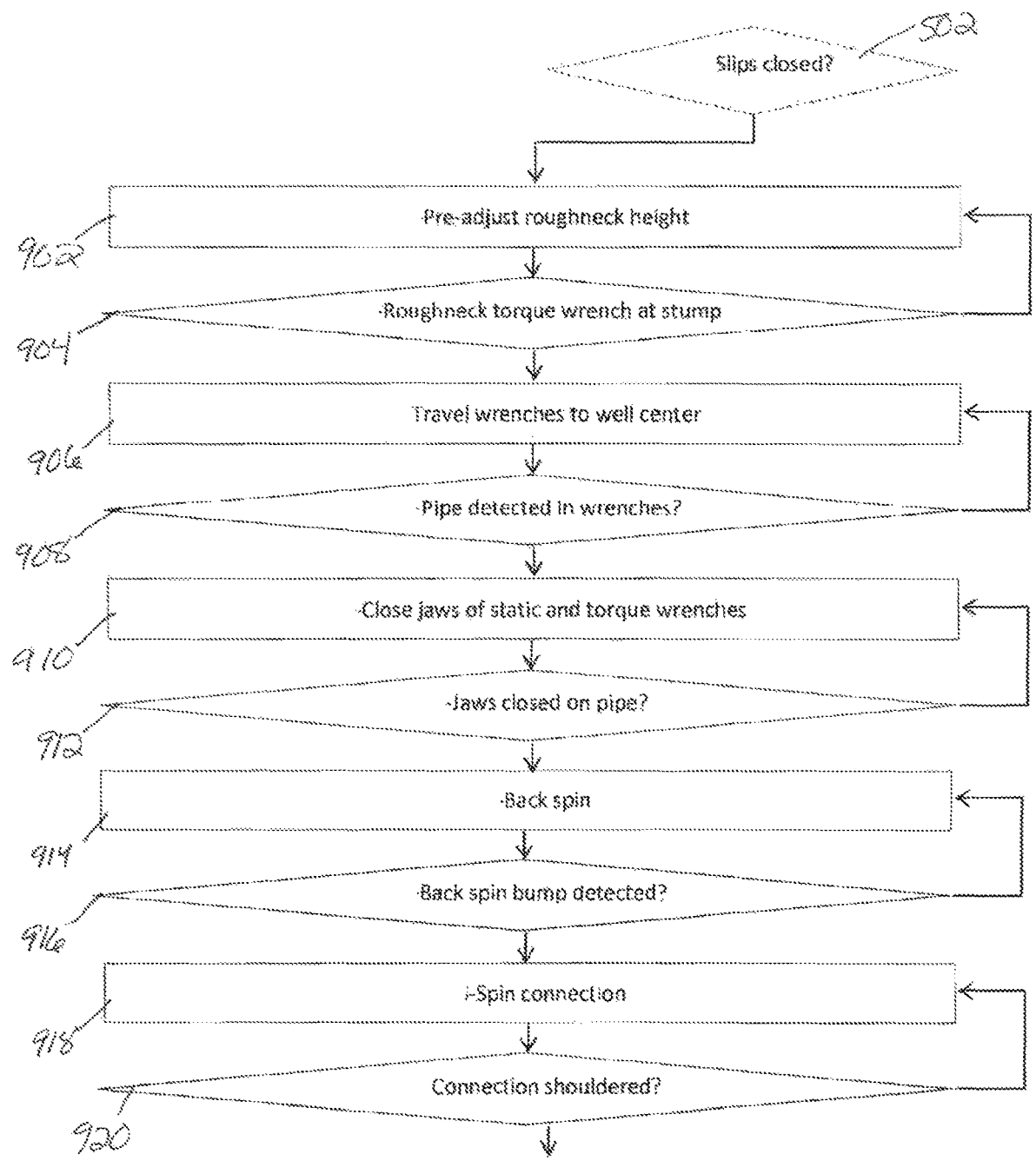
FIGS. 15A-15B are a flow diagram of an iron roughneck state machine for a trip in operation of the present disclosure, according to one or more embodiments.
Figure 15B:
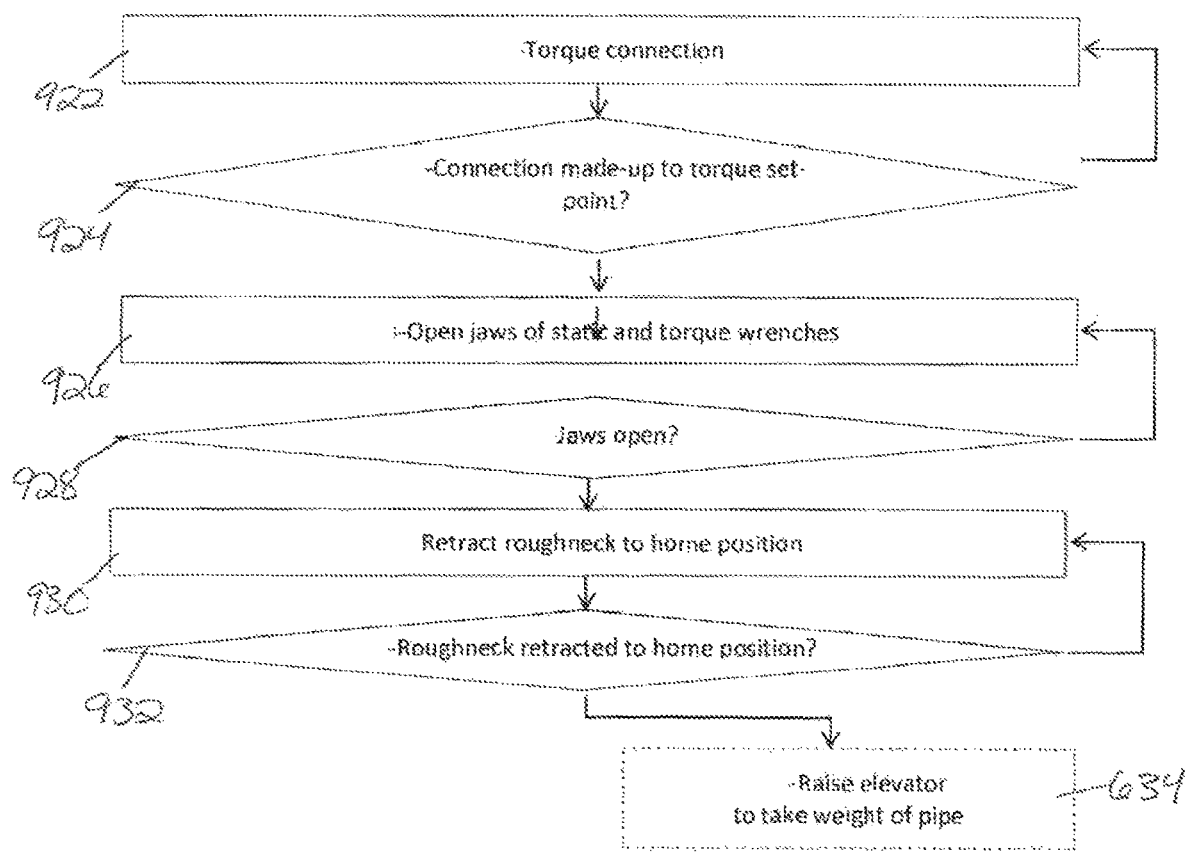

With reference to FIGS. 15A-15B, if a feedback device or other indication means indicates that a torque wrench of the roughneck has reached a stump height of the drill string 904, the controller may direct the roughneck on the drill floor to a position at well center adjacent the drill string 906. Upon detecting that the drill string and/or lower end of the pipe stand are positioned within roughneck wrenches 908, the controller may close the jaws of static and torque wrenches of the roughneck 910. Once it is determined that the jaws are closed 912, the controller may direct a back spin of the torque wrench of the iron roughneck 914. Upon detection of a back spin bump 916, the controller may spin the torque wrench of the iron rough neck 918 to couple the pipe stand and drill string together. Upon an indication that a threaded connection between the drill string and pipe stand is shouldered 920, the controller may direct the roughneck to torque the connection 922. Upon an indication a torque set-point is reached 924, the controller may direct the jaws of the roughneck wrenches to open 926. Upon an indication that the jaws are open 928, the controller may retract the roughneck to a home position on the drill floor 930. With the roughneck in the home position 932, the elevator may be raised to take the weight of the pipe stand and drill string 634 in preparation for lowering the drill string, and as discussed with respect to FIG. 12C.

Figure 16A:
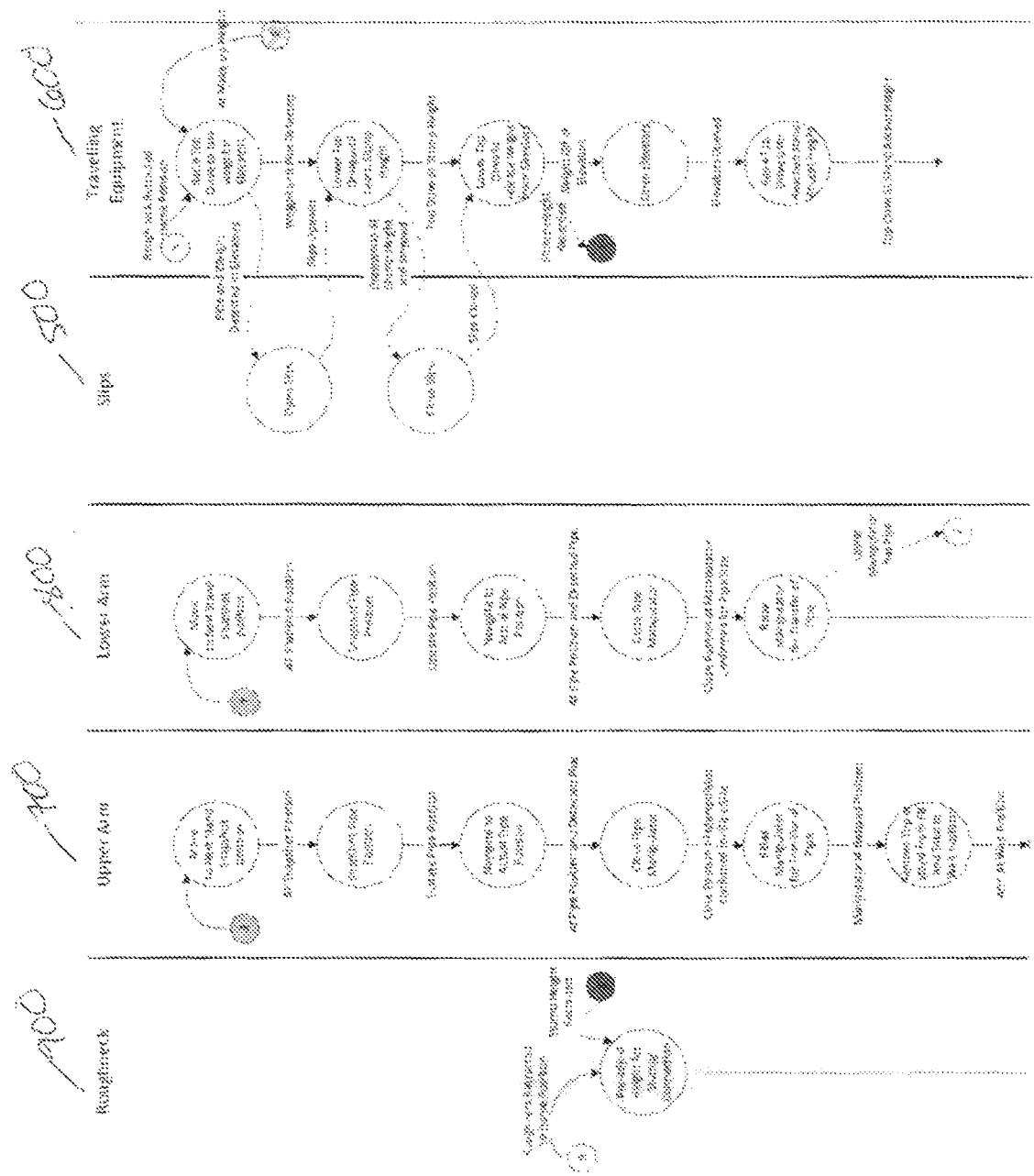
FIGS. 16A-16D are a flow diagram of a trip in operation performable by a pipe handling system of the present disclosure, according to one or more embodiments.
Figure 16B:
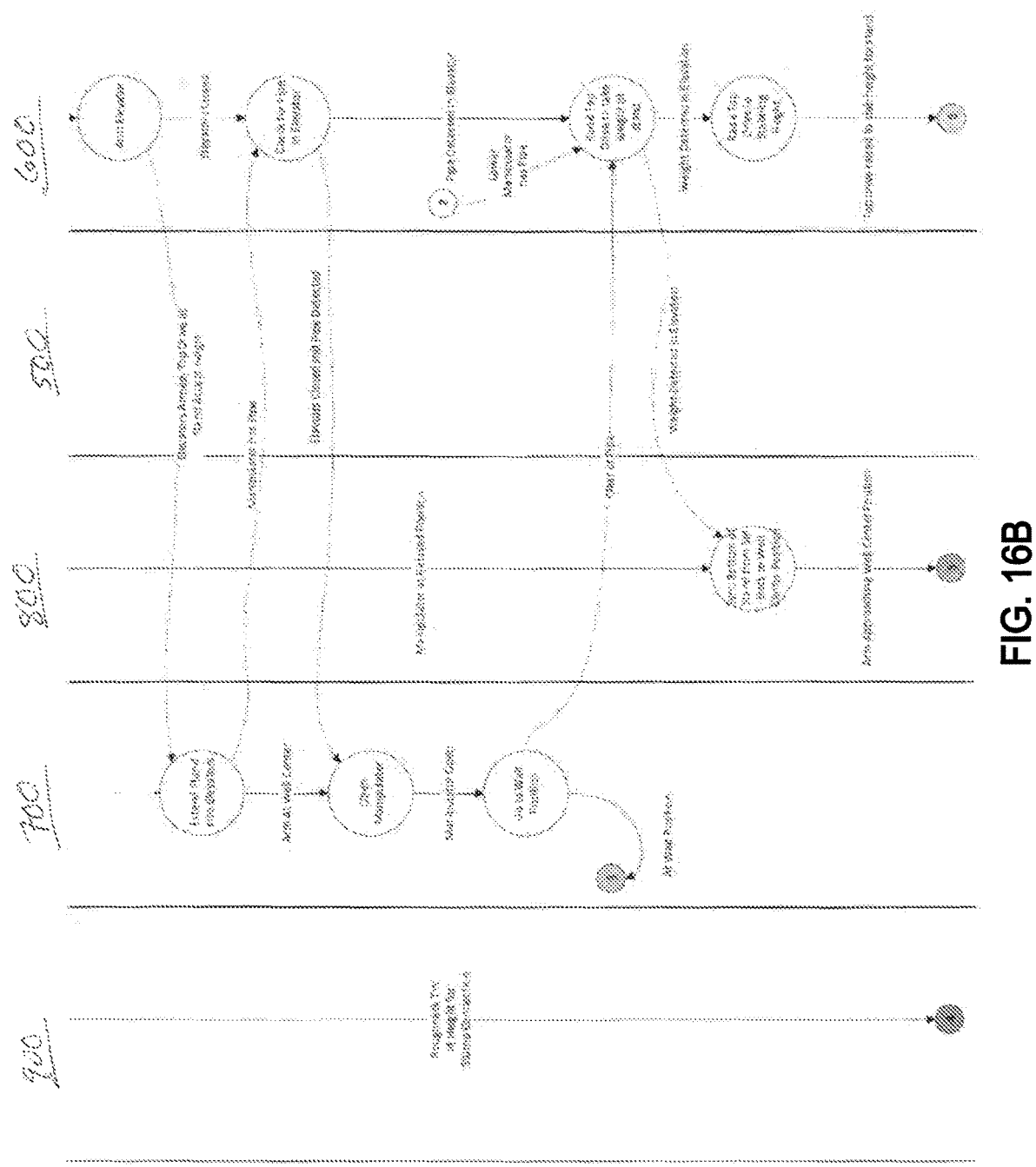
Figure 16C:
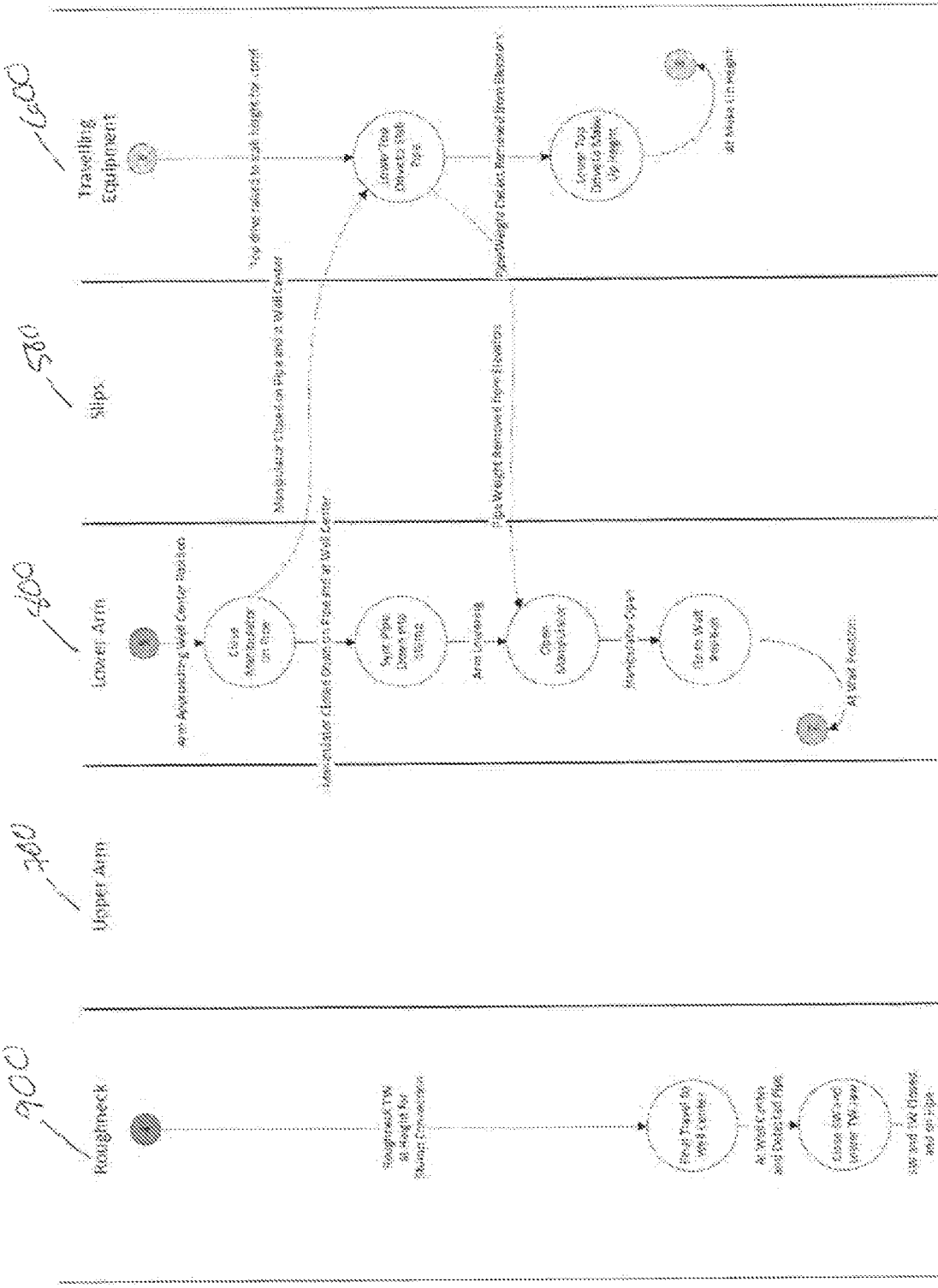
Figure 16D:
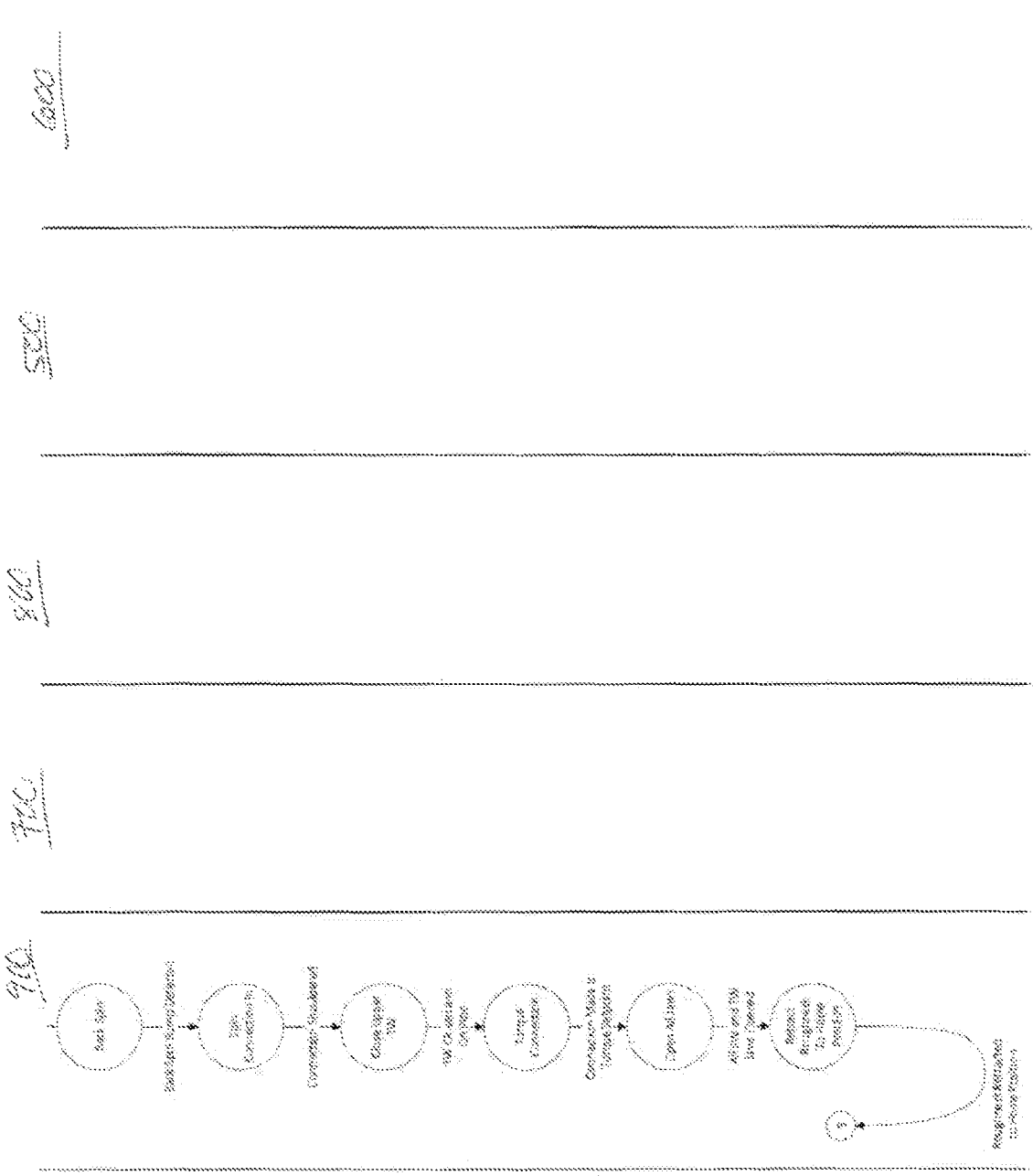

FIGS. 12-15, thus, demonstrate an example of the state machines that may be programmed with respect to at least some components of the pipe handling system. It is to be appreciated that components may be operated in conjunction with one another, wherein some states may rely on others or may rely on feedback received with respect to components of the system. It is further to be appreciated that a variety of feedback devices, sensors, and/or other feedback means may be used to provide the indications for each of the state machines of FIGS. 12-15 to move to a next state. FIGS. 16A-16D illustrate a flow diagram of the state machines discussed with respect to FIGS. 12-15. FIGS. 16A-D also provide an example of operations among the different components, such as the roughneck 900, upper robot 700, lower robot 800, slips 500, and lifting system 600, that may be performed simultaneously. For example and as shown in FIG. 16A, as the upper 700 and lower 800 robots are moving to a next pipe stand snapshot position and snapshotting the pipe position, the lifting system 600 may be raising a top drive to take the weight of the drill string, the slips 500 may be opened, the lifting system may lower the drill string to a stump height for receiving a next pipe stand, and the slips may be closed. Coordination among the various components of the system may additionally be appreciated with respect to FIGS. 16A-D. For example, as shown in FIG. 16B, the upper robot 700 and lifting system 600 may operate together to transfer an upper end of the pipe stand from racking board to the elevator. Feedback devices for both components may help to ensure a successful handoff of the pipe stand from the upper robot to the pipe elevator. With reference to FIG. 16C, the lower robot 800 and lifting system 600 may work together to align the pipe stand with the drill string and lower the pipe stand onto the drill string. Feedback devices for both components may help to ensure a successful alignment and weight transfer from the elevator to the pipe stand.

It is to be appreciated that a pipe handling system of the present disclosure, or components thereof, may be operable without state machines. For example, in some embodiments, one or more components of the system may be programmed or otherwise configured to operate a timed sequence of events. In this way, rather than responding to feedback data to reach a next state, components of a system may be configured to perform a particular sequence of events, performing particular movements and operations based on timing. As a particular example, during a trip out operation, a lifting system may be used to raise a pipe stand above the drill floor, and based on known amount of time needed to raise the pipe stand given a speed of the lifting system, an upper robot may be programmed to move toward well center and grab the pipe stand based on a known location of where the pipe stand will be at a particular time. In other embodiments, a pipe handling system of the present disclosure, or components thereof, may be operable manually or partially manually. For example, a human operator may control some or all movements of one or more pipe handling robots. In this way, an operator may remain at a safe distance from the pipe stand while controlling the robot(s) remotely. Still other operational methods are contemplated as well.

It is further to be appreciated that pipe handling robots of the present disclosure may be relatively versatile in their handling abilities and performable operations. For example, a pipe handling robot of the present disclosure may be configured to interact with pipe stands arranged throughout the setback area, at other locations on or above the drill floor, and/or throughout the racking board. Using a track or other movement mechanism, as well as pivotable motion about a plurality of jointed connections, each robot may have relatively high flexibility and maneuverability to perform operations. An upper robot or racking board robot may be configured to reach every pipe stand racking location within the racking board, and a lower or drill floor robot may be configured to reach every pipe stand storage location within the setback area of the drill floor. Additionally, pipe handling robots of the present disclosure may be configured to operate in relatively tight space constraints.

Figure 17A:
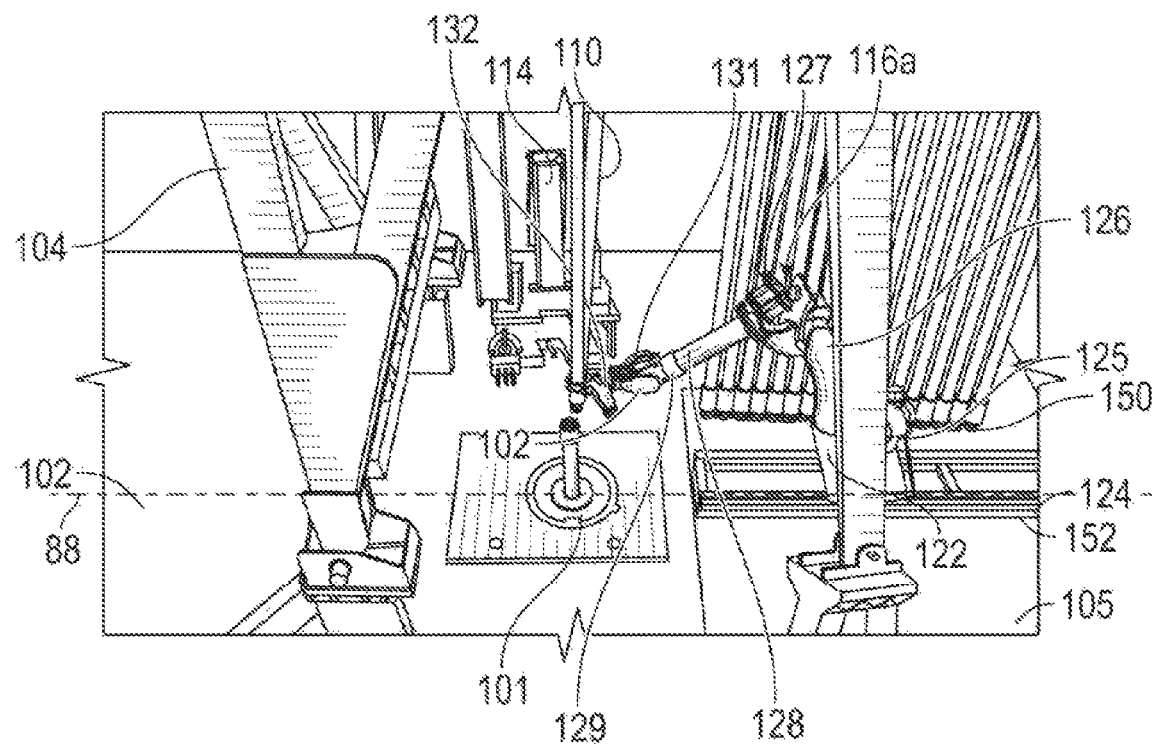
FIG. 17A is a perspective view of a pipe handling robot of the present disclosure engaging with a pipe stand at well center, according to one or more embodiments.
Figure 17B:
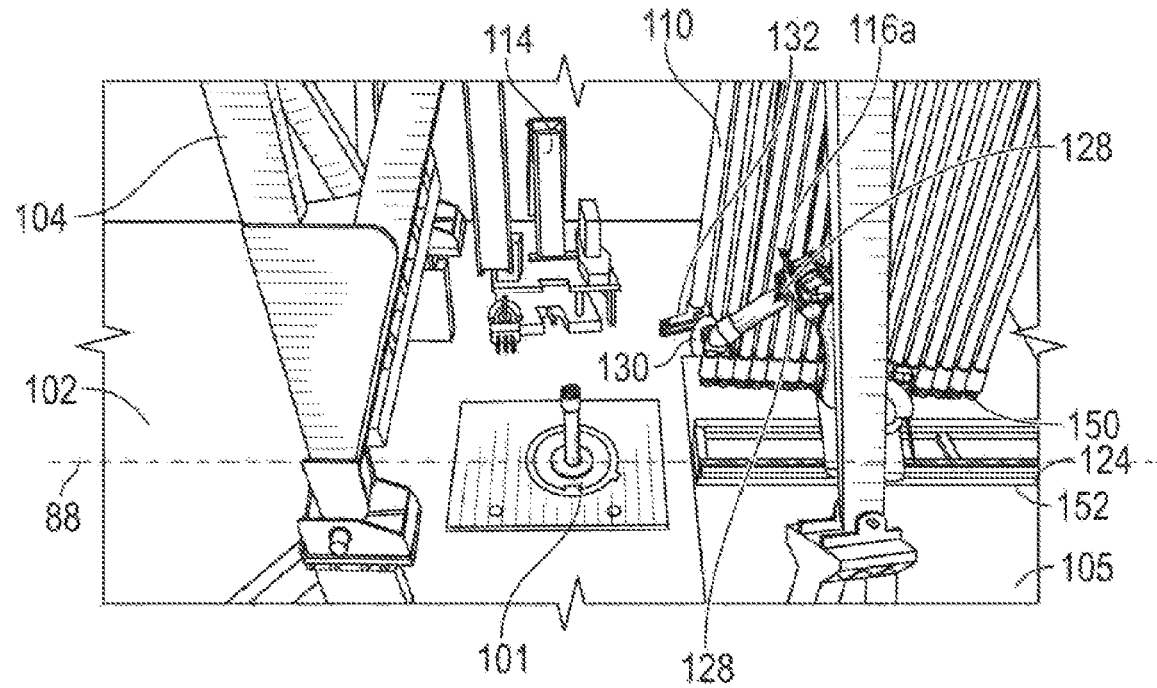
FIG. 17B is a perspective view of the pipe handling robot of FIG. 17A positioning a pipe stand on a first side of a drill floor, according to one or more embodiments.

FIGS. 17A and 17B illustrate a drill floor robot 116a interacting with pipe stands 110 stored on opposing sides, such as a driller's side and an off-driller's side, of a drill floor 102. With reference first to FIG. 17A, the joint 131 between the end effector 132 and wrist 130, which may be a yaw joint, may be controlled to orient the end effector toward a first side 150 of the drill floor 102, which may be a driller's side or off-driller's side. The robot 116a may extend toward the well center 101 by sliding along its track 124 toward well center and/or by pivotable movement at the joint 129 between the wrist 130 and the articulated arm 128, the joint 127 between the articulated arm and the shoulder portion 126, and/or the joint 125 between the shoulder portion and base portion 122, each of which may be or include a pitch joint, to extend the end effector toward well center. While directed toward well center 101, the shoulder portion 126 and articulated arm 128 may be maintained in a substantially neutral orientation. That is, the shoulder portion 126 and articulated arm 128 may be substantially aligned with the track 124, along line 88, as shown in FIG. 17A. To position a pipe stand 110 in the setback area 105 (or to engage with a drill stand stored in the setback area), the shoulder portion 126 may pivot about joint 125 toward the first side 150 of the drill floor 102. Additionally or alternatively, the wrist portion 130 pay pivot about joint 129 toward the first side 150, as may be appreciated with respect to FIG. 17B. Depending on a particular pipe stand storage location on the first side 150, the base portion 122 may slide along the track 124 away from well center 101 if needed, and/or the robot 116a may be retracted by pivotable movement at each of joints 131, 129, and/or 127. In some embodiments, the robot 116a may be operated to maintain the shoulder portion 126 and articulated arm 128 in a substantially neutral orientation along axis 88 during trip in and trip out operations, while the wrist portion 130 and/or end effector 132 pivot to maneuver pipe stands. In some embodiments, trip in and trip out operations may be performed without rotating the articulated arm 128 and/or shoulder portion 126 away from the neutral orientation 88 more than approximately 45 degrees.

Figure 18A:
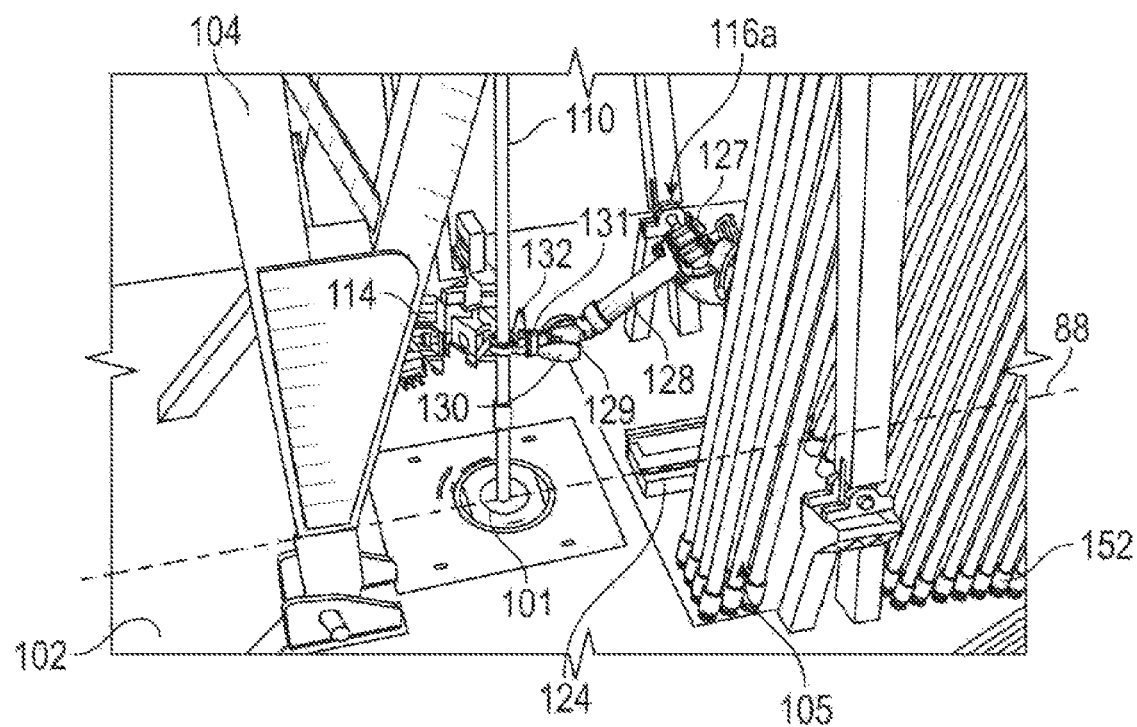
FIG. 18A is a perspective view of a pipe handling robot of the present disclosure engaging with a pipe stand at well center, according to one or more embodiments.
Figure 18B:
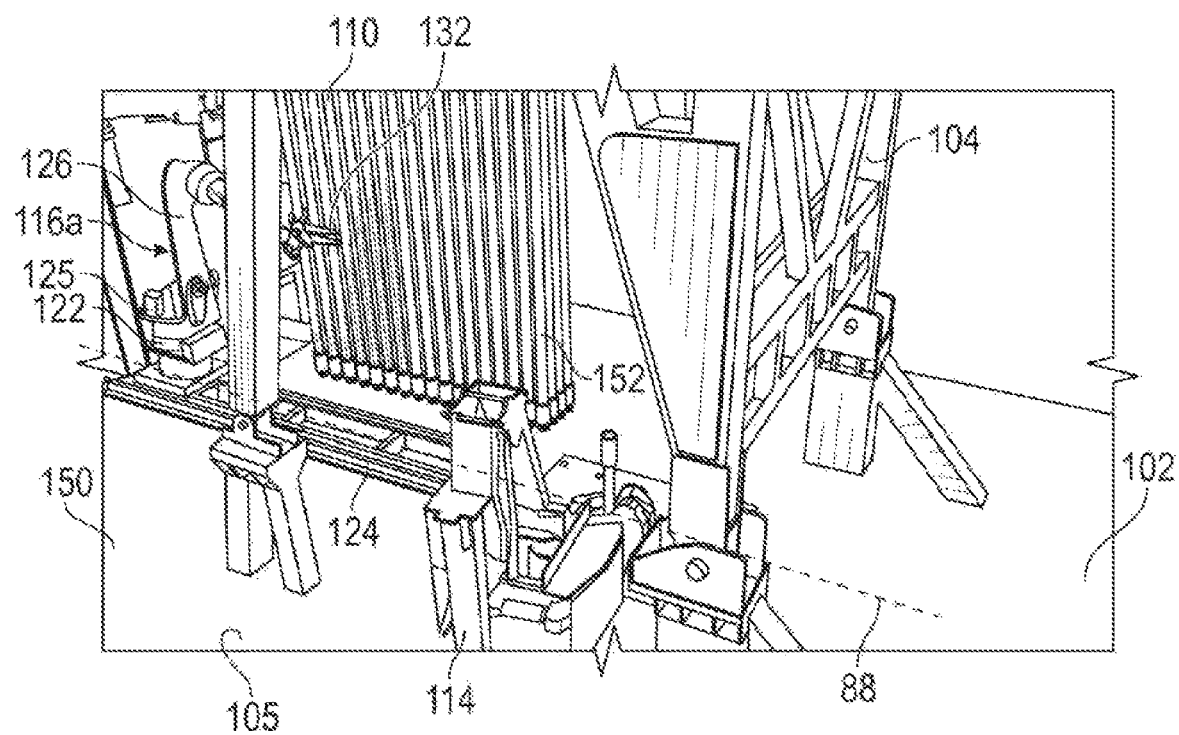
FIG. 18B is a perspective view of the pipe handling robot of FIG. 18A positioning a pipe stand on a second side of a drill floor, according to one or more embodiments.

Reversibility of the end effector 132 may be appreciated with respect to FIGS. 18A and 18B. As shown, to interact with pipe stands 110 stored, or to be stored, on a second side 152 of the setback area 105, the end effector 132 may be directed toward the second side, and thus rotated approximately 180 degrees from its orientation with respect to the first side 150 discussed above. FIG. 18B illustrates the shoulder portion 126 and articulated arm 128 in a substantially neutral orientation along axis 88 while the base portion 122 slides along the track 124 and the wrist portion 130 rotates about axis 129 to reach pipe stand 110 storage locations.

The devices, systems, and methods described herein provide for automated or partially automated pipe handling operations. The automated and partially automated systems and methods described herein may provide for safer pipe handling operations relative to conventional operations. For example, a pipe handling robot of the present disclosure may perform many operations that may otherwise be performed by a human operator. Derrickhands and other human operators often maneuver upper and lower ends of pipe stands during trip in, trip out, and stand building operations. These operations can be dangerous for human operators, particularly due to the size and weight of drill pipes. The pipe handling robots described herein may thus improve the safety of pipe handling operations.

Additionally, systems and methods described herein may improve the efficiency of pipe handling operations relative to conventional operations. In particular, the state machine operations described above may coordinate the operations of system components in order to reduce or minimize lost time. The synchronization and coordination of system components, as described herein, may greatly improve the efficiency of trip in, trip out, and/or stand building operations. The use of pipe handling robots rather than derrickhands and other human operators may increase efficiency and reduce variability of pipe handling operations.

It is to be appreciated that systems and methods of the present disclosure may be relatively cost effective as compared with other automated or partially automated pipe handling systems. In particular, pipe handling systems of the present disclosure may operate using a lifting system that may be operable independent of one or more pipe handling robots. That is, in some embodiments, the pipe handling robots need not have the loading capacity to lift a drill pipe. Rather, the robots may operate to manipulate a length or stand of drill pipe while the lifting system and/or drill floor carries the load of the drill pipe. Pipe handling robots of the present disclosure may thus be more cost effective than robots of other systems. Moreover, in some embodiments, the lifting system may be or include components of the primary drill line and draw works of the drilling rig, without the need to introduce a secondary lifting device or mechanism. However, in other embodiments, a secondary lifting system, device, or mechanism may be used.

For example, in some embodiments, a lifting system of the present disclosure may include a secondary or auxiliary line or cable extending from a draw works. The auxiliary line may operate in addition to the primary or main drill line to facilitate pipe handling operations. In some embodiments, the lifting system may include a dual activity top drive having the ability to engage with a pipe stand with a first elevator while engaging with the drill string with a second elevator, as described in U.S. Provisional Application No. 62/809,093, entitled Dual Activity Top Drive, and filed Feb. 22, 2019, the content of which is hereby incorporated by reference herein in its entirety. In some embodiments, the lifting system may include a robotic drill floor lifting system, which may be or be similar to systems described in U.S. patent application Ser. No. 16/375,927, entitled System for Handling Tubulars on a Rig, and filed Apr. 5, 2019, the content of which is hereby incorporated by reference herein in its entirety. Additionally or alternatively, the lifting system may include an auxiliary lifting arm extending from the drill floor, mast, racking board, or another suitable location on the drilling rig. The lifting arm may be configured for holding a pipe stand above the drill floor while the pipe stand is manipulated by one or pipe handling robots. The lifting arm may be hydraulically or pneumatically actuated in some embodiments. The lifting arm may have a claw or elevator for coupling to or engaging with the pipe stand. In some embodiments, pipe handling operations of the present disclosure may incorporate a first lifting system for handling drill pipe and a second lifting system for handling drill collar.

In some embodiments, one or more robots of the present disclosure may be or include commercially available or off-the-shelf components. For example, one or more pipe handling robots may be or include any of the following: YASKAWA MH225, KAWASAKI BX200, ABB IRB 6620-205, ABB IRB 6700/6790. Other suitable robots and robot components may be used as well.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A pipe handling system for handling drill pipe on a drill rig, the system comprising:
   a lifting system configured for handling a load of a pipe stand;
   a first pipe handling robot for arrangement on a drill floor of the drill rig and configured for independent and coordinated operation with the lifting system and for engaging the pipe stand with an end effector to manipulate a position of the pipe stand, while leaving the pipe stand free to rotate in the end effector;
   a second pipe handling robot for arrangement at or near a racking board of the drill rig and configured for independent and coordinated operation with the lifting system and the first pipe handling robot and for engaging the pipe stand with an end effector to manipulate a position of the pipe stand, while leaving the pipe stand free to rotate in the end effector;

a plurality of feedback devices configured to provide positional information about the pipe stand, the lifting system, the first pipe handling robot, and the second pipe handling robot; and a controller in communication with the plurality of feedback devices, the controller receiving the information provided by the plurality of feedback devices, the controller further controlling operations of the first pipe handling robot and the second pipe handling robot.

2. The pipe handling system of claim 1, wherein the first and second pipe handling each comprise an articulated arm for engaging with the pipe stand.

3. The pipe handling system of claim 2, wherein a joint between e end effector and the articulated arm comprises a roll joint, a pitch joint, and a yaw joint.

4. The pipe handling system of claim 1, wherein the lifting system comprises at least one of a pipe elevator, a drawworks, or a hydraulic lifting arm.

5. The pipe handling system of claim 1, wherein the first pipe handling robot is configured for engaging with and manipulating a first end of the pipe stand, and the second pipe handling robot is configured for engaging with and manipulating a second end of the pipe stand.

6. The pipe handling system of claim 5, wherein the controller is configured to coordinate operations of the second pipe handling robot with operations of the first pipe handling robot, such that the first and second pipe handling robots operate as a team to manipulate the pipe stand.

7. The pipe handling system of claim 1, wherein the plurality of feedback devices comprise at least one of a weight sensor, a contact switch, and a proximity sensor.

8. A method of handling drill pipe, the method comprising:

using a controller to control a lifting system to transfer a load of a pipe stand to the lifting system; and using a controller to control a first robot arranged on a drill floor of a drill rig and a second robot arranged at or near a racking board of the drill rig in independent and coordinated operation to engage the pipe stand with an end effector and manipulate a position of the pipe stand while the load of the pipe stand is held by the lifting system and the pipe stand is free to rotate in the end effector, wherein, the controller is in communication with a plurality of feedback devices and receives information from the plurality of feedback devices about the position of the pipe stand, the lifting system, the first robot, and the second robot and controls the first robot and the second robot based on the information from the plurality of feedback devices.

9. The method of claim 8, wherein each robot comprises an articulated arm for engaging with the pipe stand.

10. The method of claim 9, wherein a joint between the end effector and the articulated arm comprises a roll joint, a pitch joint, and a yaw joint.

11. The method of claim 8, further comprising using an iron roughneck to couple the pipe stand to a drill string or to decouple the pipe from the drill string.

12. The method of claim 8, further comprising receiving data from the plurality of feedback devices indicating a condition of the pipe stand, the lifting system, the first robot, or the second robot.

13. The method of claim 12, wherein the plurality of feedback devices comprise at least one of a weight sensor, a contact switch, and a proximity sensor.

14. The method of claim 8, wherein the first robot manipulates a position of a first end of the pipe stand, and the second robot manipulates a position of a second end of the pipe stand.

15. The method of claim 8, wherein the controller is a finite state machine.

16. The method of claim 8, wherein using a controller to control a first robot and a second robot to manipulate a position of the pipe stand comprises directing at least an end of the pipe stand toward a setback area of a drill floor or toward a well.

17. A drilling rig comprising:

a drill floor configured for arranged arrangement above a well, the drill floor having an opening for accessing the well;

a mast extending from the drill floor, the mast having a crown block arranged thereon;

a lifting system comprising a cable reeved between the crown block and a traveling block; and a pipe handling system comprising:

a first pipe handling robot arranged on the chill floor and configured for independent and coordinated operation with the lifting system and for engaging a pipe stand with an end effector to manipulate a position of the pipe stand while leaving the pipe stand free to rotate in the end effector;

a second pipe handling robot arranged at or near a racking board of the drill rig and configured for independent and coordinated operation with the lifting system and the first pipe handling robot and for engaging the pipe stand with an end effector to manipulate a position of the pipe stand, while leaving the pipe stand free to rotate in the end effector;

a plurality of feedback devices configured to provide information about a condition of the pipe stand, the lifting system, the first pipe handling robot; and the second pipe handling robot; and a controller in communication with the plurality of feedback devices, the controller receiving the information provided by the plurality of feedback devices, the controller further controlling operations of the first and second pipe handling robots.

18. The drilling rig of claim 17, wherein the lifting system is further configured for handling a load of the pipe stand while the pipe handling robots manipulate a position of the pipe stand.

19. The drilling rig of claim 17, wherein the first pipe handling robot is configured for engaging with and manipulating a first end of the pipe stand, and wherein the second pipe handling robot is configured for engaging with and manipulating a second end of the pipe stand, wherein the controller is configured to coordinate operations of the second pipe handling robot with operations of the first pipe handling robot, such that the first and second pipe handling robots operate as a team to manipulate the pipe stand.

* * * * *

UNITED STATES PATENT AND TRADEMARK OFFICE
CERTIFICATE OF CORRECTION

| | |
|---|---|
| PATENT NO. | : 11,613,940 B2 |
| APPLICATION NO. | : 16/431533 |
| DATED | : March 28, 2023 |
| INVENTOR(S) | : McKenzie et al. |

It is certified that error appears in the above-identified patent and that said Letters Patent is hereby corrected as shown below:

On the Title Page

On page 3, in Column 2, under "Other Publications", Line 57, delete "PCT/UJS2019/025942," and insert --PCT/US2019/025942,-- therefor In the Claims In Column 25, Line 14, in Claim 3, delete "e" and insert --the-- therefor In Column 26, Line 25, in Claim 17, delete "chill" and insert --drill-- therefor In Column 26, Line 29, in Claim 17, delete "stand" and insert --stand,-- therefor In Column 26, Line 41, in Claim 17, delete "robot;" and insert --robot,-- therefor Signed and Sealed this
Sixteenth Day of July, 2024

Katherine Kelly Vidal
*Director of the United States Patent and Trademark Office*